(12) United States Patent
Hashimoto

(10) Patent No.: US 11,797,947 B2
(45) Date of Patent: Oct. 24, 2023

(54) RESOURCE RESERVATION SYSTEM, METHOD FOR STARTING USING RESOURCE, AND NON-TRANSITORY RECORDING MEDIUM

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 390 days.

(21) Appl. No.: 17/227,521

(22) Filed: Apr. 12, 2021

(65) Prior Publication Data
US 2021/0350333 A1    Nov. 11, 2021

(30) Foreign Application Priority Data

May 8, 2020  (JP) ................. 2020-082851

(51) Int. Cl.
*G06Q 10/00*     (2023.01)
*G06Q 10/1093*   (2023.01)
(Continued)

(52) U.S. Cl.
CPC ....... *G06Q 10/1093* (2013.01); *G06K 7/1417* (2013.01); *G06K 19/06037* (2013.01)

(58) Field of Classification Search
None
See application file for complete search history.

(56) References Cited

U.S. PATENT DOCUMENTS 7,124,101 B1 * 10/2006 Mikurak ............ G06Q 10/0631
                                                  705/7.12
10,115,076 B2 * 10/2018 Hammann ............. G06Q 10/10
(Continued)

FOREIGN PATENT DOCUMENTS

| JP | 2000-029939 | 1/2000 |
|----|-------------|--------|
| JP | 2007-011479 | 1/2007 |

OTHER PUBLICATIONS

Foster, Ian, et al. "A distributed resource management architecture that supports advance reservations and co-allocation." 1999 Seventh International Workshop on Quality of Service. IWQoS'99.(Cat. No. 98EX354). IEEE, 1999. (Year: 1999).*
Ahlemann, Frederik. "Towards a conceptual reference model for project management information systems." International Journal of Project Management 27 (2009): 19-30. (Year: 2009).*
Ferrari, Domenico, Amit Gupta, and Giorgio Ventre. "Distributed advance reservation of real-time connections." (1995). (Year: 1995).*

*Primary Examiner* — Gurkanwaljit Singh
(74) *Attorney, Agent, or Firm* — IPUSA, PLLC

(57) ABSTRACT

A resource reservation system includes a first information processing device connected to communicate with a terminal device and a second information processing device connected to communicate with the first information processing device. The second information processing device transmits, to the first information processing device, information on a resource that is reserved for use. The first information processing device transmits, to the terminal device, information on a display component in response to the information on the resource received from the second information processing device. The display component is displayed on the terminal device for receiving a user operation. The first information processing device transmits, to the second information processing device, a resource usage start request in response to the user operation performed with the terminal device. The resource usage start request is for starting using the resource. The second information processing device accepts the resource usage start request.

10 Claims, 34 Drawing Sheets

(51) Int. Cl.
    *G06K 7/14*          (2006.01)
    *G06K 19/06*       (2006.01)

(56) References Cited

U.S. PATENT DOCUMENTS

| | | | |
|---|---|---|---|
| 11,171,880 B2 * | 11/2021 | Fukuta | H04L 47/748 |
| 2007/0133438 A1 * | 6/2007 | Shaffer | H04L 12/1813 |
| | | | 370/260 |
| 2008/0084860 A1 * | 4/2008 | Bloebaum | G06Q 10/0631 |
| | | | 370/342 |
| 2008/0109343 A1 * | 5/2008 | Robinson | G06Q 40/04 |
| | | | 705/37 |
| 2008/0239995 A1 * | 10/2008 | Lee | H04L 12/1818 |
| | | | 370/260 |
| 2010/0161800 A1 * | 6/2010 | Moon | H04L 65/80 |
| | | | 709/226 |
| 2019/0012614 A1 * | 1/2019 | Yamada | H04L 67/12 |
| 2019/0303827 A1 | 10/2019 | Hashimoto | |
| 2020/0104760 A1 | 4/2020 | Hashimoto | |
| 2020/0174767 A1 | 6/2020 | Hashimoto | |
| 2020/0296056 A1 * | 9/2020 | Fukuta | H04L 41/069 |
| 2020/0410407 A1 | 12/2020 | Hashimoto | |

\* cited by examiner

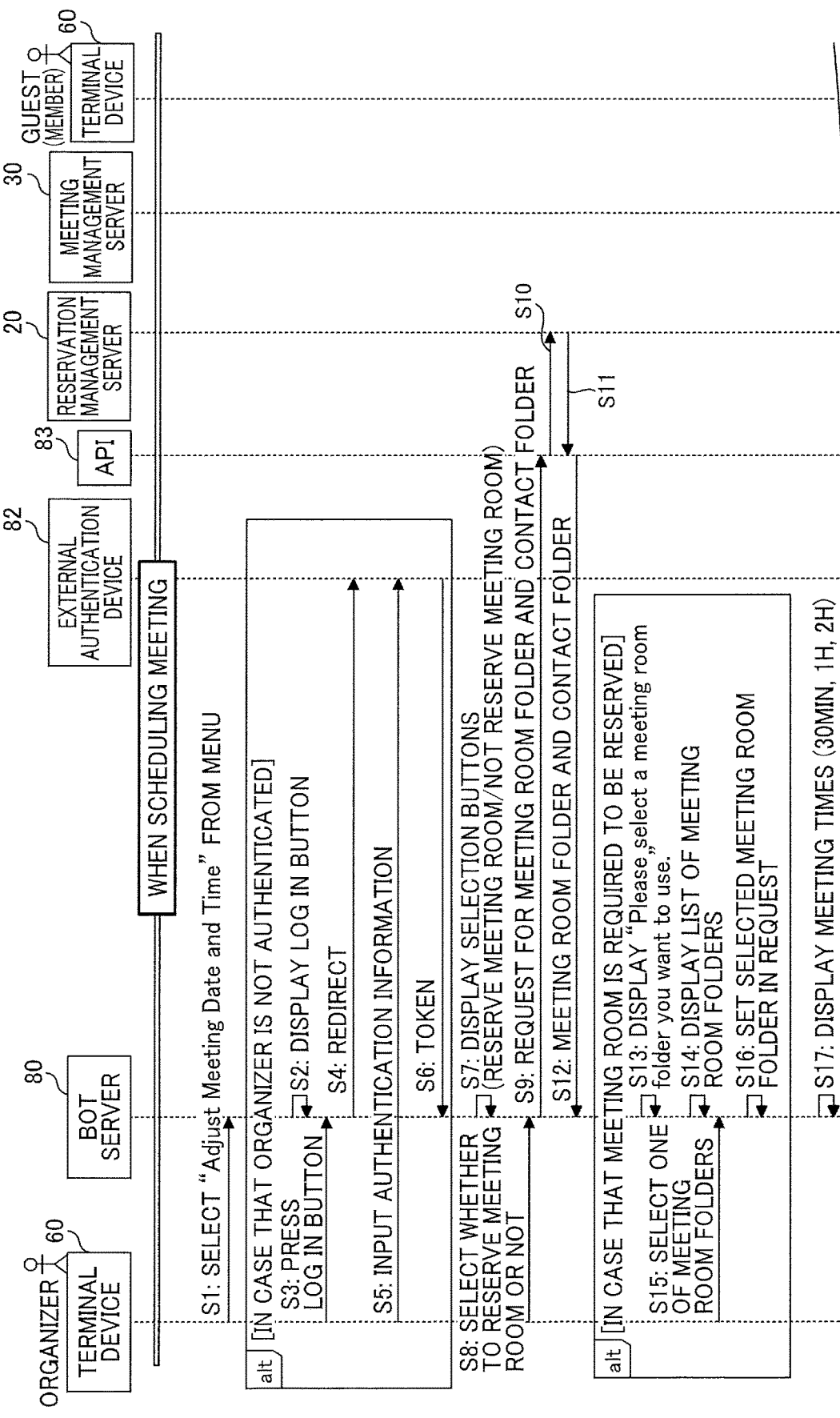

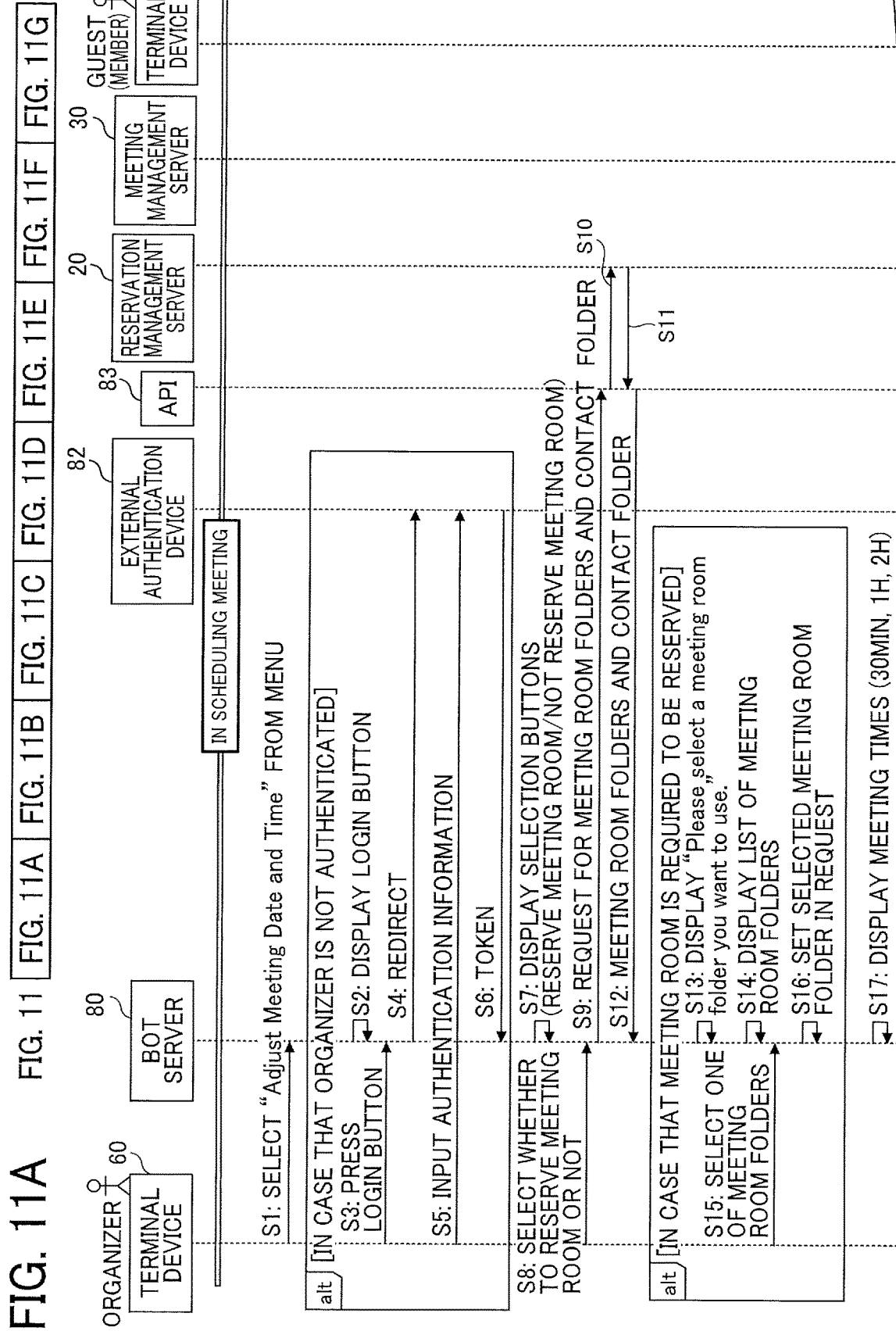

FIG. 17
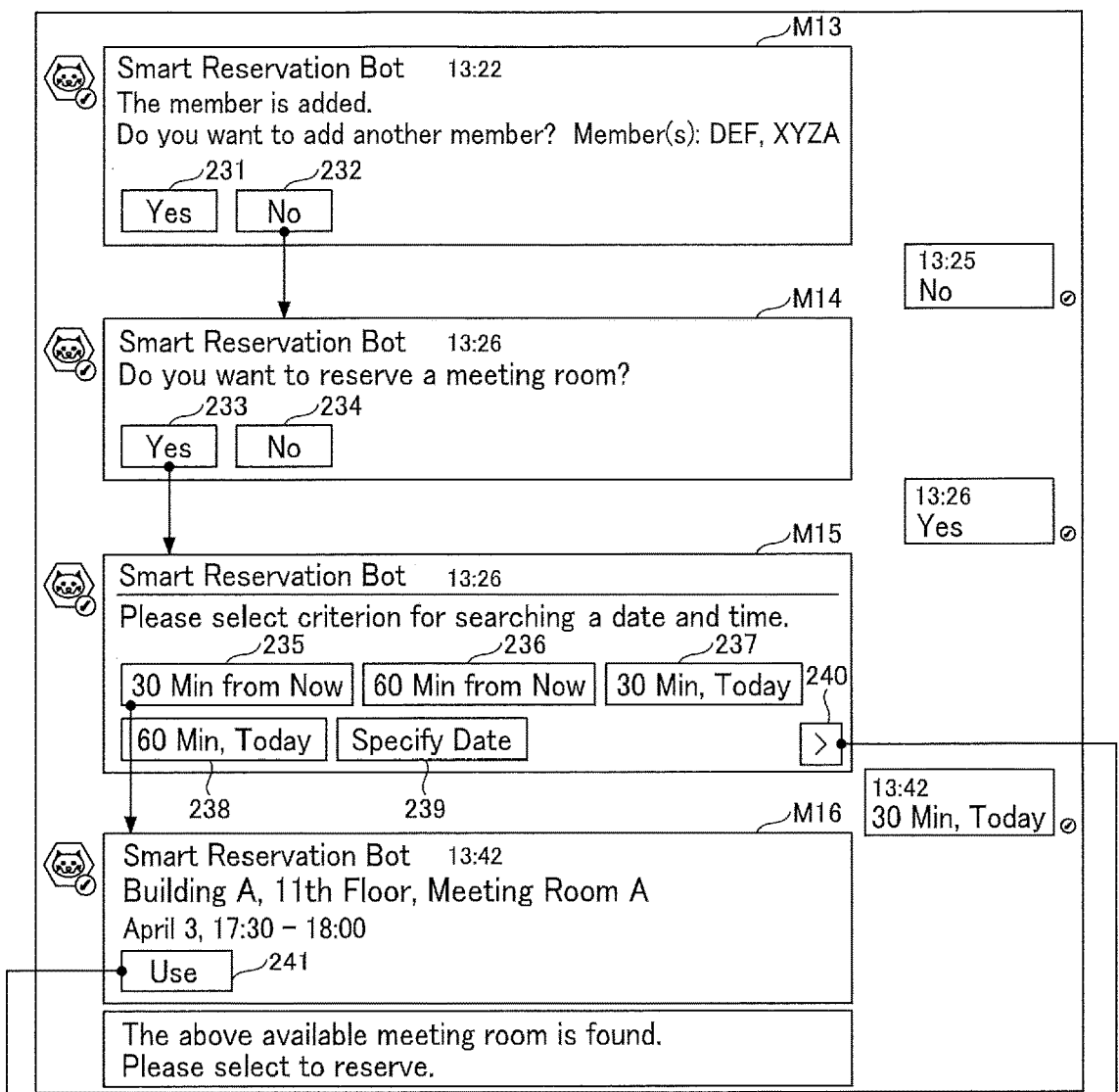
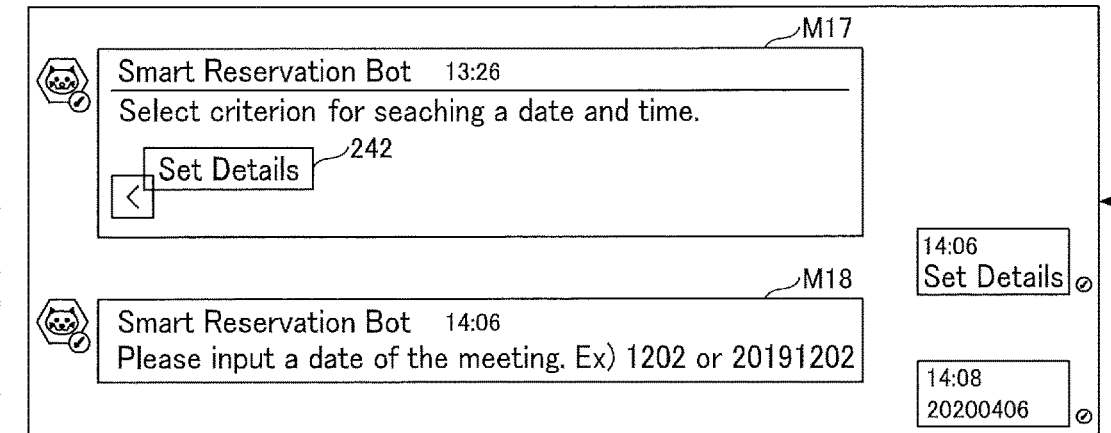

FIG. 20
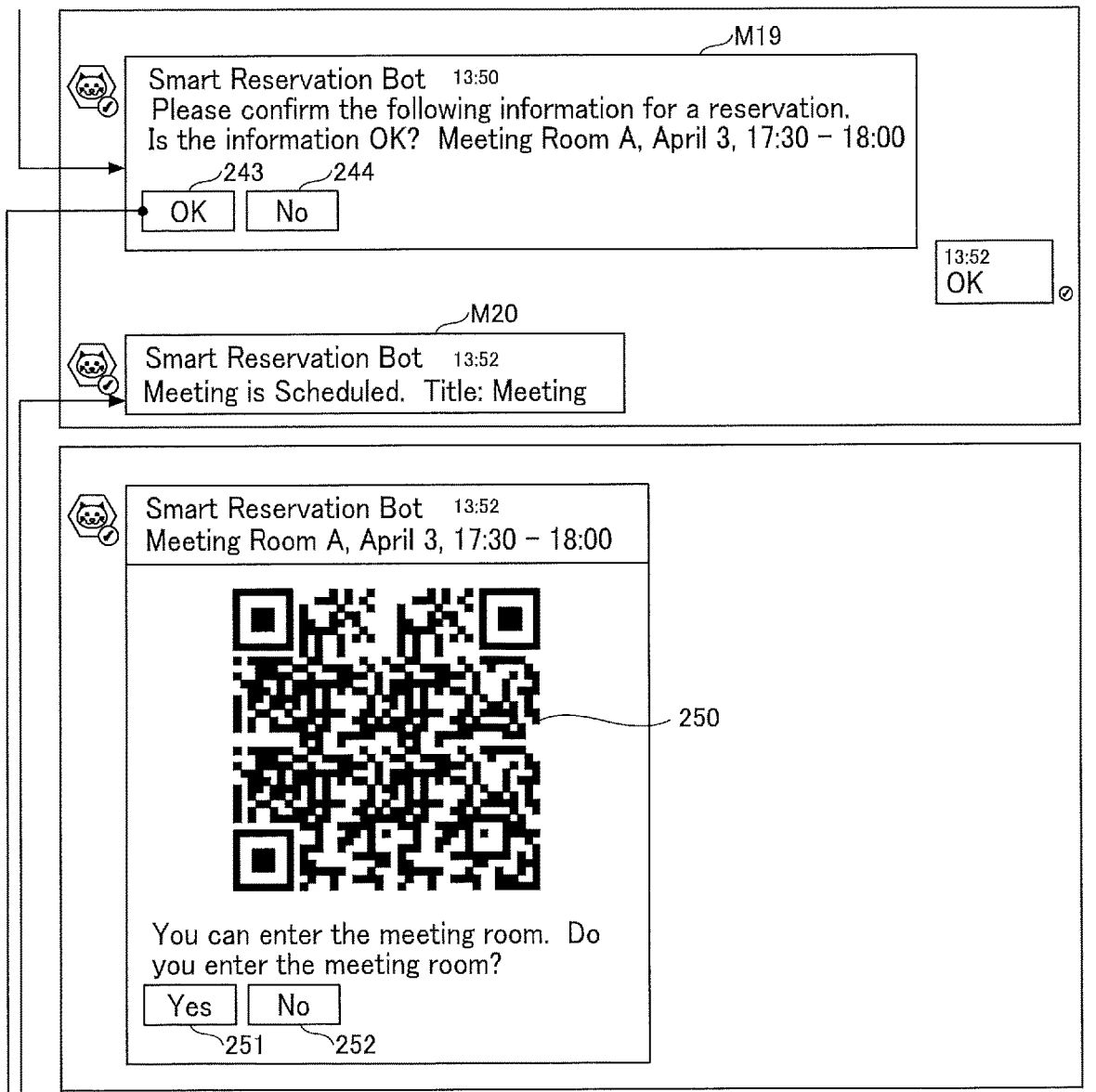
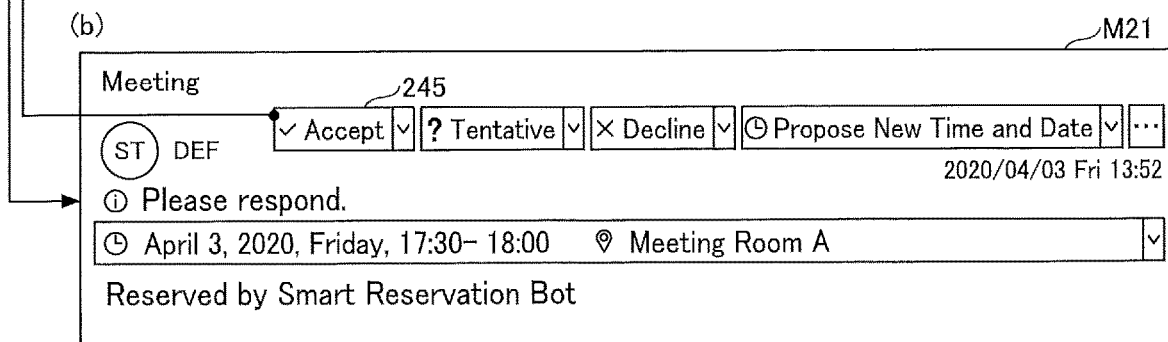

RESOURCE RESERVATION SYSTEM, METHOD FOR STARTING USING RESOURCE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-082851, filed on May 8, 2020, in the Japan Patent Office, the entire disclosure of which is hereby incorporated by reference.

BACKGROUND

Technical Field

Embodiments of the present disclosure relate to a reservation system, a method for starting using a resource, and a non-transitory recording medium storing instructions for executing a method for starting using a resource.

Related Art

A resource reservation system for registering an event such as a meeting and receiving a reservations for resources including a meeting room is known. Schedules or reservations registered in the resource reservation system are called a scheduled event or a reserved resource. A terminal device operated by a user communicates with an information processing device. The information processing device registers an event as a scheduled event or reserve a resource as a reserved resource according to a user operation performed with the terminal device.

In registering an event as a scheduled event, adjusting individual user schedules corresponding to a plurality of users is required to determine an optimum date and time for the event. There is a known technique for supporting to determine an optimum date and time for a meeting. As such a known technique, a system that searches for a meeting room according to conditions for holding a meeting, transmits possible dates and times for the meeting to users by email, analyzes a schedule adjustment request or responses to the schedule adjustment request from one or more of the users, and arranges the meeting by adjusting with respect to the possible dates and times.

SUMMARY

An exemplary embodiment of the present disclosure includes a resource reservation system including a first information processing device connected to communicate with a terminal device and a second information processing device connected to communicate with the first information processing device. The second information processing device transmits, to the first information processing device, information on a resource that is reserved for use. The first information processing device transmits, to the terminal device, information on a display component in response to receiving the information on the resource from the second information processing device. The information on the display component enables the terminal device to display the display component. The display component is for receiving a user operation. The first information processing device transmits, to the second information processing device, a resource usage start request in response to receiving user operation information from the terminal device. The resource usage start request is a request for permission to start using the resource. The user operation information indicates that the user operation of selecting starting using the resource is performed with respect to the display component displayed on the terminal device. The second information processing device accepts the resource usage start request.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10, which includes FIG. 10A to FIG. 10G, is a sequence diagram illustrating an example of a method of registering an event as a scheduled event and starting using a meeting room by using a chatbot according to a comparative embodiment;

FIG. 11, which includes FIG. 11A to FIG. 11G, is a sequence diagram illustrating an example of a method of registering an event as a scheduled event and starting using a meeting room by using a chatbot according to one or more embodiments of the present disclosure;

FIG. 17 is a diagram illustrating still another example of a chat page displaying messages in adjusting a schedule for a meeting, according to one or more embodiments;

FIG. 20 is a diagram illustrating still another example of a chat page displaying messages in adjusting a schedule for a meeting, according to one or more embodiments.

Figure 1A:
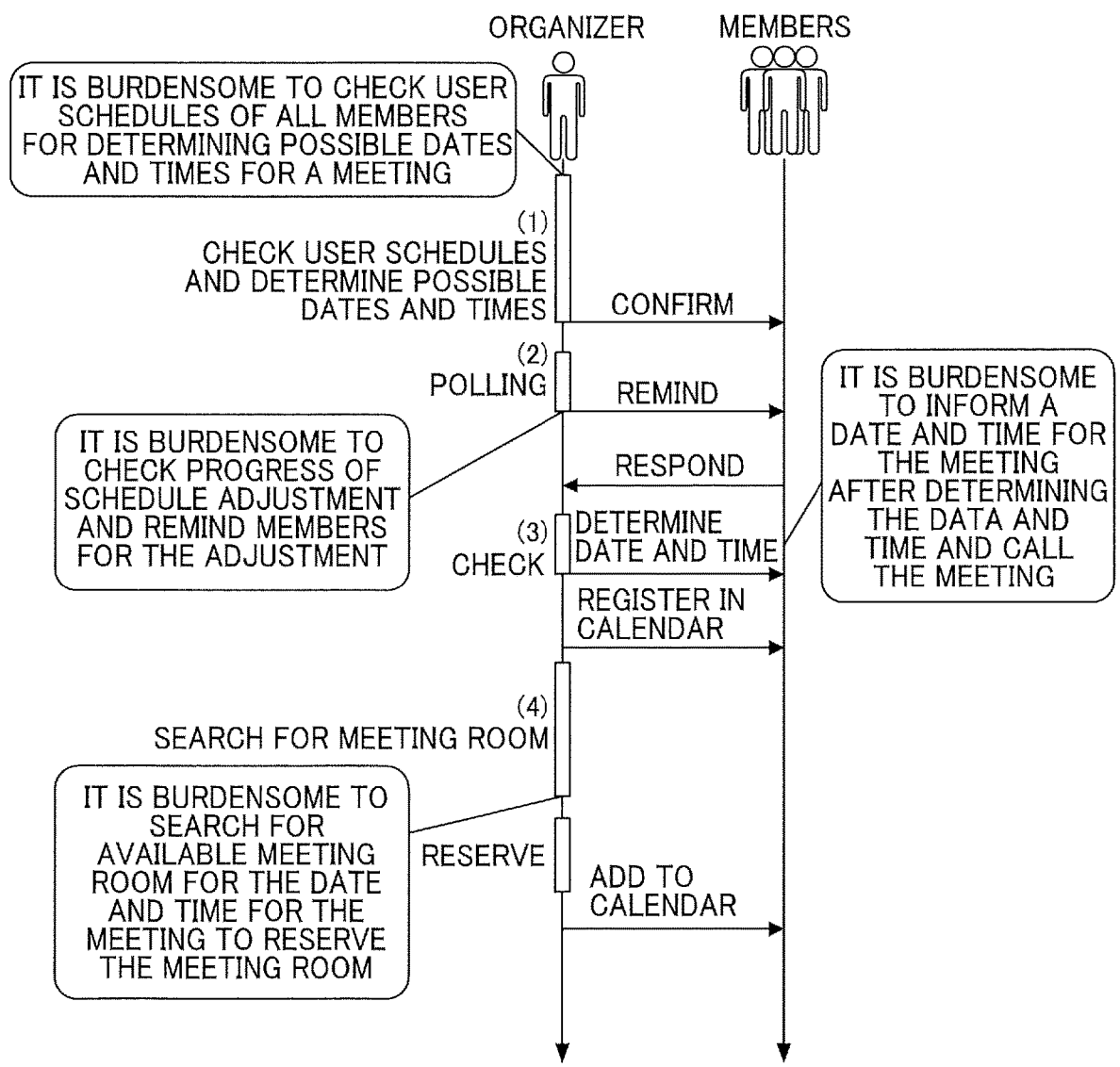
FIG. 1A is a diagram illustrating a procedure for adjusting a schedule and starting using a meeting room according to a comparative example.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a scheduling system, which is also referred to as a resource reservation system and a method of stating using a resource according to an exemplary embodiment of the present disclosure.

Figure 1B:
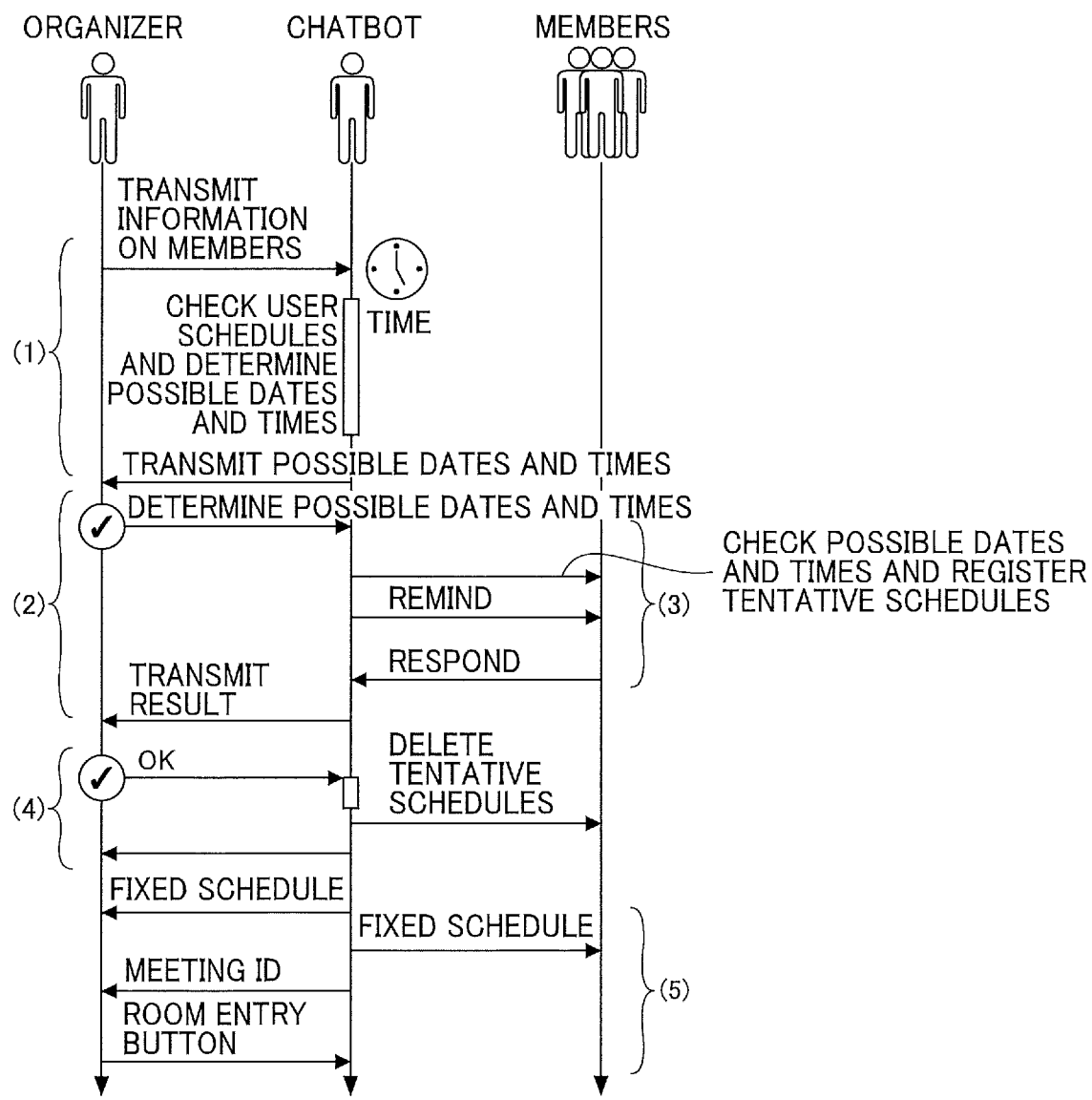
FIG. 1B is a diagram illustrating a procedure for adjusting a schedule and starting using a meeting room according to one or more embodiments of the present disclosure.

Check-in Procedure:

With reference to FIG. 1A and FIG. 1B, an overview of a process relating to starting using a meeting room is described. FIG. 1A is a diagram illustrating a procedure for adjusting a schedule according to a comparative example, and FIG. 1B is a diagram illustrating a procedure for adjusting a schedule according to an exemplary embodiment of the present disclosure. The procedure for adjusting a schedule according the comparative example is described below.

(1) A user who schedules an event such as a meeting, or adjust a schedule for an event such as a meeting, (hereinafter, the user is referred to as an organizer) checks user schedules (work schedules) of other users who are to participate in the meeting (hereinafter, the users referred to as invited members) and decides one or more possible dates and times for the schedule (meeting). However, it is not easy to check the user schedules of all the invited members and decide the possible dates and times for the schedule.

(2) In addition, checking progress of the adjustment after notifying the invited members of the possible dates and times for the schedule by e-mail is a burden on the organizer.

(3) Registering one of the possible dates and times for the schedule to the user schedules of the invited members after obtaining confirmation of the one of the possible dates and times is a burden on the organizer.

(4) In addition, searching for an available meeting room for a date and time for which confirmation, or agreement, is obtained and reserving the meeting room is not easy as well.

The procedure of adjusting a schedule according the present embodiment is described below. In the present embodiment, a chatbot that cooperates with a reservation management server assists to adjust a schedule like a secretary.

(1) The organizer notifies the chatbot of users who are to participate in a meeting (invited members). The chatbot checks the user schedules of all the participants and determines one or more possible dates and times for the meeting to be scheduled. There are some meetings that requires to use meeting rooms and other meetings that do not require to use meeting rooms. When the meeting to be scheduled is one that requires to use a meeting room, the chatbot also takes into account an availability of a meeting room.

(2) The organizer selects one or more from the possible dates and times for the meeting to be scheduled, which are suggested by the chatbot, and notifies the chatbot of the selected one or more possible dates and times for the meeting to be scheduled.

(3) The chatbot presents a plurality of possible dates and times including the selected one or more possible dates and times for the meeting to be scheduled to the invited members and checks the progress of the adjustment as appropriate. The chatbot temporarily schedule with the plurality of possible dates and times for the meeting as tentative schedules.

(4) After each of the users sends a desired scheduled date and time, the chatbot determines, as a fixed schedule, one from the tentative schedules by majority vote, for example. In addition, the chatbot deletes the other tentative schedules than one determined as the fixed schedule (cancel the other tentative schedule to make corresponding times open).

(5) The chatbot transmits the determined schedule (fixed schedule) to the organizer and the invited members. In addition, the chatbot transmits meeting identification information to the organizer and the invited members at a predetermined time before a reservation start time. The predetermined time may be set or designed by a user, such as the organizer, or designer. For example, the predetermined time may be set ten minutes before the meeting start time. The meeting identification information includes a button for entering a corresponding room (hereinafter, the button may be referred to as a room entry button) is displayed in the meeting identification information, and when the organizer or an invited member presses the button for entering the room, the meeting identification information is transmitted to the chatbot. The chatbot transmits the meeting identification information to the meeting management server that manages the reservations for meeting rooms, and then the organizer or the invited member checks in to the meeting room.

As described above, the resource reservation system according to the present embodiment transmits the meeting identification information to the organizer and the invited members and allows the organizer and the invited members to check in to the meeting room when one of the organizer and the invited members presses the room entry button. That is, the organizer or an invited member is not required to enter information for authentication.

Figure 2:
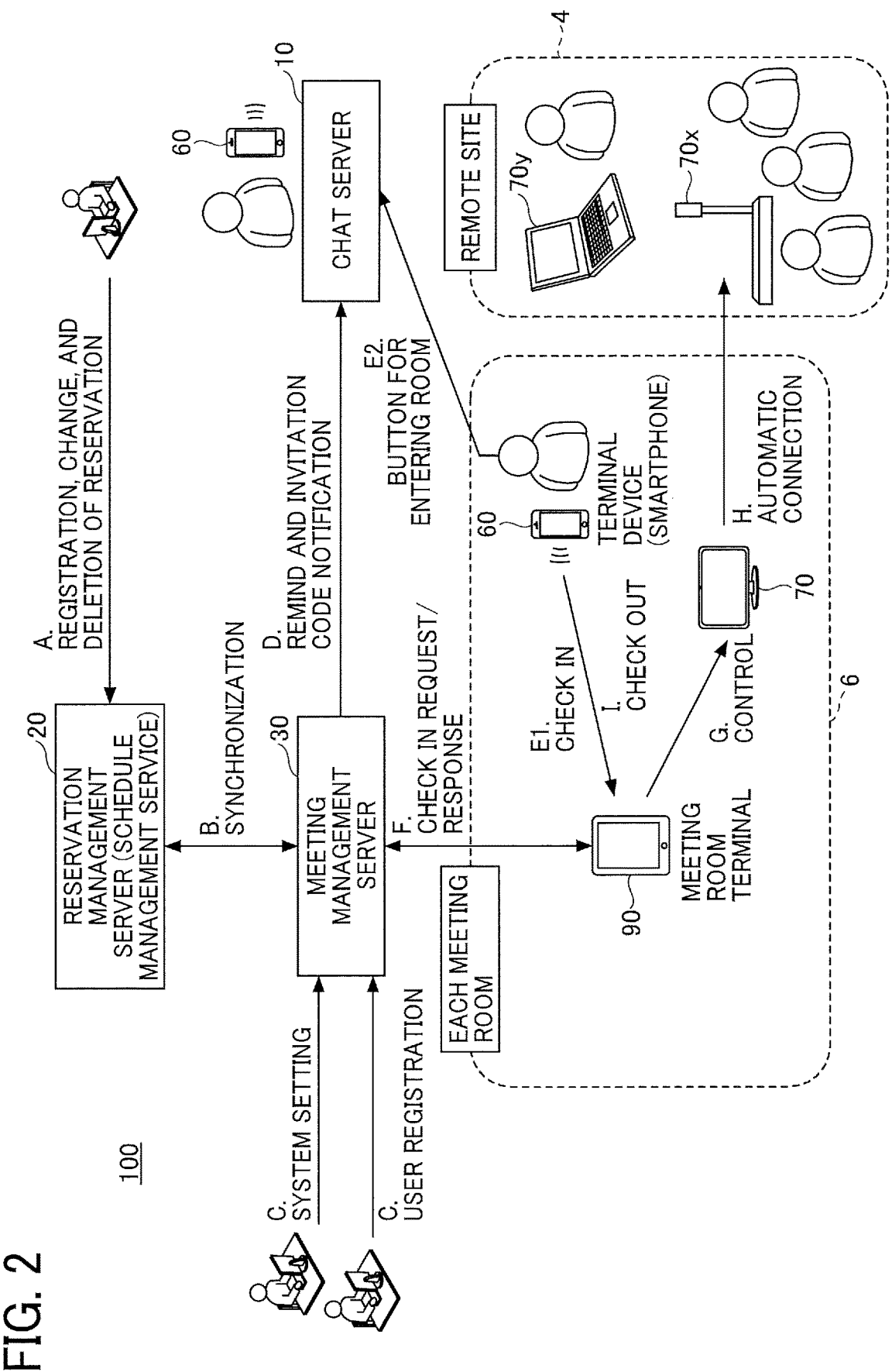
FIG. 2 is a diagram illustrating an overview of operation performed by a resource reservation system, according to one or more embodiments of the present disclosure.

Overall Operation of Resource Reservation System:

A description is given below of an overview of a resource reservation system 100 with reference to FIG. 2. The resource reservation system 100 may be referred to as a scheduling system 100 or a booking system 100 in the description of embodiments of the disclosure. FIG. 2 is a schematic diagram illustrating overall operation of the resource reservation system 100 according to the present embodiment.

A. A user who is to make a reservation (reservation-making user) operates his or her terminal device 60 to use a chatbot to communicate with a reservation management server (schedule management server) 20, whereby reserving a meeting room. The user may make a reservation without using a chatbot. In a case of such as a remote conferencing that is not required to use a meeting room, a meeting room is not to be reserved. The reservation management server 20 is a general-purpose cloud service such as OFFICE 365 (registered trademark) and G SUITE (registered trademark) and a meeting room owned by an organization such as a company to which the reservation-making user belongs is registered.

B. A meeting management server 30 is a server that controls entire operation of the resource reservation system 100 based on reservation status of the meeting rooms. The meeting management server 30 communicates with the reservation management server 20 at suitable timings to acquire reservation information, in order to synchronize the reservation information between the meeting management server 30 and the reservation management server 20.

C. An administrator or the like of the organization or the resource reservation system 100 performs user registration and configures various settings to the meeting management server 30. For example, the user registration refers to registering a user to whom various notifications are to be transmitted by a chat server 10 such as Slack (registered trademark), Line (registered trademark), and Microsoft Teams (registered trademark). Further, since the notifications are transmitted as messages using a chatbot that serves as the meeting management server 30, the chatbot provided by the chat server is also registered. Examples of the various settings configured by the administrator or the like to the meeting management server 30 include registration of a meeting room terminal 90 (initial setting described later) and a setting of a time when a reminder is to be transmitted.

D. When the current time is a predetermined time period before the start time of a meeting defined in the reservation information, the meeting management server 30 sends a reminder of the scheduled meeting to the user who made the reservation. This reduces or prevents the empty reservation. The "empty reservation" refers to reserving resources such as the meeting room that is not actually to be used. Further, the meeting management server transmits a notification indicating an invitation code to the user as needed. The reservation-making user receives the reminder, and then stores, in the terminal device 60, information (meeting identification information) for checking in the meeting room. Check-in, or to check in refers to notifying the meeting management server 30 of the start of use of the meeting room and obtaining permission.

E1. A meeting room terminal 90 is provided in or around each meeting room 6, and the meeting room terminal 90 downloads reservation information for a meeting held in the meeting room on a regular basis. The meeting room terminal 90 displays a schedule of the meetings to be held on the current day or a schedule of an upcoming meeting, thereby allowing participants of the meeting to confirm the schedule. The reservation-making user for the meeting room enters the meeting room 6 a little before the start time of the meeting to check in. For example, the reservation-making user checks in by inputting the meeting identification information (information for authentication) to the meeting room terminal 90, or by holding the terminal device 60 over the meeting identification information (in order to read the meeting identification information, or make the terminal device 60 be able to communicate, etc.).

E2. As another check-in method, there is a method in which the user operates the terminal device 60. The user presses a button for entering a room. The button is displayed when the meeting identification information is transmitted to the terminal device 60.

F. In the case of E1, the meeting room terminal 90 transmits the check-in request to the meeting management server 30. When authentication with the meeting identification information is successfully performed, the meeting room terminal 90 receives from the meeting management server 30 a response indicating that the check-in has succeeded. In the case of E2, the meeting identification information is transmitted to the meeting management server 30 via the chat server 10 together with a corresponding meeting room identification (ID). In each of cases, the same process is performed after the authentication by using the meeting identification information is performed.

The meeting room terminal 90 displays that the meeting room is in use (in session). In a case where the meeting management server 30 does not confirm a use start notification indicating the check-in by a preset time before or after the start time of the meeting, the meeting management server 30 automatically cancels the reservation of the meeting room 6. In other words, the meeting management server 30 cancels the reservation information when the use of the meeting room is not started for a preset time period. Further, the meeting management server 30 transmits, to the meeting room terminal 90, information indicating the reservation is canceled as status included in the reservation information. In this case, since the meeting room terminal 90 displays information indicating that the meeting room is vacant, any user can use the meeting room 6.

G. The meeting room terminal 90 controls the electronic device 70 in response to a request from the meeting management server 30. For example, the meeting room terminal 90 controls the electronic device 70 so that the power is turned on at the start time of the meeting and turned off at the end time of the meeting. This improves convenience for the meeting participants in operating the electronic device 70.

H. When the electronic device 70 includes, for example, a videoconferencing function, the electronic device 70 communicates with an electronic device such as a videoconferencing terminal 70x at a remote site 4 to conduct a meeting (video meeting). Note that a personal computer (PC) 70y on which an application operates can also communicate with the electronic device 70. The reservation information includes destination information (communication identifier (ID) of a communication destination) indicating the remote site 4 in advance. The electronic device 70 automatically communicates with the videoconferencing terminal 70x and the PC 70y by using the destination information.

I. When the reservation-making user ends the meeting, the user presses a button of the meeting room terminal 90 to check out. The meeting room terminal 90 displays the next reservation status. This allows any user to check the reservation status of the meeting room. Check-out or to check out refers to notifying the meeting management server 30 of the end of use of a meeting room.

Regarding Terms:

A "resource" refers to any resource owned, rented, or managed by an organization or the like. Organizational resources include, for example, meeting rooms, equipment, apparatuses, people (groups), company cars, bicycles, parking lots and bicycle parking lots, free addresses, desks, booths, remote meeting systems, printing services, and mechanisms. From among the resources, a resource that is difficult to move is referred to as a "facility". In the description of the present embodiment, for the sake of explanatory convenience, the term "meeting room" is used as an example of the resource. In addition, as examples of resources outside the organization, various electronic devices, parking lots, rental offices, rental studios, rental cycles, rental cars (sharing cars), accommodation facilities such as hotels, various facilities such as entertainment venues, rental lockers, and rental spaces may be included.

The "reservation-making user" is a person who reserved a meeting room and an organizer of a meeting in the present embodiment. A "participant" is a person who participants in a meeting, or a conference. The participants include an organizer of a meeting and invited members who are invited to participate in the meeting. Persons who use a meeting room are simply referred to as users.

A "reservation" is an arrangement set in advance to use a resource. "Reservation information" is information on a reservation. A "schedule" also means an event (scheduled event, registered event) or an activity (scheduled activity, registered activity) that is fixed by making a reservation. Therefore, a reservation may be referred to as a schedule. A "schedule" may include a schedule for a day.

In addition, a "schedule" also includes one or more time frames (time zones) indicating a detailed plan on a time basis, such as a timeline, or includes a list indicating times when things happen, such as a timetable. In other words, a "schedule" may be defined as a plan registered on a time basis. However, it is difficult to differently use some of the terms, such as schedule, reservation, and plan, in Japanese. Therefore, appropriate meaning of each term may be judged by the context that includes the corresponding term.

A tentative reservation (tentative schedule) is the same as a usual reservation (schedule, or scheduled event). That is, the reservation management server 20 does not distinguish between a reservation (schedule) and a tentative reservation (tentative schedule. In the present embodiment, the term, tentative reservation, is used because the reservation may be deleted later.

A bot is an application (program) that executes an automated task. When a user inputs text or voice, the bot analyzes the content and presents information according to a task. The bot also accepts text or voice input by the user and executes tasks.

Figure 3:
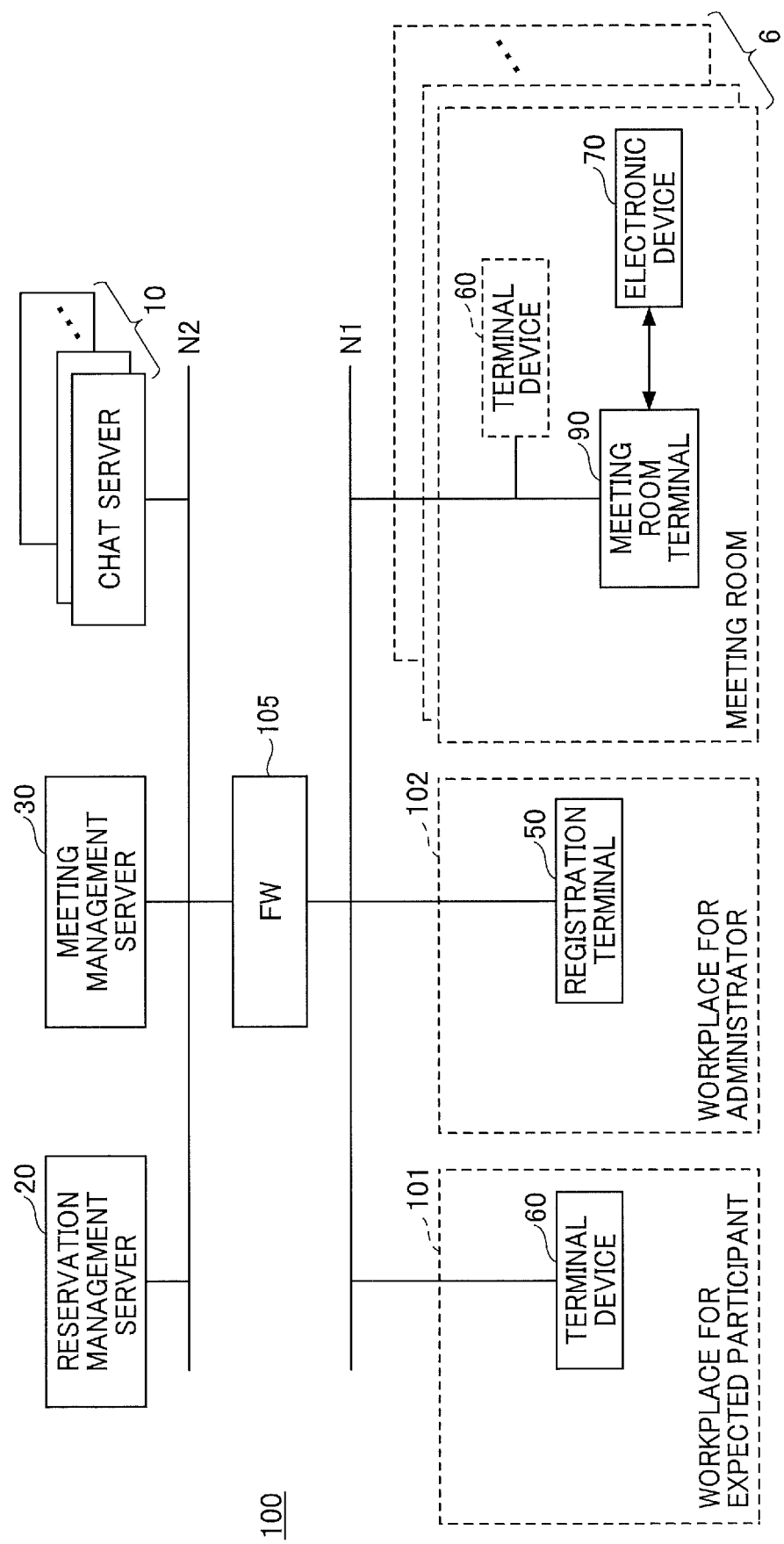
FIG. 3 is a diagram illustrating an example of a system configuration of a resource reservation system according to one or more embodiments of the present disclosure.

Example of System Configuration:

FIG. 3 is a diagram illustrating an example of a system configuration of the resource reservation system 100. The resource reservation system 100 may be mainly divided into an external network N2 and an intra-company network N1. The intra-company network N1 refers to an internal network, which is a network inside a firewall 105, and the external network N2 is a network such as the Internet through which unspecified volume of communication is transmitted.

The reservation management server 20, the meeting management server 30, and one or more chat servers 10 are connected to the external network N2. The servers communicate with one another as needed. The terminal device 60 operated by the participant of the meeting may be connected to the external network N2 as needed.

The reservation management server 20 is implemented by one or more information processing devices, each being installed with a general-purpose server operating system (OS) or the like (an example of a different information processing device). A system provided by the reservation management server 20 and related to the reservation for each resource is referred to as a reservation management system. The reservation management server 20 includes a calendar system and provides a web application for managing various schedules. Specifically, the web application provides the following functions, for example. To accept schedule registration and enable the reservation-making user to confirm the reservation from anywhere at any time.

To send a reminder email at the preset date and time, such as 30 minutes before the scheduled time.

To enable one person to manage schedules using plural calendars (for business, for private, etc.).

To share a calendar with users belonging to the same group.

The reservation management server 20 manages the users by accounts. The account refers to a right of a user to use a service. In many systems, the user logs in to a system using the account. For this reason, the account has a function (function of identification information) to enable the system to uniquely identify the user. In the present embodiment, the reservation management server 20 transmits reservation information of the account (domain) registered in advance to the meeting management server 30. Alternatively, the meeting management server 30 requests the reservation information by specifying the account of the reservation management server 20, to acquire the reservation information associated with the meeting room 6 from the reservation management server 20. The account may be any suitable information that uniquely identifies a user. Examples of the account include an email address, an ID, and a telephone number.

Although in the present embodiment, the reservation management server 20 manages the reservation of each meeting room 6 as a schedule, the reservation management server 20 is configured to manage various types of schedules in addition to the reservation of each meeting room 6. The reservation management server 20 may be used for reservations for various types of resources other than each meeting room 6, such as a reservation for rental of various electronic devices, a reservation for a parking lot, a rental office, a rental studio, a rental bicycle, a rental car, accommodation facilities such as hotels, a rental space such as event venues and lockers.

Although G SUITE (registered trademark), OFFICE 365 (registered trademark), and the like are known as reservation management systems, any other suitable reservation management system having functions described in the present embodiment will suffice.

Further, in the present embodiment, information on the one or more meeting rooms 6 within the intra-company network N1 is registered in advance in the reservation management server 20. In other words, the web application of the reservation management server 20 is customized according to a meeting room name, a meeting room ID, a reservation available time, a capacity, a unit of reservation and the like of each meeting room 6 residing within the intra-company network N1 of a company using the resource reservation system 100. Accordingly, each meeting room 6 of the company using the resource reservation system 100 is associated with the reservation information.

The chat server 10 is implemented by one or more information processing devices (computer system), each being installed with a general-purpose server OS or the like. A sharing system provided by the chat server 10 for sharing information such as text, audio and video between plural users is referred to as a chat system. The chat server 10 notifies the terminal device 60 of the information on the reservation of the meeting room 6. In the present embodiment, a plurality of chat servers 10 operated by different entities may be included.

The information to be shared includes image data, audio data, etc., in addition to text. In the present embodiment, a description is given of an example case in which text is mainly used for the notification, for the sake of explanatory convenience. For example, the chat system may provide a voice chat function through which members in a group have a communication with each other. The voice chat can be a one-to-one voice chat or a one-to-N voice chat, where N≥2. In other words, according to the present embodiment, the chat system notifies the information about the reservation of the meeting room 6 by outputting a voice message, in addition to or in alterative to, displaying text. LINE (registered trademark), Slack (registered trademark), Microsoft Teams (registered trademark) and the like are known as chat systems, but any chat system having a capability of transmitting notification to one or more users from a chatbot (a program that executes predetermined processes) will suffice.

The chat server 10 also manages a user by using an account. The meeting management server 30 is not basically required to recognize the account of the chat server 10. However, the meeting management server 30 can transmit a notification by specifying a desired account of the chat server 10.

The meeting management server 30 is implemented by one or more information processing devices, each being installed with a general-purpose server OS or the like (an example of second processing device). As a process relating to the external network N2, the meeting management server 30 acquires the reservation information of the meeting room 6 from the reservation management server 20. Further, the meeting management server 30 acquires an expected participant set in the reservation information and transmits a notification to the group of the chat server 10 (or to an individual user such as a reservation-making user) associated with the acquired expected participant at a preset time. As a process relating to the intra-company network N1, the meeting management server 30 manages a check-in and a check-out to and from the meeting room 6. Further, the meeting management server 30 turns on or off the electronic device 70, based on the reservation information associated with the meeting room 6 acquired from the reservation management server 20.

An expected participant can access the external network N2 through the intra-company network N1 from various locations such as the meeting room 6, a workplace 101 for an expected participant, a workplace 102 for an administrator, and the like in the intra-company network N1. Examples of the intra-company network N1 include a local area network (LAN). The meeting room 6, the workplace 101 for an expected participant, and the workplace 102 for an administrator are not necessarily in the LAN of the same company.

The meeting room 6 is equipped with the meeting room terminal 90 and the electronic device 70. The meeting room terminal 90 and the electronic device 70 may communicate with each other through a small-scale LAN or a dedicated line. The electronic device 70 may connect to the intra-company network N1 and the external network N2 without intervening the meeting room terminal 90. The meeting room terminal 90 and the electronic device 70 may communicate with each other either wirelessly or by wire. Since the intra-company network N1 is inside the firewall 105, it is difficult to perform direct communication from the external network N2 to the intra-company network N1.

The meeting room terminal 90 is an information processing terminal operated by a meeting participant who uses the meeting room 6, such as the reservation-making user of the meeting. The meeting room terminal 90 is a reception terminal that receives the use of the meeting room. For example, the meeting room terminal 90 is provided on a table or a desk in the meeting room 6 or at an entrance of the meeting room 6. The meeting room terminal 90 may be provided around a resource, namely within a range of a certain distance from the resource. A plurality of the meeting room terminals 90 may be provided in one meeting room 6. The meeting room terminal 90 is implemented by one or more information processing devices (computer system), each being installed with a general-purpose OS or the like.

For example, the meeting room terminal 90 transmits the meeting room ID to the meeting management server 30 and displays the reservation information associated with the meeting room 6, for the current day. Furthermore, the meeting room terminal 90 acquires control information such as turning on or off the electronic device 70 from the meeting management server 30. The meeting room terminal 90 turns on or off the electronic device 70 using the acquired control information.

The meeting room terminal 90 displays a standby screen for receiving an instruction for check-in, check-out, etc. Further, the meeting room terminal 90 communicates with the meeting management server 30, to notify the meeting management server 30 of the check-in or the check-out. In response to receiving the instruction for check-in, the meeting room terminal 90 transmits, to the meeting management server 30, meeting identification information that is input by the reservation-making user and a meeting room ID that is stored in the meeting room terminal 90 in advance. Based on the meeting identification information and the meeting room ID transmitted from the meeting room terminal 90, the meeting management server 30 can confirm that the user who made the reservation for the meeting room 6 uses the reserved meeting room 6.

The electronic device 70 is any office device that may be used in the meeting room 6. Examples of the electronic device 70 include an electronic whiteboard, a multifunction peripheral, a projector, a digital signage, and a digital camera. The electronic whiteboard includes a large-sized display that supports a touch panel system. The electronic whiteboard detects coordinates of a point pointed by the user on a board surface and displays a stroke by connecting the coordinates of the points. In addition, the electronic whiteboard capable of displaying an image based on data output from a PC that is connected to the electronic whiteboard. Further, the electronic whiteboard capable of communicating with other electronic whiteboard located in a remote site to share the displayed stroke in a synchronous manner. The electronic whiteboard may be referred to as an electronic information board, etc.

The multifunction peripheral includes multiple functions such as a copier function, a scanner function, a printer function, and/or a facsimile transmitting/receiving function. The multifunction peripheral is used for printing or copying documents, scanning documents for conversion to digital data, and faxing documents during the meeting. The projector is a device that projects an image. For example, the projector projects an image (still image or moving image) displayed on a display of the terminal device 60 onto a screen, etc., to enable the participants to share the image. The digital signage is a large-sized display and is used for displaying any still images or moving images. The digital camera is used by each participant to capture an image formed on paper documents or presentation materials displayed on the electronic whiteboard for storage.

The terminal device 60 that is connectable to the intra-company network N1 is provided in the workplace 101 for an expected participant. The terminal device 60 may communicate by wire or wirelessly. The terminal device 60 is an information processing device used when an expected participant (including a reservation-making user) reserves a meeting room. The expected participant (including the reservation-making user) may also use the terminal device 60 in the meeting room. In other words, the terminal device 60 is an information processing device carried by the expected participant.

The terminal device 60 is implemented by one or more information processing devices (computer system), each being installed with a general-purpose OS or the like. Examples of the terminal device 60 include a smartphone, a tablet terminal, a PC, a personal digital assistant (PDA), a wearable PC such as smart glasses and a smartwatch. Further, the terminal device 60 may be any suitable device, terminal, or apparatus, provided that the device, terminal, or apparatus includes a communication capability and browser software, or application software dedicated to the chat server 10 or the reservation management server 20 operates on the device, terminal, or apparatus. For example, the terminal device 60 may be a car navigation system, a game machine, a television receiver, and the like.

In the terminal device 60, application software dedicated to the chat server 10 and application software dedicated to the resource reservation system 100 operates. The application software dedicated to the chat server 10 is referred to as a "chat application" hereinafter. The application software dedicated to the resource reservation system (scheduling system) 100 is referred to as a "meeting application" hereinafter. Browser software may be substituted for either one or both of the chat application and the meeting application.

A registration terminal 50 capable of connecting to the intra-company network N1 is provided in the workplace 102 for administrator. The registration terminal 50 may communicate by wire or wirelessly. The registration terminal 50 is a display terminal for the administrator to make initial settings in the meeting room terminal 90.

The registration terminal 50 is implemented by the similar or substantially the similar information processing apparatus(es) that is implemented as the terminal device 60. However, since the registration terminal 50 is used mainly by an administrator for configuring settings to the meeting management server 30, the chat application and the meeting application can be omitted from the registration terminal 50. The registration terminal 50 communicates with the meeting management server 30 mainly by browser software and displays a web page.

Figure 4:
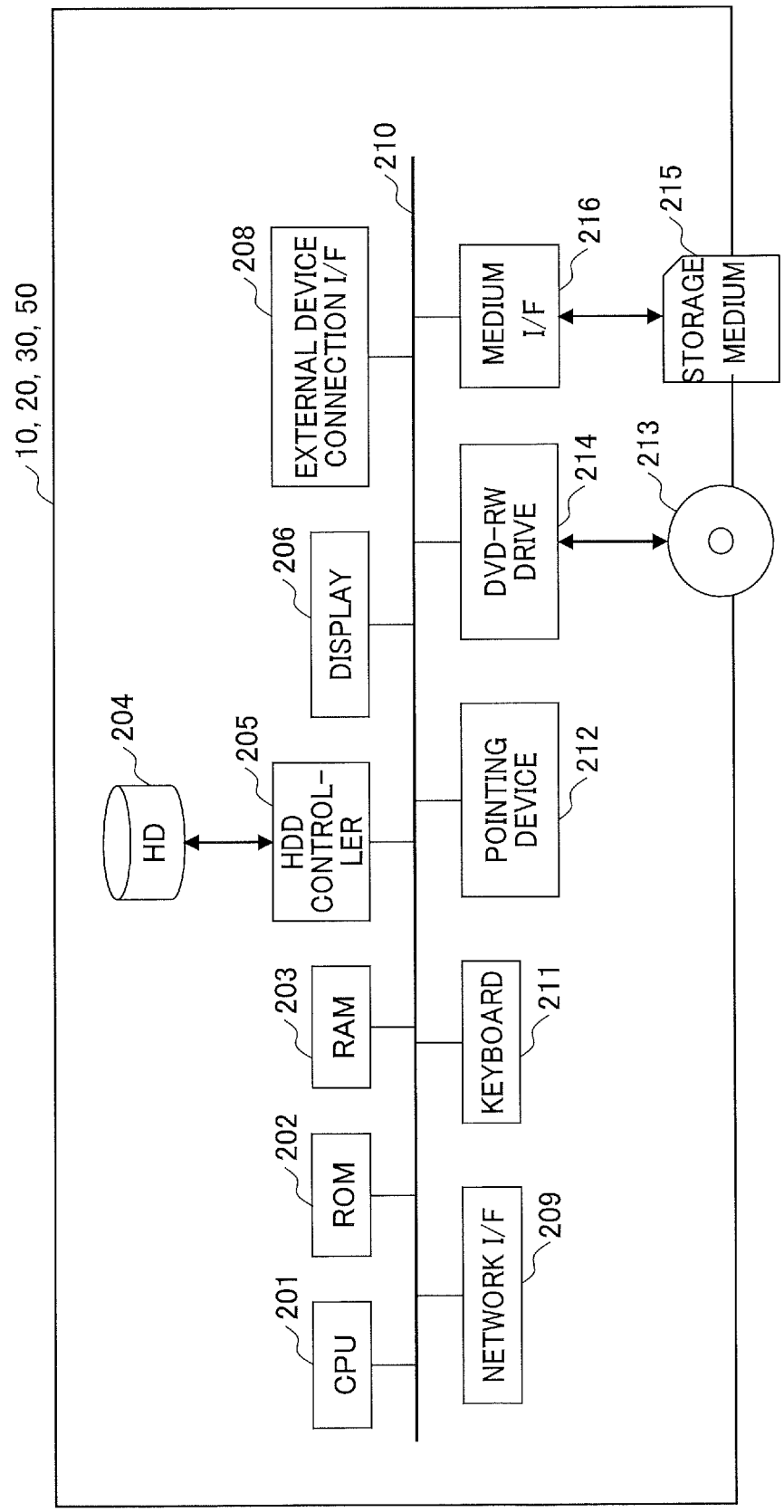
FIG. 4 is a diagram illustrating a hardware configuration of an example of a computer system according to one or more embodiments of the present disclosure.

Hardware Configuration:

Hardware Configuration of Meeting Management Server, Reservation Management Server, Chat Server, or Registration Terminal:

Each of the meeting management server 30, the reservation management server 20, the chat server 10, and the registration terminal 50 is implemented by, for example, a computer system having a hardware configuration illustrated in FIG. 4. FIG. 4 is a diagram illustrating a hardware configuration of an example of the computer system according to the present embodiment.

As illustrated in FIG. 4, the computer system is implemented by a computer, and includes a central processing unit (CPU) 201, a read only memory (ROM) 202, a random access memory (RAM) 203, a hard disk (HD) 204, a hard disk drive (HDD) controller 205, a display 206, an external device connection interface (I/F) 208, a network I/F 209, a bus line 210, a keyboard 211, a pointing device 212, a digital versatile disc rewritable (DVD-RW) drive 214, and a medium I/F 216.

Among these elements, the CPU 201 controls entire operation of the computer system. The ROM 202 stores a program used for driving the CPU 201 such as an initial program loader (IPL). The RAM 203 is used as a work area for the CPU 201. The HD 204 stores various data such as a control program. The HDD controller 205 controls reading and writing of various data from and to the HD 204 under control of the CPU 201. The display 206 displays various information such as a cursor, menu, window, character, or image. The external device connection I/F 208 is an interface for connecting various external devices. The external device in this case is, for example, a universal serial bus (USB) memory or a printer. The network I/F 209 is an interface that controls communication of data through a communication network. The bus line 210 is an address bus, a data bus or the like, which electrically connects the elements in FIG. 4 such as the CPU 201.

The keyboard 211 is an example of an input device provided with a plurality of keys for allowing a user to input characters, numerals, or various instructions. The pointing device 212 is an example of an input device that allows a user to select or execute a specific instruction, select a target for processing, or move a cursor being displayed. The DVD-RW drive 214 reads and writes various data from and to a DVD-RW 213, which is an example of a removable recording medium (removable storage medium). The removable recording medium (removable storage medium) is not limited to the DVD-RW and may be a digital versatile disk-recordable (DVD-R) or the like. The medium I/F 216 controls reading and writing (storing) of data from and to a storage medium 215 such as a flash memory.

Figure 5:
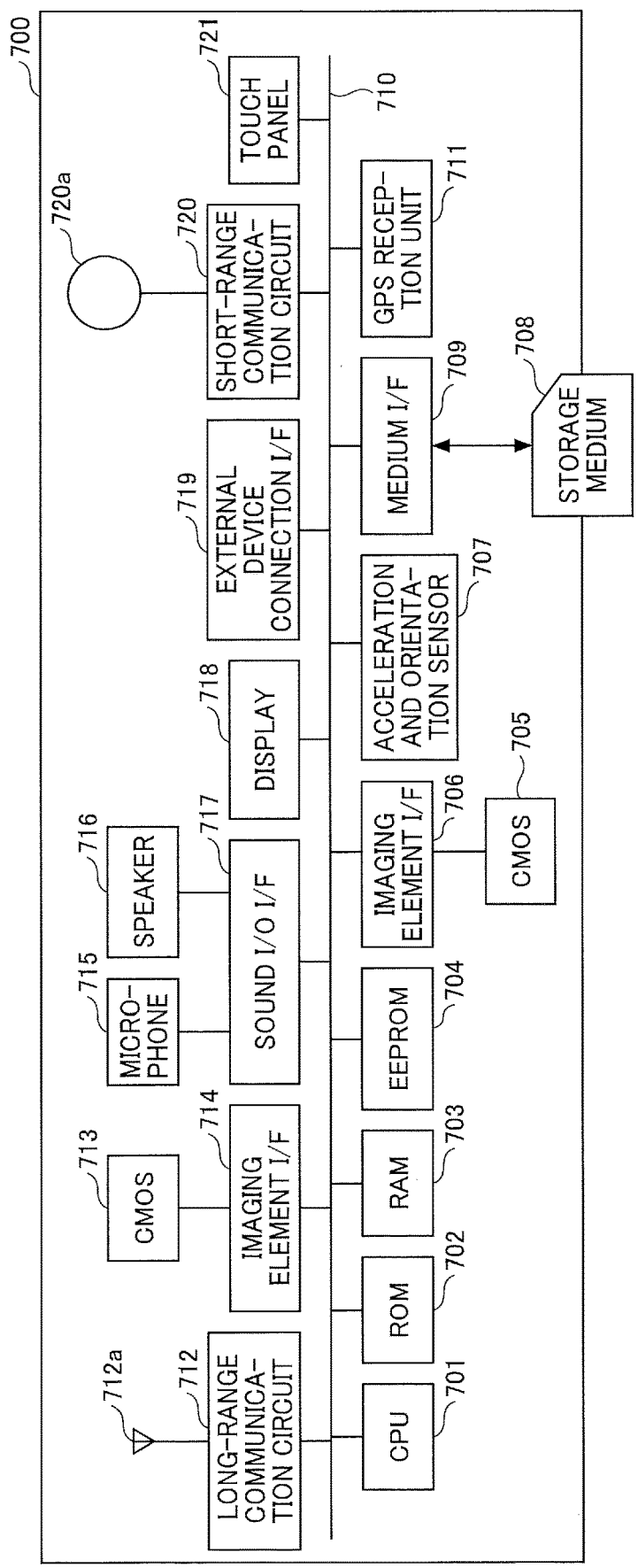
FIG. 5 is a diagram illustrating an example of a hardware configuration of a meeting room terminal or a terminal device according to one or more embodiments of the present disclosure.

Meeting Room Terminal, Terminal Device:

FIG. 5 is a diagram illustrating an example of a hardware configuration of the meeting room terminal 90 or a terminal device 60. The meeting room terminal 90 or the terminal device 60 in FIG. 5 is assumed to be a tablet device or a smartphone.

The meeting room terminal 90 or the terminal device 60 includes a CPU 701, a ROM 702, a RAM 703, an electrically erasable and programmable ROM (EEPROM) 704, a complementary metal oxide semiconductor (CMOS) sensor 705, an imaging element I/F 706, an acceleration and orientation sensor 707, a medium I/F 709, and a global positioning system (GPS) reception unit 711.

The CPU 701 controls the overall operation of the meeting room terminal 90 or the terminal device 60. The ROM 702 stores programs used for driving the CPU 701 such as an initial program loader (IPL). The RAM 703 is used as a work area for the CPU 701. The EEPROM 704 reads or writes various data such as an application under control of the CPU 701. The CMOS sensor 705 is an example of a built-in imaging device that captures an object (mainly, a self-image of a user operating the terminal device 60) under control of the CPU 701 to obtain image data. In alternative to the CMOS sensor, an imaging element such as a charge-coupled device (CCD) sensor may be used. The imaging element I/F 706 is a circuit that controls driving of the CMOS sensor 705. Example of the acceleration and orientation sensor 707 includes an electromagnetic compass or gyrocompass for detecting geomagnetism and an acceleration sensor. The medium I/F 709 controls reading and writing (storing) of data from and to a storage medium 708 such as a flash memory. The GPS reception unit 711 receives a GPS signal from a GPS satellite.

Further, the meeting room terminal 90 or the terminal device 60 includes a long-range communication circuit 712, a complementary metal oxide semiconductor (CMOS) sensor 713, an imaging element I/F 714, a microphone 715, a speaker 716, a sound input and output (I/O) I/F 717, a display 718, and an external device connection I/F 719, a short-range communication circuit 720, an antenna 720a of the short-range communication circuit 720, and a touch panel 721.

The long-range communication circuit 712 is a circuit that allows communication with other devices through a communication network. The CMOS sensor 713 is an example of a built-in imaging element that captures an object (mainly, a self-image of a user operating the terminal device 60) under control of the CPU 701 to obtain image data. In alternative to the CMOS sensor, an imaging element such as a charge-coupled device (CCD) sensor may be used. The imaging element I/F 714 is a circuit that controls driving of the CMOS sensor 713. The microphone 715 is a built-in circuit that converts sound into an electric signal. The speaker 716 is a built-in circuit that generates sound such as music or voice by converting an electric signal into physical vibration. The sound I/O I/F 717 is a circuit for inputting or outputting an audio signal between the microphone 715 and the speaker 716 under control of the CPU 701. The display 718 is an example of a display device that displays an image of the object, various icons, etc. Examples of the display 718 include a liquid crystal display (LCD) and an organic electroluminescence (EL) display. The external device connection I/F 719 is an interface for connecting various external devices. The short-range communication circuit 720 is a communication circuit that communicates in compliance with the near field communication (NFC), the Bluetooth (Registered Trademark), and the like. The touch panel 721 is an example of an input device that allows a user to operate the meeting room terminal 90 by touching a screen of the display 718.

Further, the meeting room terminal 90 or the terminal device 60 includes a bus line 710. Examples of the bus line 710 include, but not limited to, an address bus and a data bus, which electrically connects the components illustrated in FIG. 5 such as the CPU 701.

Figure 6:
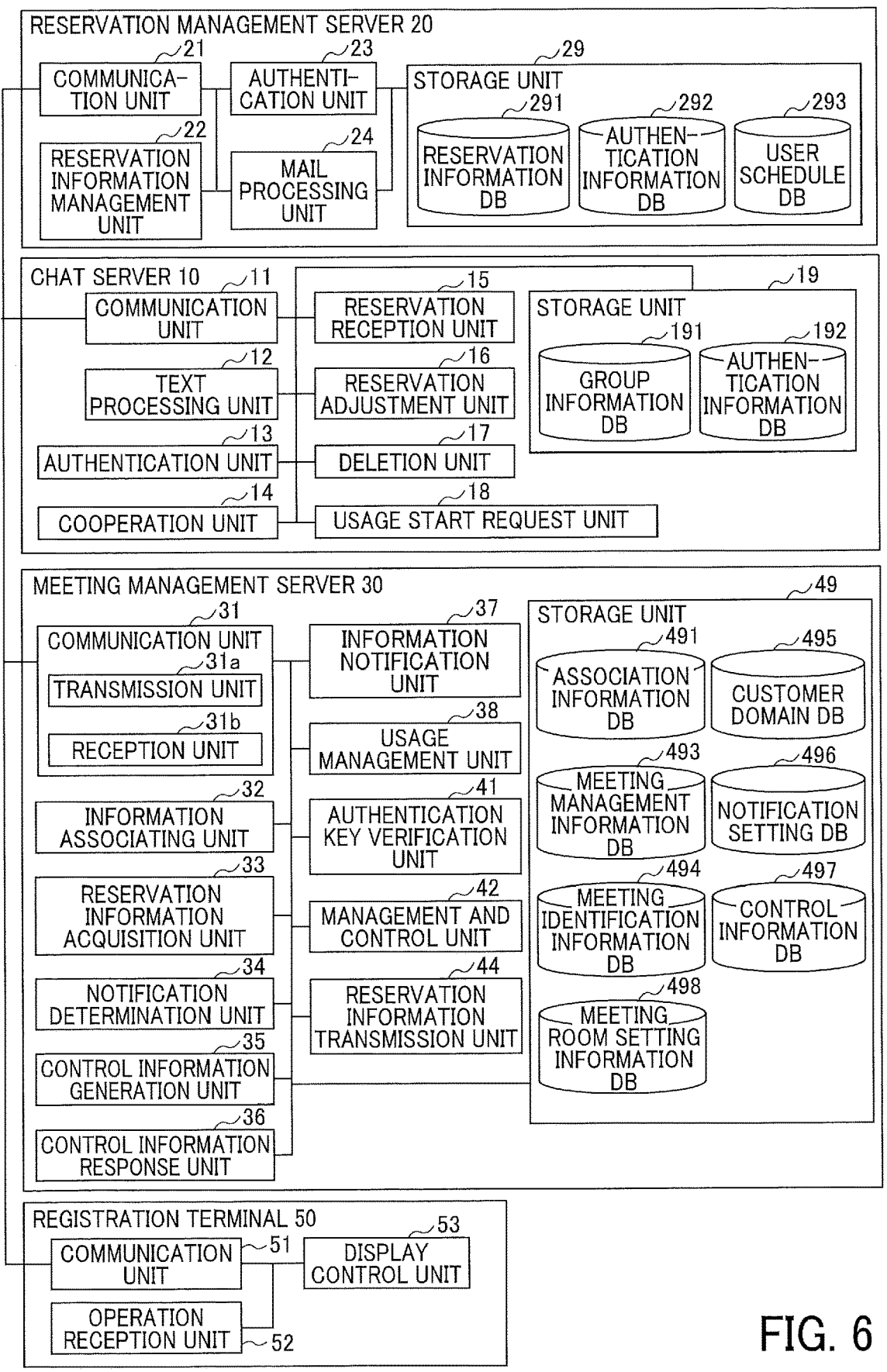
FIG. 6 is a block diagram illustrating functional configuration of a reservation management server, a chat server, and a meeting management server according to one or more embodiments of the present disclosure.

Functions:

FIG. 6 is a block diagram illustrating a functional configuration of a reservation management server 20, a chat server 10, a meeting management server 30, and a registration terminal 50 according to the present embodiment.

Reservation Management Server:

The reservation management server 20 includes a communication unit 21, a reservation information management unit 22, an authentication unit 23, and a mail processing unit 24. Each of these functional units included in the reservation management server 20 is a function implemented by operating any of the configuration components illustrated in FIG. 4 by an instruction from the CPU 201 according to a program loaded from the HD 204 to the RAM 203.

The communication unit 21 transmits and receives various types of information to and from the meeting management server 30 and the terminal device 60. In receiving reservations, the communication unit 21 receives some reservations from the terminal device 60 and other reservations from the chatbot. When receiving a reservation from the terminal device 60, the communication unit 21 transmits screen information of a reservation setting screen to the terminal device 60, and receives an authentication request and reservation settings from the terminal device 60. Further, the communication unit 21 transmits reservation information to the meeting management server 30.

The reservation information management unit 22 manages the reservation information registered by a user. The reservation information management unit 22 reads the reservation information associated with the meeting room 6 requested from the meeting management server 30 from a reservation information database (DB) 291 and transmits the reservation information to the meeting management server 30 through the communication unit 21. Alternatively, when the reservation information is registered (or changed), the reservation information is transmitted to the meeting management server 30 even if the request is not received. A general-purpose web application is used to enable a user who is to make a reservation to register a reservation for the meeting room 6 with the reservation management server 20.

The authentication unit 23 authenticates the user based on authentication information (for example, a user identification information (ID) and password) stored in an authentication information DB 292. An integrated circuit (IC) card or biometric authentication information may be used for the authentication.

The mail processing unit 24 transmits an email to the user via a mail server using an email address included in the user account. The mail processing unit 24 further receives an email addressed to a user and provides the email in response to a request from the user. The mail processing unit 24 may have the functions of an outgoing mail server and an incoming mail server.

The reservation management server 20 further includes a storage unit 29. The storage unit 29 is implemented by, for example, the RAM 203, or the HD 204 illustrated in FIG. 4. The storage unit 29 stores a reservation information database (DB) 291, the authentication information DB 292, and a user schedule DB 293.

TABLE 1

Reservation Information DB

| Reservation ID | Reservation-Making User Account | Meeting Name | Meeting Room ID | Start Time | End Time | Expected Participant Account |
|---|---|---|---|---|---|---|
| 001 | a@xfood.com | Product Z Development Meeting | K-001 | 2017 Jul. 7 10:00 | 2017 Jul. 7 12:00 | b@xfood.com c@xfood.com d@xfood.com |
| 002 | e@xfood.com | Product Y Development Meeting | K-001 | 2017 Jul. 7 13:00 | 2017 Jul. 7 14:00 | f@xfood.com g@xfood.com |
| ... | ... | ... | ... | ... | ... | ... |

Table 1 is an example of reservation information stored in the reservation information DB 291. The reservation information is information for managing a reservation status of the meeting room 6. The reservation information includes, for each of reservation IDs, an account of reservation-making user, a meeting name, a meeting room ID, a start time of the meeting, an end time of the meeting, and accounts of expected participants in association with the reservation ID. The reservation ID is identification information for identifying one record of the reservation information. ID is an abbreviation for "identifier," and indicates an identification or identification information. ID is any one of a name, a symbol, a character string, a numerical value, or a combination of at least two of these items, which is used for identifying a particular object from among a plurality of objects. The same applies to other IDs than the reservation ID. The account of the reservation-making user is an account of an expected participant who made a reservation for the meeting room 6. The meeting name is a name of a meeting, which is given by the expected participant in advance. The meeting room ID is identification information for identifying the meeting room 6 that resides on the intra-company network N1. The start time is the beginning of a time slot during which the meeting room 6 is reserved. In other words, the start time is a time when the meeting is to be started. The end time is the end of the time slot during which the meeting room 6 is reserved. In other words, the end time is a time when the meeting is to be ended. The accounts of expected participants are accounts of the invited members who are scheduled to attend the meeting. Each of the accounts in Table 1 is issued by the reservation management server 20. Both the account of the expected participant including the account of the reservation-making user and the account of the invited members are user IDs that identify the users (participants in the meeting).

TABLE 2

Authentication Information DB

| Customer ID | Password | User ID |
|---|---|---|
| G-001 | ********** | a@xfood.com |

Table 2 is an example of authentication information stored in the authentication information DB 292. The authentication information is information for a user (reservation-making user (organizer) or participants (invited members)) to log in to the reservation management server 20. The login information includes a user ID and a password. A successful authentication means that the user ID is valid. The user ID is the same as the account of each participant (the reservation-making user or one of the members). Accordingly, the meeting management server 30 identifies by the user ID, whether the reservation information is of the reservation-making user or of a member.

Figure 8:
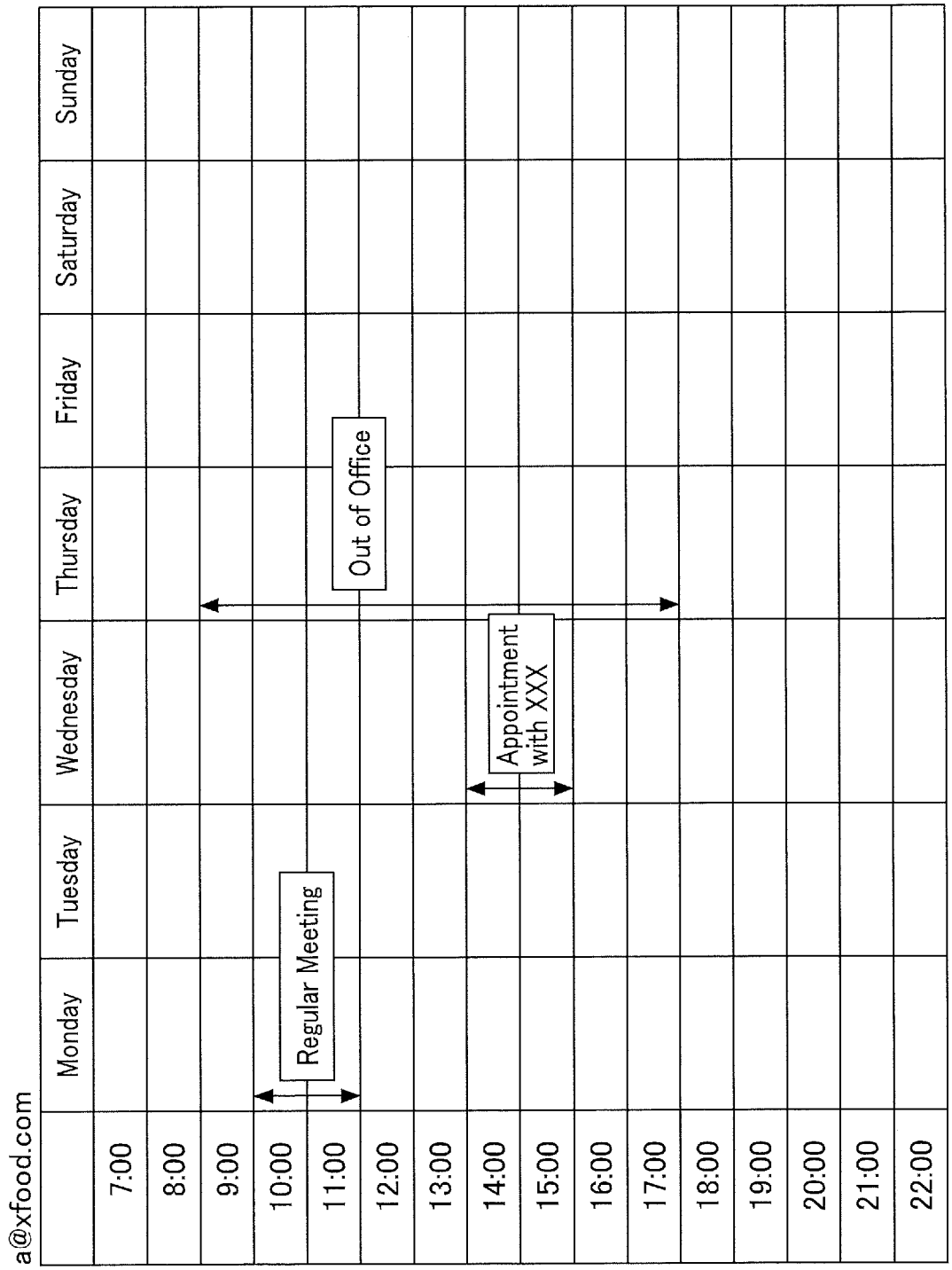
FIG. 8 is a diagram illustrating an example of a user schedule stored in a user schedule database (DB), according to one or more embodiments of the present disclosure.

FIG. 8 is a diagram illustrating an example of a user schedule stored in the user schedule DB 293, according to the present embodiment. The user schedule is a schedule for each user. For example, as the user schedule, a scheduled event and a corresponding start time and an end time are registered on a calendar.

Chat Server:

The chat server 10 includes a communication unit 11, a text processing unit 12, an authentication unit 13, a cooperation unit 14, a reservation reception unit 15, a reservation adjustment unit 16, a deletion unit 17, and a usage start request unit 18. Each of these functional units included in the chat server 10 is a function implemented by operating any of the configuration components illustrated in FIG. 4 by an instruction from the CPU 201 according to a program loaded from the HD 204 to the RAM 203.

The communication unit 11 (an example of first communication unit) transmits and receives various kinds of information to and from the terminal device 60, the reservation management server 20, the meeting management server 30. The communication unit 11 receives information required for registering an event as a scheduled event from the terminal device 60. The communication unit 11 transmits to the reservation management server 20 the information required for registering the event as a scheduled event. The communication unit 11 further receives, from the meeting management server 30, information related to reservation of a meeting room, information for identifying the chatbot, and information for identifying a group as a notification destination. Examples of the information for identifying the bot include a token, which is described later. The information for identifying the chatbot is notified in advance as identification information for identifying the chatbot from the chat server 10, when the chatbot of the meeting management server 30 is generated. Further, the communication unit 11 may receive information specifying an account of an individual such as a user who made the reservation. In addition, the communication unit 11 transmits, to the meeting management server 30, information indicating that an expected participant has checked the reservation of the meeting room. The communication unit 11 further transmits to the meeting management server 30, a response from an expected participant who has checked the information on the screen. The response is related to the information on the reservation of the meeting room.

The text processing unit 12 transmits, to the expected participants belonging to the group, information on the reservation of the meeting room 6, based on the information transmitted from the meeting management server 30, i.e., the information identifying the chatbot and the information identifying the group as a notification destination. The information transmitted by the text processing unit 12 appears as information provided by the chatbot. In one example, the number of notifications transmitted by the text processing unit 12 is equal to the number of the expected participants. In another example, the notification is transmitted only to the reservation-making user or only to user(s) registered as a notification destination. In addition, information on the reservation of the meeting room 6 is transmitted only to a specific notification destination.

The text processing unit 12 may transmit the notification as a so-called "push notification". An example of a mechanism implementing the push notification is as follows. The chat application 60*a* receives an ID (token) for a push notification from a server operated by a manufacturer of an OS. The server associates the token with a device (terminal device 60). The chat application 60*a* registers the token and an account of the chat application 60*a* in the chat server 10.

Since the chat server 10 identifies an account of the chat application 60*a* when sending a push notification, the token associated with the account is identified. The chat system designates the token and transmits a notification content to the server operated by the manufacturer of the OS. The server sends a push notification to a device (terminal device 60) associated with the token.

The authentication unit 13 authenticates a user based on authentication information (for example, a user ID and a password) stored in an authentication information DB 192. An integrated circuit (IC) card or biometric authentication information may be used for the authentication. In addition, external authentication such as OAUTH may be used for the authentication.

The cooperation unit 14 communicates with the reservation management server 20. For example, the cooperation unit 14 acquires from the reservation management server 20 information on a user schedule, on a reservation of a meeting room. The cooperation unit 14 further acquires information on an available date and time for scheduling (available schedule). The cooperation unit 14 further registers an event as a scheduled event or deletes a scheduled event.

The reservation reception unit 15 communicates with the chat application 60*a* on the terminal device 60 to transmit to the terminal device 60 a request for information required for registering an event as a scheduled event. The information required for registering an event as a scheduled event includes, for example, a date and time for a meeting, members, information indicating whether a meeting room is required or not, etc.). The reservation reception unit 15 further receives the information required for registering an event as a scheduled event from the terminal device 60.

The reservation adjustment unit 16 generates information on an event to be scheduled based on the user schedules, the reservation information related to the meeting room, and the information required for registering an event as a scheduled event. The reservation adjustment unit 16 further registers the generated information on the event to the reservation management server 20 via the cooperation unit 14. The event is registered as one or more tentative schedules (tentative reservations).

The deletion unit 17 deletes the tentative reservations (tentative schedules) registered by the reservation adjustment unit 16, via the cooperation unit 14.

When receiving a usage start request (resource usage start request) with a meeting identification information and a meeting room ID specified from the terminal device 60, the usage start request unit 18 transmits the usage start request to the meeting management server 30.

The chat server 10 further includes a storage unit 19. The storage unit 19 is implemented by, for example, the RAM 203, or the HD 204 illustrated in FIG. 4. The storage unit 19 stores a group information DB 191 and the authentication information DB 192.

TABLE 3

Group Information DB

| Workspace | Channel | Member Account 1 | Member Account 2 | Member Account 3 | Member Account 4 | Bot Account |
|---|---|---|---|---|---|---|
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| . . . | . . . | . . . | . . . | . . . | . . . | . . . |

Table 3 is an example data of group information stored in the group information DB 191. The group information is information in which the accounts of the members belonging to the same group are registered. In the group information, member accounts 1 to n (n=4 in Table 3) and a bot account are registered in association with a workspace and a channel.

The workspace is identification information for identifying an organization such as a company or a department. In the present embodiment, plural members belong to a workspace (for example, Company A). Examples of the workspace include a uniform resource locator (URL). Alternatively, any suitable information other than the URL may be used as the workspace, provided that the information is unique. Further, the workspace has plural channels according to the purposes of chat. The channel is a group of members among whom information to be shared is exchanged, such as a group for product A and a group for product B. One or more members of the members belonging to the workspace belong to the channel. In other words, the notification destination is identified by the workspace and the channel. Since the method of identifying the notification destination differs depending on the chat system, if there is identification information that can uniquely identify the group, that information alone may be used, or the notification destination may be identified by three or more pieces of information.

The channels are uniquely identified from one another. The member accounts 1 to n are accounts of members belonging to the channel. Each of these accounts is issued by the chat server 10. In the present embodiment, the chatbot is registered as a member for notifying other members belonging to the same group of information on the reservation of the meeting room 6. In other words, the chatbot is a kind of a proxy of the meeting management server 30 or an imaginary member. Comment (text) by the chatbot is transmitted to the terminal device 60 of each of the member accounts 1 to n.

The workspace and channel are managed by the meeting management server 30. The workspace and channel are information for identifying the group to which the participant belongs.

TABLE 4

Authentication Information DB

| User ID | Password |
|---|---|
| a@xfood.com | **** |
| b@xfood.com | **** |
| c@xfood.com | **** |
| ... | ... |

Table 4 is an example of authentication information stored in the authentication information DB 192. The authentication information is information for a user (reservation-making user (organizer) or participants (invited members)) to log in to the chat server 10. The login information includes a user ID and a password. When the authentication is successful, the user ID is regarded as being correct. The user ID may be information unique to the chat server 10 or may be common to the user ID of the meeting management server 30. Table 4 is an example of the former, which is the user ID is information unique to the chat server 10.

Meeting Management Server:

The meeting management server 30 includes a communication unit 31, an information associating unit 32, a reservation information acquisition unit 33, a notification determination unit 34, a control information generation unit 35, a control information response unit 36, an information notification unit 37, a usage management unit 38, an authentication key verification unit 41, a management and control unit 42, and a reservation information transmission unit 44. Each of these functional units included in the meeting management server 30 is a function implemented by operating any of the configuration components illustrated in FIG. 4 by an instruction from the CPU 201 according to a program loaded from the HD 204 to the RAM 203. The program is distributed from a server for program distribution or distributed as stored in a storage medium.

The communication unit 31 transmits and receives various kinds of information to and from the reservation management server 20, the chat server 10, the registration terminal 50, and the terminal device 60. The communication unit 31 includes a transmission unit 31a and a reception unit 31b. The reception unit 31b receives reservation information from the reservation management server 20 and receives a request for reservation information from the meeting room terminal 90. Further, the reception unit 31b receives a check-in request and a check-out request from the meeting room terminal 90. Furthermore, the reception unit 31b receives, from the registration terminal 50 operated by the administrator, information indicating an association between the group of the chat system and the account. The transmission unit 31a transmits information on a reservation of a meeting room to the chat server 10 and transmits the reservation information to the meeting room terminal 90.

The information associating unit 32 mainly performs processing relating to a preliminary registration process. Specifically, the information associating unit 32 receives a registration of a domain from the registration terminal 50 or the like operated by the administrator and registers the domain with a customer domain DB 495. Further, the information associating unit 32 stores the workspace and the channel of the chat system transmitted from the registration terminal 50 or the like in association with the account of the reservation management server 20 in an association information DB 491.

The reservation information acquisition unit 33 specifies the domain of the customer who uses the resource reservation system 100 (or may specify an account), acquires the reservation information from the reservation management server 20, and converts it into the conference management information DB 493 as the conference management information. to register. Alternatively, the reservation information acquisition unit 33 receives the changed reservation information. At least a part of the reservation information stored in the reservation management server 20 is stored in the meeting management information DB 493. More specifically, the reservation information acquisition unit 33 obtains the reservation information for a predetermined period in the future from the current time among the reservation information stored in the reservation management server 20. The predetermined period is determined depending on how long a period ahead is set to future meetings for which the information on the reservation of the meeting room 6 is to be notified.

The notification determination unit 34 determines whether the meeting management information includes a reservation whose start time satisfies a condition for notification. For example, the notification determination unit 34 refers to a notification settings DB 496 to determine whether the current time matches a date and time obtained by subtracting a preset period from the start time of the reservation. When the current time matches the obtained date and time by this subtraction, the notification determination unit 34 determines that a notification is to be sent. In the present embodiment, the notification may be transmitted immediately before the start time (for example, 10 minutes before the start time). For example, when there are plural chatbots according to different roles, such as a chatbot for sending a reminder and a chatbot for receiving a reservation, the notification determination unit 34 determines a suitable chatbot according to processing to be performed.

When the notification determination unit 34 determines that the notification is to be sent, the information notification unit 37 designate information identifying the chatbot (e.g., a token in SLACK) and information identifying the group as the notification destination, to request the chat server 10 to transmit a notification of the information on the reservation of the meeting room 6. Meeting participants registered in the reservation information may be the group as the notification destination. In addition, the chatbot may be one for a reservation system that accepts a reservation and transmits a reminder for the reservation.

Note that the notification is performed several times, and the meeting identification information is included in at least one of the notifications. In addition, the information on the reservation of the meeting room 6 notified immediately before the start time (for example, 10 minutes before the start time) may include the meeting identification information. The meeting identification information is information for the meeting management server 30 to confirm whether the participant has a right to use the reserved meeting room 6 during the reserved time slot. The information notification unit 37 generates the meeting identification information at least before the final notification. The meeting identification information is registered in a meeting identification information DB 494.

The control information generation unit 35 refers to the meeting management information to generate control information for the electronic device 70 and registers the generated control information in a control information DB 497. For example, the control information generation unit 35 generates control information for turning on the power of the electronic device 70 several minutes before the start time of the meeting. Further, the control information generation unit 35 generates control information for turning off the power of the electronic device 70 in response to detection of the check-out. The control information is stored in the control information DB 497.

In response to receiving an inquiry from the terminal device 60 or the meeting room terminal 90 provided in the meeting room 6 as to whether there is control information, the control information response unit 36 refers to the control information DB 497 to transmit the control information corresponding to the meeting room 6 to the terminal device 60 or the meeting room terminal 90.

may transmit the reservation information in Java Script Object Notation (JSON) format, Extensible Markup Language (XML) format, Comma-Separated Values (CVS) format, or the like. Since the reservation information is repeatedly transmitted, a format having a smaller data size is advantageous.

The meeting management server 30 further includes a storage unit 49. The storage unit 49 is implemented by, for example, the RAM 203, or the HD 204 illustrated in FIG. 4. The storage unit 49 stores an association information DB 491, a meeting management information DB 493, a meeting identification information DB 494, a customer domain DB 495, a notification setting DB 496, a control information DB 497, and a meeting room setting information DB 498.

TABLE 5

Association Information DB

| Workspace | Channel | Member Account 1 | Member Account 2 | Member Account 3 | Member Account 4 |
| --- | --- | --- | --- | --- | --- |
| http://sample.com/1 | #marketing | a@xfood.com<br>a@chat.com | b@xfood.com<br>b@chat.com | c@xfood.com<br>c@chat.com | d@xfood.com<br>d@chat.com |
| http://sample.com/2 | #team1 | f@xfood.com<br>f@chat.com | g@xfood.com<br>g@chat.com | h@xfood.com<br>h@chat.com | |
| ... | ... | ... | ... | ... | ... |

The usage management unit 38 manages check-in (start of use) and check-out (end of use) to the meeting room. Further, the usage management unit 38 registers, in the meeting management information DB 493, a change in the status of meeting according to the check-in and the check-out. The check-in is allowed from 5 to 10 minutes before the start time of the meeting identified by the reservation ID. The status is changed to "waiting for check-in". In the status of "waiting for check-in", a check-in is accepted when a pair of the meeting room ID and meeting identification information transmitted by the meeting room terminal 90, or a pair of the meeting room ID and meeting identification information transmitted by the terminal device 60 via the chat server 10 is registered in the meeting identification information DB 494. The usage management unit 38 cancels the reservation if the check-in is not accepted by a fixed time.

The authentication key verification unit 41 authenticates the meeting room terminal 90 depending on whether the authentication key transmitted from the meeting room terminal 90 matches the authentication key registered in the meeting room setting information DB 498. Therefore, only the meeting room terminal 90 having the correct authentication key can acquire the reservation information.

The management and control unit 42 checks whether a management start flag registered in the meeting room setting information DB 498 is true or not for each meeting room. The management start flag is a flag indicating whether the management of the meeting room is ready to start.

The reservation information transmission unit 44 transmits reservation information (meeting management information) stored in the meeting management information DB 493 in response to a request from the meeting room terminal 90. However, a management start flag is required to be set to True by the successful authentication by the authentication key. The reservation information transmission unit 44

Table 5 is an example of association information stored in the association information DB 491. The association information is information associating the account of the reservation management system with the group of the chat system. The association information includes items of workspace, channel and member account 1 to n (n=4 in Table 5). The workspaces and channels are as described above. In the member accounts 1 to n, the accounts of participants issued by the reservation management server 20 are registered. The accounts of the chat system may be registered in the association information, as indicated in Table 5. To send a notification to the group, information identifying the account, issued by the reservation management server 20, of the user who made a reservation of a meeting to the reservation management server 20 and information (in the present embodiment, the workspace, and the channel name) identifying the group and channel of the notification destination will suffice. In other words, the accounts of all the members belonging to the group are not necessarily registered in the association information. However, the account information of the chat system of each individual user is required when sending a notification to the individual user. Accordingly, the account of the user of the chat system can also be registered in the association information, as indicated in Table 5.

In Table 5, an account such as a user ID used for the chat server 10 and an account such as a user ID used for the reservation management server 20 are different from each other. Table 5 may not be required due to some reasons, for example, when the accounts for the chat server 10 and the reservation management server 20 are the same because the chat server 10 and the reservation management server 20 are run or managed by the same operating company.

TABLE 6

Meeting Management Information DB

| Reservation ID | Account of Reservation-Making User | Meeting Name | Meeting Room ID | Start Time | End Time | Account of Expected Participant | Status |
|---|---|---|---|---|---|---|---|
| 001 | a@xfood.com | Product Z Development Meeting | K-001 | 2017 Jul. 7 13:00 | 2017 Jul. 7 14:00 | b@xfood.com c@xfood.com d@xfood.com | Checked in |
| 002 | e@xfood.com | Product Y Development Meeting | K-001 | 2017 Jul. 7 14:00 | 2017 Jul. 7 15:00 | b@xfood.com c@xfood.com d@xfood.com | Informed |

Table 6 is an example of meeting management information stored in the meeting management information DB 493 in the meeting management server 30. Since the reservation information is stored in the meeting management information DB 493, the difference from the reservation information DB 291 in Table 1 is described in Table 6. The meeting management information in Table 6 includes "status" as an item. The status indicates status of a reservation. For example, the status such as information on the reservation of the meeting room 6 notified, reservation confirmed, waiting for check-in, checked-in, checked-out, or cancellation is registered.

TABLE 7

Meeting Identification Information DB

| Reservation ID | Meeting Room ID | Meeting Identification Information |
|---|---|---|
| 001 | K-001 | 1234 |
| 002 | K-002 | 5678 |
| ... | ... | ... |

Table 7 is an example of meeting identification information management information stored in the meeting identification information DB 494. The meeting identification information management information is information for managing the meeting identification information for each reservation of the meeting room 6. The meeting identification information management information includes items of the reservation ID, the meeting room ID, and the meeting identification information. The reservation ID, the meeting room ID, and the meeting identification information of the meeting identification information management information in Table 7 are the same or substantially the same as those of the reservation information (the reservation information acquired from the reservation management server 20) except for the status. Accordingly, the redundant descriptions thereof are omitted. Note that the reservation ID is registered in order to identify the reservation of the same meeting room 6.

TABLE 8

Customer Domain DB

| Customer Domain Name | Customer Administrator's Account |
|---|---|
| xfood.com | a@xfood.com |
| ycar.com | f@ycar.com |
| ... | ... |

Table 8 is an example of customer domain information stored in the customer domain DB 495. The customer domain information is information for managing a customer's domain name and an account of an administrator of the customer. The customer domain information stores the domain name of the customer with the administrator's account. The domain name of the customer in Table 8 is the domain name of the account (email address) issued by the reservation management server 20. The administrator's account is the account of the administrator (representative) of the customer. The reservation management server 20 issues the accounts in Table 8.

TABLE 9

Notification Setting DB

| Customer Domain Name | Notification Setting |
|---|---|
| xfood.com | 1 day before |
| ycar.com | 12 hours before |
| ... | ... |

Table 9 is an example of notification setting information stored in the notification setting DB 496. The notification setting information includes, for each of the customers, settings relating to a notification. The notification setting information stores the domain name of the customer in association with notification settings. The notification setting indicates a time at which the information on the reservation of the meeting room 6 is to be notified. In this example, the timing defines how long ahead the start time of the meeting the notification of the information on the reservation of the meeting room is to be sent. In another example, a fixed date and time may be set in the notification settings. Further, the number of the timings set in the notification settings is not necessarily one. A plurality of notification settings may be registered in association with one customer.

TABLE 10

Control Information DB

| Meeting Room ID | Control Setting |
|---|---|
| K-001 | Power ON |
| K-002 | Power OFF |
| ... | ... |

Table 10 is an example of control information stored in the control information DB 497. The control information is information for controlling the electronic device 70 provided in the meeting room 6. The control information includes the meeting room ID and a control content. The control content indicates a specific control operation of the electronic device 70. The meeting management server 30 sets details as a control setting for each electronic device 70. The control information does not include information indicating a time at which the electronic device 70 is to be controlled. This is because it is difficult for the meeting management server 30 to access the meeting room terminal 90 or the terminal device 60, since the meeting management server 30 resides on the external network N2. Accordingly, the meeting management server 30 transmits the control content when the control information has already been generated and when being accessed from the meeting room terminal 90 or the terminal device 60.

TABLE 11

Meeting Room Setting Information DB

| Customer ID | Meeting Room Name | Meeting Room ID | Status of Meeting Room Terminal | Authentication Key | Management Start Flag |
|---|---|---|---|---|---|
| G-001 | Meeting Room A | K-001 | Connected | ***** | True |
| | Meeting Room B | K-002 | Before Setup | ***** | False |
| | Meeting Room C | K-003 | Disconnected | ***** | True |

Table 11 is an example of the meeting room setting information stored in the meeting room setting information DB 498. The meeting room setting information indicates settings for each meeting room. The meeting room setting information includes, in association with a customer ID, items of meeting room name, meeting room ID, status of a meeting room terminal, and authentication key, management start flag. The meeting room name is a general-purpose name of a meeting room recognized by participants attending in the meeting. Examples of the meeting room name include a name that is presented at the entrance of the meeting room. The meeting room ID is identification information for uniquely identifying a meeting room, as described above. In one example, the meeting room ID is common to the meeting room setting information and the reservation management server 20, to simplify the configuration and operation. In another example, a conversion table is provided that allows the administrator to set the different meeting room ID from that stored in the reservation management server 20. The status of the meeting room terminal indicates whether the configuration of initial settings of the meeting room terminal 90 has been completed, whether communication is possible, and the like. The initial settings refer to, for example, communication-related settings so that the meeting room terminal 90 can exhibit at least the minimum functions. "Connected" in the status of the meeting room terminal indicates status in which communication is confirmed within a certain time period. "Before setup" in the status of the meeting room terminal indicates status in which the initial settings have not been configured yet. "Disconnected" in the status of the meeting room terminal indicates status in which no communication has been performed for equal to or longer than a certain time period. The authentication key is authentication information used by the meeting management server 30 to authenticate the meeting room terminal 90 or the terminal device 60. The authentication key is set to the meeting room terminal 90 by the initial settings. The authentication key is a combination of numbers, alphabets, symbols, and the like that are too long to be identified by brute force attack. In one example, the meeting management server 30 determines the authentication key. In another example, the administrator determines the authentication key. The management start flag is a flag indicating whether the meeting management server 30 starts managing the meeting room after the initial settings of the meeting room terminal 90 has been configured. The value "true" set in the management start flag indicates that the meeting management server 30 starts managing the meeting room. The value "false" set in the management start flag indicates that the meeting management server 30 does not start managing the meeting room. The management start flag is set by the administrator. In a meeting room where the meeting room terminal 90 is not installed, the administrator may set the management start flag to true as appropriate.

When the management start flag is set to True, the meeting management server 30 is ready to manage the meeting room. The meeting management server 30 starts the management of the meeting room when the management start flag is True and the request for reservation information is received from the meeting room terminal 90 or the terminal device 60. As a result, transmission of reservation information is started when there is a request from the meeting room terminal 90 or the terminal device 60.

When the meeting room terminal 90 acquires the reservation information from the meeting management server 30, the meeting room terminal 90 starts cooperation with the meeting management server 30. Therefore, the start of cooperation and the start of management are triggered by the related processes of requesting reservation information and transmitting reservation information.

The following processing is performed when cooperation is started, or management is started.

Display of reservation information (check-in, check-out, extension, use now)

Control of electronic devices linked to check-in and check-out

Automatic cancellation of reservation

Note that "extension" indicates that the participant extends the reservation beyond the end time of the reservation of the meeting room, and "use now" indicates that any user can use the vacant meeting room without reservation.

The management start flag substantially eliminates inconveniences such as automatic cancellation caused by a time lag between the time when the configuration of the initial settings is completed and the time when the meeting room terminal 90 is arranged in the meeting room.

In one example, the meeting room name and the meeting room ID are determined in advance. In another example, the administrator sets the meeting room name and the meeting room ID. In still another example, the meeting room name and the meeting room ID transmitted from the reservation management server 20 are used. The default value (the value immediately after setting by a provider) of the status of the meeting room terminal is "before setup", but the value automatically transitions according to the communication status. The value of the authentication key is assigned and set by the meeting management server 30 at the time of initial settings, for example. The management start flag is set by the administrator through a setting screen for the administrator described below.

Registration Terminal:

The registration terminal 50 includes a communication unit 51, an operation reception unit 52, and a display control unit 53. Each of these functional units included in the registration terminal 50 is a function implemented by operating any of the configuration components illustrated in FIG. 4 by an instruction from the CPU 201 according to a program loaded from the HD 204 to the RAM 203. The program (for example, a browser) is distributed from a server for program distribution or distributed as stored in a storage medium.

The registration terminal 50 is a terminal for the administrator to make various settings related to the meeting room through the web page provided by the meeting management server 30. One of the settings is a setting in which the information registered in the meeting room setting information DB 498 is to be acquired as an image code and the administrator is to initialize the meeting room terminal 90. The terminal device 60 may be used for the initial setting (initialization).

The communication unit 51 transmits and receives various kinds of information to and from the meeting management server 30 and the reservation management server 20. The operation reception unit 52 receives various operations of the participant with respect to the registration terminal 50. The display control unit 53 interprets screen information of various screens to display screens on the display 206. The operation reception unit 52 and the display control unit 53 includes, for example, a browser function and can execute a web application.

Figure 7:
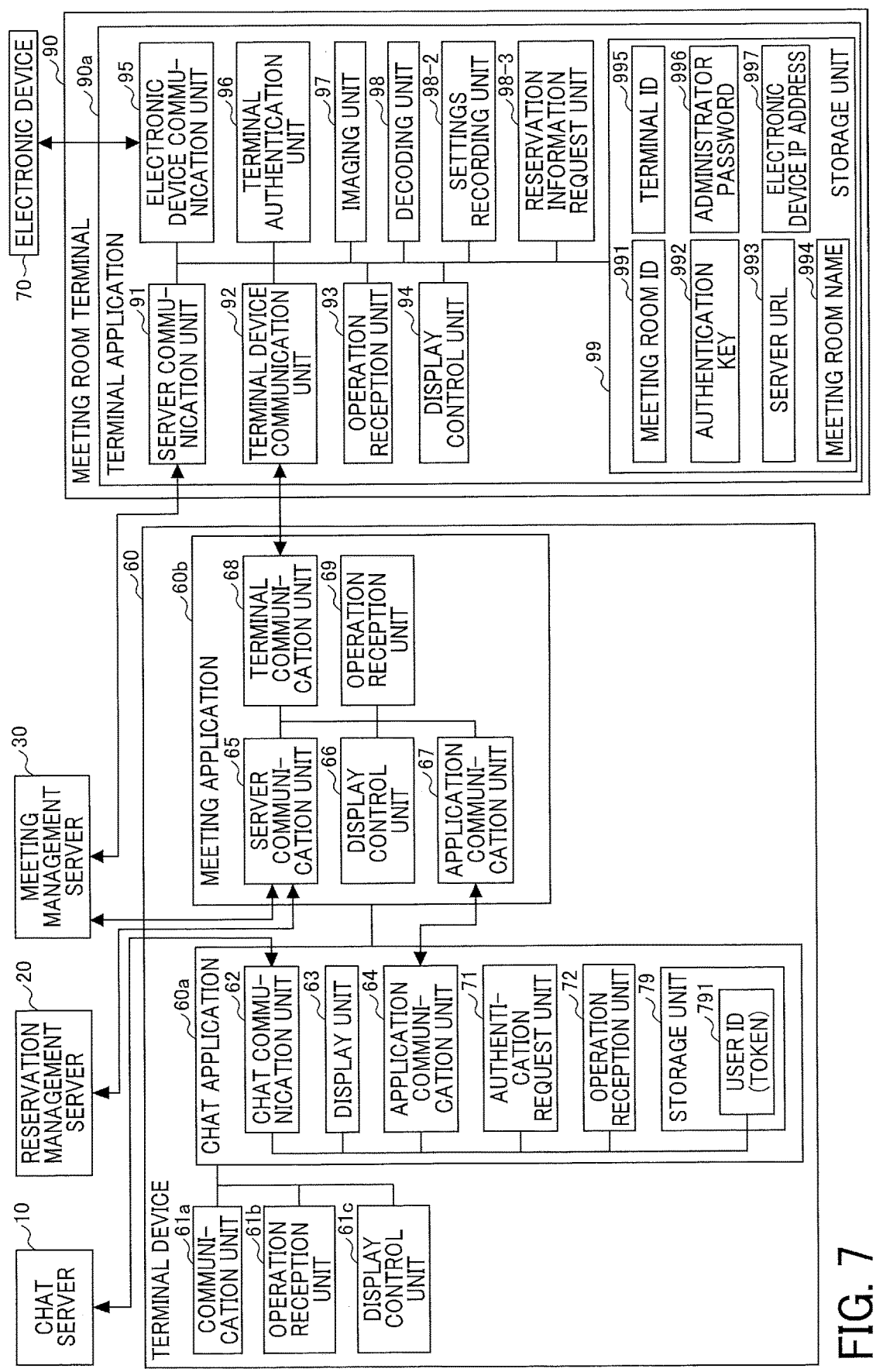
FIG. 7 is a block diagram illustrating an example of a functional configuration of a terminal device and a meeting room terminal according to one or more embodiments of the present disclosure.

Terminal Device:

FIG. 7 is a block diagram illustrating an example of a functional configuration of the terminal device 60 and the meeting room terminal 90 according to the present embodiment. The functions of the electronic device 70 is described as needed.

The terminal device 60 includes a communication unit 61*a*, an operation reception unit 61*b*, a display control unit 61*c*, a chat application 60*a*, and a meeting application 60*b*. Further, the chat application 60*a* includes a chat communication unit 62, a display unit 63, an application communication unit 64, an authentication request unit 71, and an operation reception unit 72. The meeting application 60*b* includes a server communication unit 65, a display control unit 66, an application communication unit 67, a terminal communication unit 68, and an operation reception unit 69. Each of these functional units included in the terminal device 60 is a function implemented by operating any of the configuration components illustrated in FIG. 5 by an instruction from the CPU 701 according to a program loaded from the EEPROM 704 to the RAM 703. The program is distributed from a server for program distribution or distributed as stored in a storage medium. Since the chat application 60*a* and the meeting application 60*b* operate on the terminal device 60, the program includes the chat application 60*a* and the meeting application 60*b*.

The communication unit 61*a* transmits and receives various kinds of information to and from the meeting management server 30 and the reservation management server 20. The operation reception unit 61*b* receives various operations that are input by the participant to the terminal device 60. The display control unit 61*c* interprets screen information of various screens to display screens on the display 718. The operation reception unit 61*b* and the display control unit 61*c* includes, for example, a browser function and executes a web application.

The chat communication unit 62 (an example of a second communication unit) of the chat application 60*a* transmits and receives various types of information to and from the chat server 10. In the present embodiment, the chat communication unit 62 receives information related to the reservation of the meeting room 6 from the chat server 10. Further, the chat communication unit 62 sends, to the chat server 10, a notification indicating that a message of the information on the reservation of the meeting room 6 has been read and a notification indicating whether the meeting room 6 is to be used or canceled. In addition, the chat communication unit 62 transmits to the chat server 10 the information required for the reservation entered by the user. The chat communication unit 62 further receives, for example, information on the reservation of the meeting room 6, a message prompting the input of information required for the reservation, and an entry button, which are transmitted from the chat server 10.

The display unit 63 of the chat application 60*a* displays, for example, information on the reservation of the meeting room 6, a message prompting the input of information required for the reservation, and a room entry button, which are transmitted from the chat server 10. For example, the display unit 63 displays, for example, a text message, a sticker, an image, or a video as if the text message, the sticker, the image, or the video originally come from the chatbot.

The application communication unit 64 of the chat application 60*a* invokes the meeting application 60*b* and transmits the meeting identification information to the meeting application 60*b*. The chat server 10 transmits information identifying the meeting application 60*b* to the terminal device 60, when notifying the terminal device 60 of the information on the reservation of the meeting room 6. Accordingly, the chat application 60*a* designates the meeting application 60*b* to the OS and requests notification of the meeting identification information. The OS activates the meeting application 60*b*.

The authentication request unit 71 specifies a user ID or password entered by the user, and requests, via the chat communication unit 62, the chat server 10 to perform authentication. If the authentication is successful, the user ID 791 is stored in the storage unit 79. The operation reception unit 72 receives various operations performed with respect to the chat application 60*a*. The authentication request unit 71 may use an external authentication device such as OAUTH. In this case, the user ID is referred to as a token.

Further, the chat application 60*a* includes a storage unit 79 implemented by, for example, the ROM 202, the RAM 203, or the HD 204. The user ID 791 is stored in the storage unit 79. The user ID 791 is stored when the authentication by the authentication request unit 71 is successful. The user ID 791 is, for example, a user account on the chat server 10.

The server communication unit 65 of the meeting application 60*b* communicates with the meeting management server 30 or the reservation management server 20. The server communication unit 65 receives reservation information, and transmits a check-in request, a check-out request, and a reservation request to the meeting management server 30. Further, the server communication unit 65 transmits an authentication request to the reservation management server 20.

The display control unit 66 of the meeting application 60b displays an image code or the like including the meeting identification information on the display 718 for the meeting room terminal 90 when the meeting identification information is not input manually.

The application communication unit 67 of the meeting application 60b obtains various kinds of information from the chat application 60a through the OS. Examples of the various kinds of information obtained from the chat application 60a include the meeting identification information included in the information on the reservation of the meeting room 6.

The terminal communication unit 68 communicates with the meeting room terminal 90 to transmit, for example, the meeting identification information, in case that the meeting room terminal 90 is provided in the meeting room. (However, the meeting identification information may be entered manually). The terminal communication unit 68 detects the meeting room terminal 90 using a short-range wireless communication network such as BLUETOOTH (registered trademark). In response to detecting the meeting room terminal 90, the terminal communication unit 68 transmits the meeting identification information to the detected meeting room terminal 90. The operation reception unit 69 receives various operations performed with respect to the meeting application 60b.

Meeting Room Terminal:

The meeting room terminal 90 includes a server communication unit 91, a terminal device communication unit 92, an operation reception unit 93, a display control unit 94, an electronic device communication unit 95, a terminal authentication unit 96, an imaging unit 97, a decoding unit 98, a settings recording unit 98-2, and a reservation information request unit 98-3. Each of these functional units included in the meeting room terminal 90 is a function implemented by operating any of the configuration components illustrated in FIG. 5 by an instruction from the CPU 701 according to a program loaded from the EEPROM 704 to the RAM 703. The program is distributed from a server for program distribution or distributed as stored in a storage medium.

The server communication unit 91 (an example of third communication unit) communicates with the meeting management server 30 with a server URL 993 as a destination. Since the meeting room terminal 90 resides on the intra-company network N1, accessing from the meeting management server 30 to the meeting room terminal 90 is difficult. For this reason, the server communication unit 91 polls the meeting management server 30 to periodically communicate with the meeting management server 30. In addition to or in alternative to the polling, the server communication unit 91 communicates with the meeting management server 30 using a communication technology such as WebSocket. When the status of the meeting room terminal is "connected" and there is no communication from the server communication unit 91, "disconnected" is registered in the meeting room setting information DB 498. If the status of the meeting room terminal is "before setup", the status of the meeting room terminal remains as "before setup" regardless of presence or absence of communication. The server communication unit 91 may communicate using a communication protocol such as Hypertext Transfer Protocol (HTTP), and the communication protocol is not particularly limited.

The server communication unit 91 according to the present embodiment receives the reservation information and transmits, to the meeting management server 30, the meeting identification information, which is received by the terminal device communication unit 92 from the terminal device 60 or manually input at the time of check-in. Further, the server communication unit 91 receives the control information from the meeting management server 30.

The terminal device communication unit 92 communicates with the terminal device 60. In the present embodiment, the terminal device communication unit 92 receives the meeting identification information, etc. The electronic device communication unit 95 communicates with the electronic device 70. In the present embodiment, the electronic device communication unit 95 transmits, to the electronic device 70, the control information received by the server communication unit 91.

The display control unit 94 displays a screen generated by the terminal application 90a on the display 718. The screen displayed by the display control unit 94 is a standby screen that receives a check-in and a check-out. The operation reception unit 93 receives various operations input to the meeting room terminal 90.

The terminal authentication unit 96 authenticates the administrator's login to the terminal application based on whether the entered administrator password is correct or not. The authentication is required because the meeting room terminal 90 provided in the meeting room may be operated by an unspecified participant, so that the initial settings may be changed if there is no authentication function.

The imaging unit 97 and the decoding unit 98 are functions that are required in initializing the meeting room terminal 90 or when a user logs in with an image code. The setting recording unit 98-2 is required for initializing the meeting room terminal 90. In the description of the present embodiment, an explanation of initializing (initial settings) is not given.

When the user logs in with the image code, the imaging unit 97 captures the image code displayed by the terminal device 60. When the administrator operates the terminal device 60 so that the image code is captured in an angle of view of the CMOS sensor 713 of the meeting room terminal 90, the imaging unit 97 recognizes the image code and automatically generates image data. The decoding unit 98 decodes the image code captured by the imaging unit 97 and restores the meeting identification information.

The reservation information request unit 98-3 repeatedly transmits the meeting room ID and the authentication key to the meeting management server 30 through the server communication unit 91 at a periodic time interval for acquiring the reservation information. As a response to the transmission of the meeting room ID and the authentication key, the reservation information request unit 98-3 acquires the reservation information through the server communication unit 91. It is sufficient that the reservation information be acquired when any change is made in the reservation information. Examples of the periodical time interval include from every several seconds to every several minutes. The shorter the periodical time interval, the sooner the reservation information is updated. However, the shorter the periodical time interval, communication load is greater. Accordingly, the periodical time interval is determined in view of both the update frequency of the reservation information and the communication load. In the present embodiment, the reservation information request unit 98-3 acquires the reservation information every thirty seconds, for example. Further, the reservation information request unit 98-3 receives at least the meeting management information (reservation information) of the meeting room 6 of the current day through the server communication unit 91.

The meeting room terminal 90 further includes a storage unit 99. The storage unit 99 is implemented by, for example, the ROM 702, or the EEPROM 704 illustrated in FIG. 5. The storage unit 99 stores a meeting room ID 991, an authentication key 992, the server URL 993, a meeting room name 994, a terminal ID 995, an administrator password 996, and an Internet protocol (IP) address 997 of the electronic device 70.

The terminal ID 995 is identification information identifying the meeting room terminal 90. The terminal ID is used by the meeting management server 30 to identify the meeting room terminals 90 in order to prevent more than a preset number of meeting room terminals 90 from being connected to the meeting management server 30 in one meeting room. Examples of the terminal ID include a universally unique identifier (UUID) of the terminal application and a MAC address. Any other suitable information may be used as the terminal ID, provided that the information is unique. The UUID is a unique identifier in a sense that two or more items do not have the same value all over the world without specific management.

The administrator password 996 is set by the administrator when the terminal application 90a is installed or when the terminal application 90a is activated for the first time. The IP address 997 of the electronic device 70 is set by the administrator as needed.

Additional Explanation for Chat Server:

The chat server 10 according to the present embodiment uses a platform 81 that provides a chat service to transmits or receives various information to or from the terminal device 60. The chat server 10 includes a bot server 80 and the platform 81 on which a chatbot operates. The function units of the chat server 10 illustrated in FIG. 6 are mainly functions of the bot server 80. The operating company of the meeting management server implements the chatbot function on the bot server 80. The platform 81 is a system that enables chat communication between users or between a user and a chatbot by the chat application 60a. The platform 81 may be managed separately from the meeting management server 30 (managed by an operating company that is different from the one managing the meeting management server 30).

Figure 9:
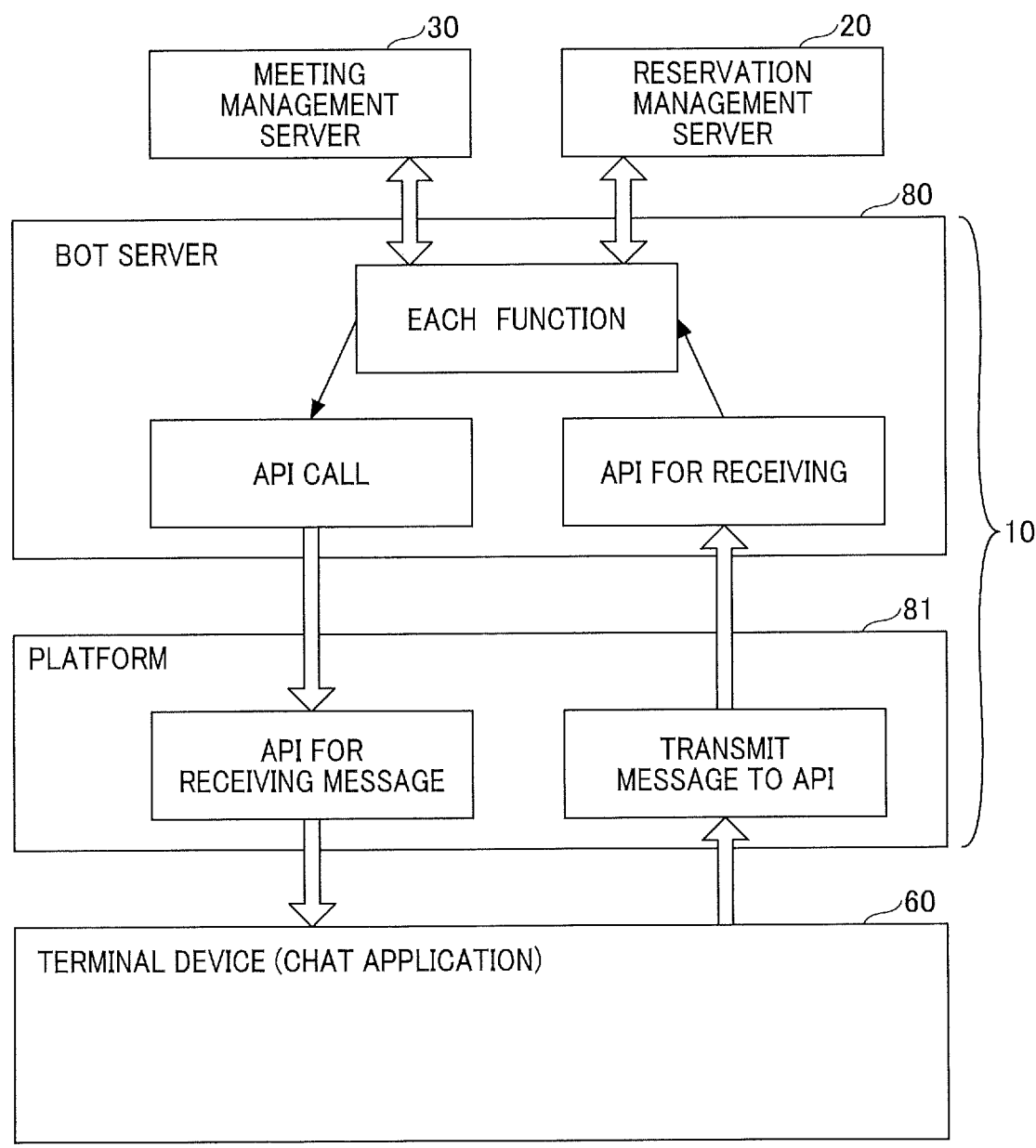
FIG. 9 is a diagram schematically illustrating a flow in which a chat server communicates with a chat application, according to one or more embodiments of the present disclosure.

FIG. 9 is a diagram schematically illustrating a flow in which the chat server 10 communicates with a chat application, according to the present embodiment. The chatbot is implemented by operating the chat application 60a and the bot server 80 in cooperation with an Application Programming Interface (API). The chatbot transmits a message to the chat application 60a on behalf of the meeting management server 30. For example, when a user enters information via the chat application 60a by selecting the chatbot, the information is transmitted by the platform 81 specifying the bot server 80 corresponding to the chatbot. The bot server 80 is provided with an API for receiving corresponding to the platform 81.

The bot server 80 (an example of first information processing device) performs processing according to the information transmitted from the chat application 60a. The bot server 80 also communicates with the meeting management server 30 or the reservation management server 20 as necessary. The bot server 80 transmits a processing result to the chat application 60a via the API of the platform 81, which is for receiving a message.

Since the meeting management server 30 or the reservation management server 20 specifies the chatbot identification information and the information that identifies a group and transmits the information. This allows the platform 81 to transmit the information to the chat application 60a based on the information identifying the chatbot and the information specifying the group as the notification destination.

Figure 10B:
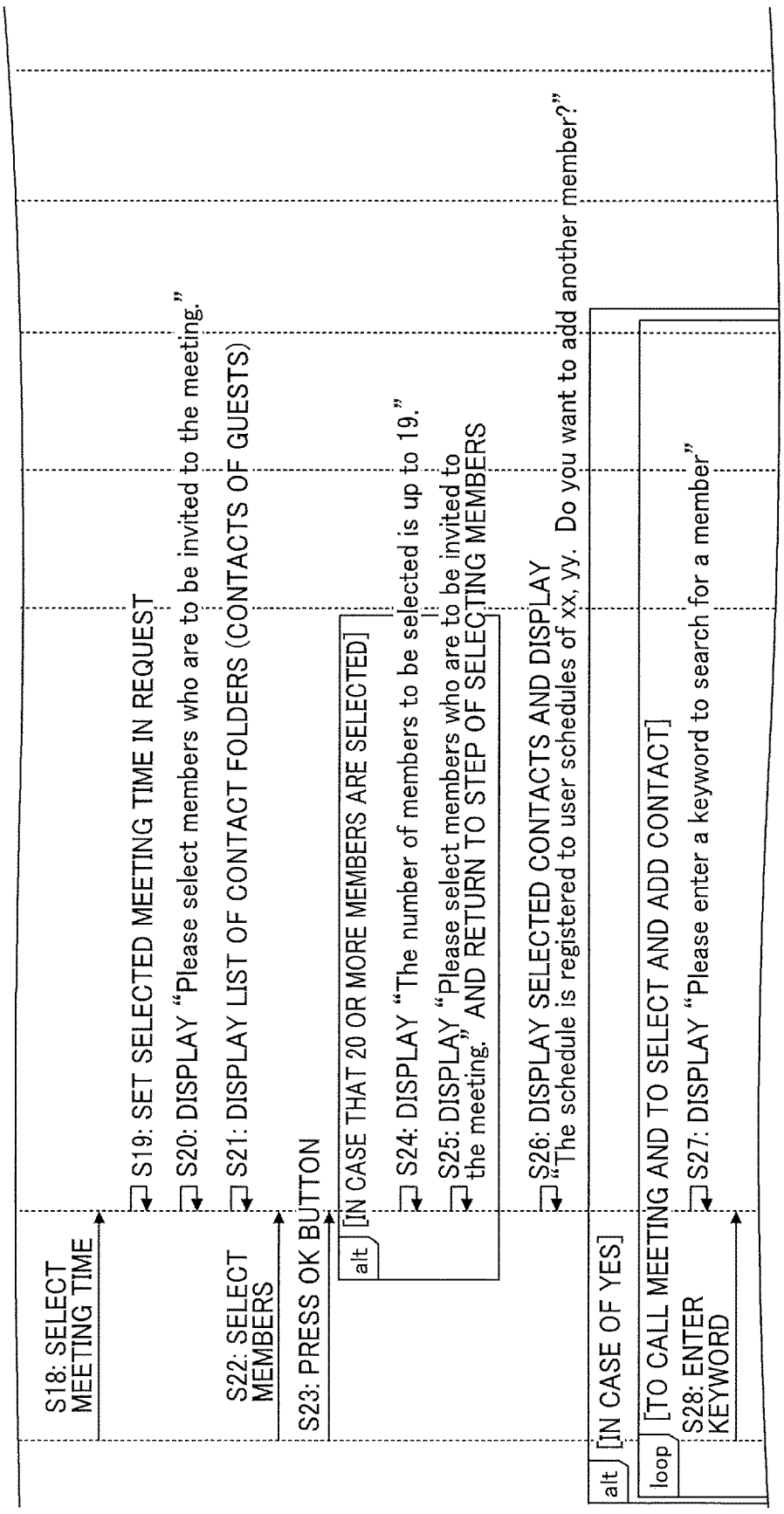
Figure 10C:
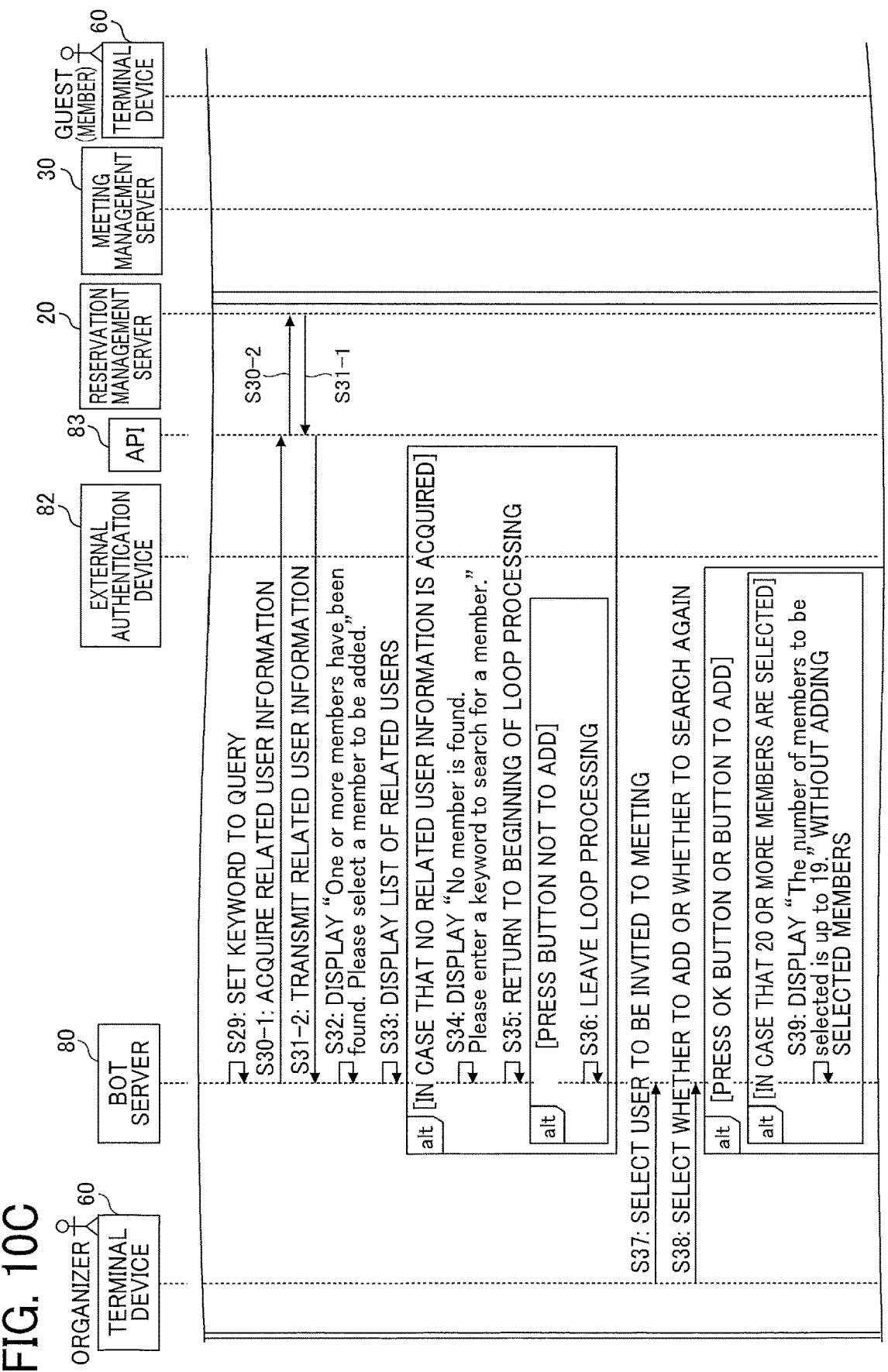
Figure 10D:
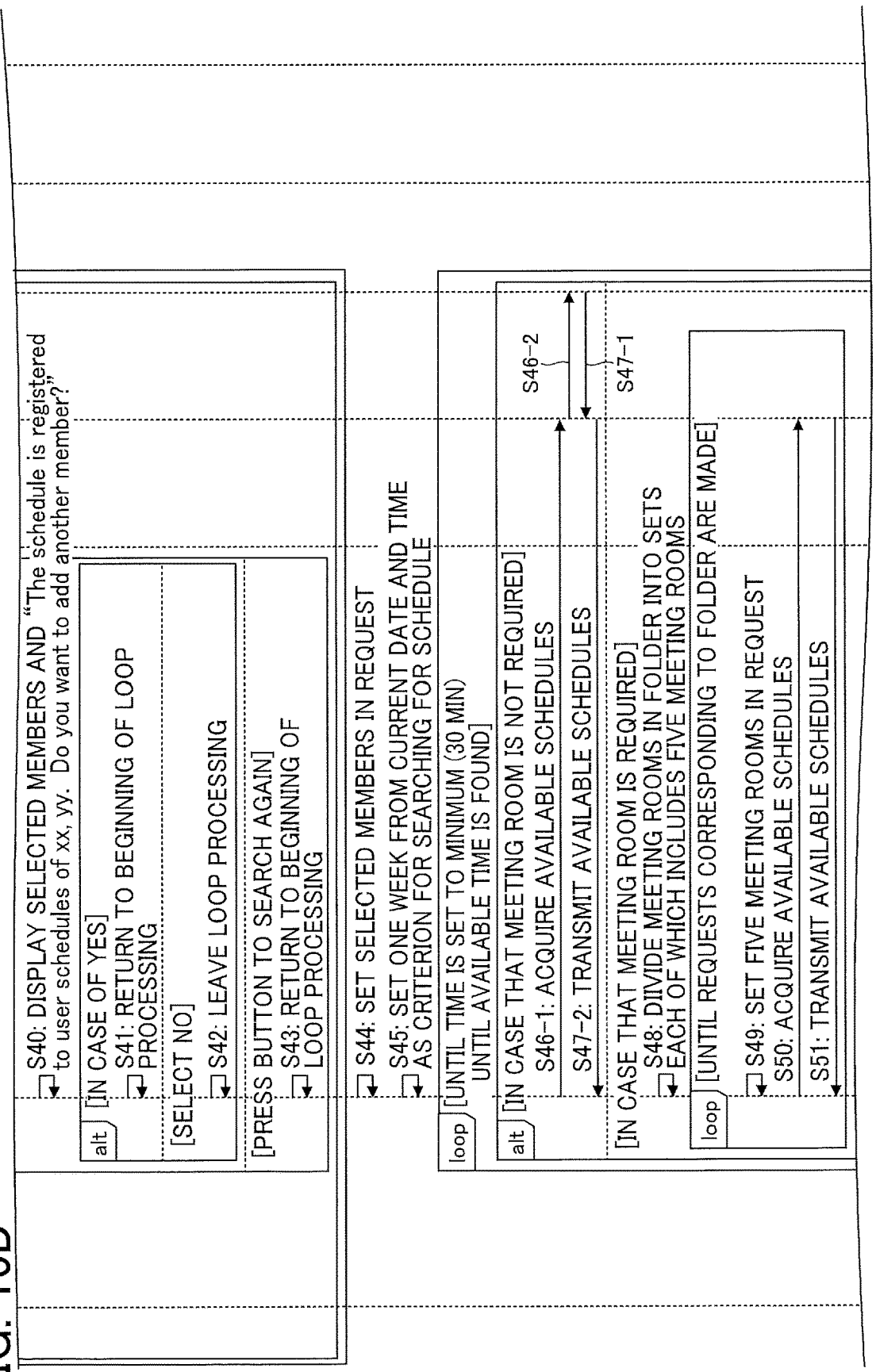
Figure 10E:
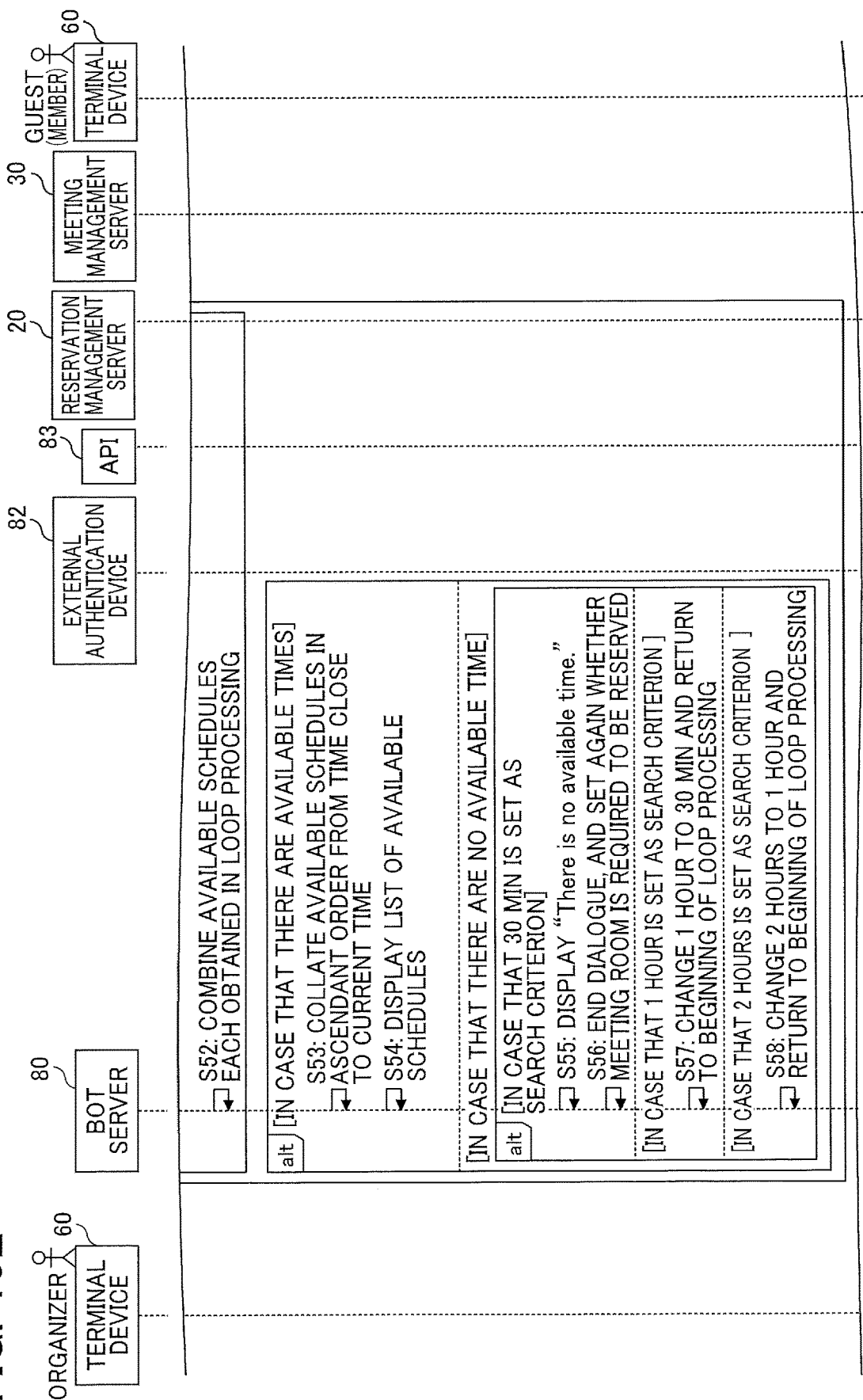
Figure 10F:
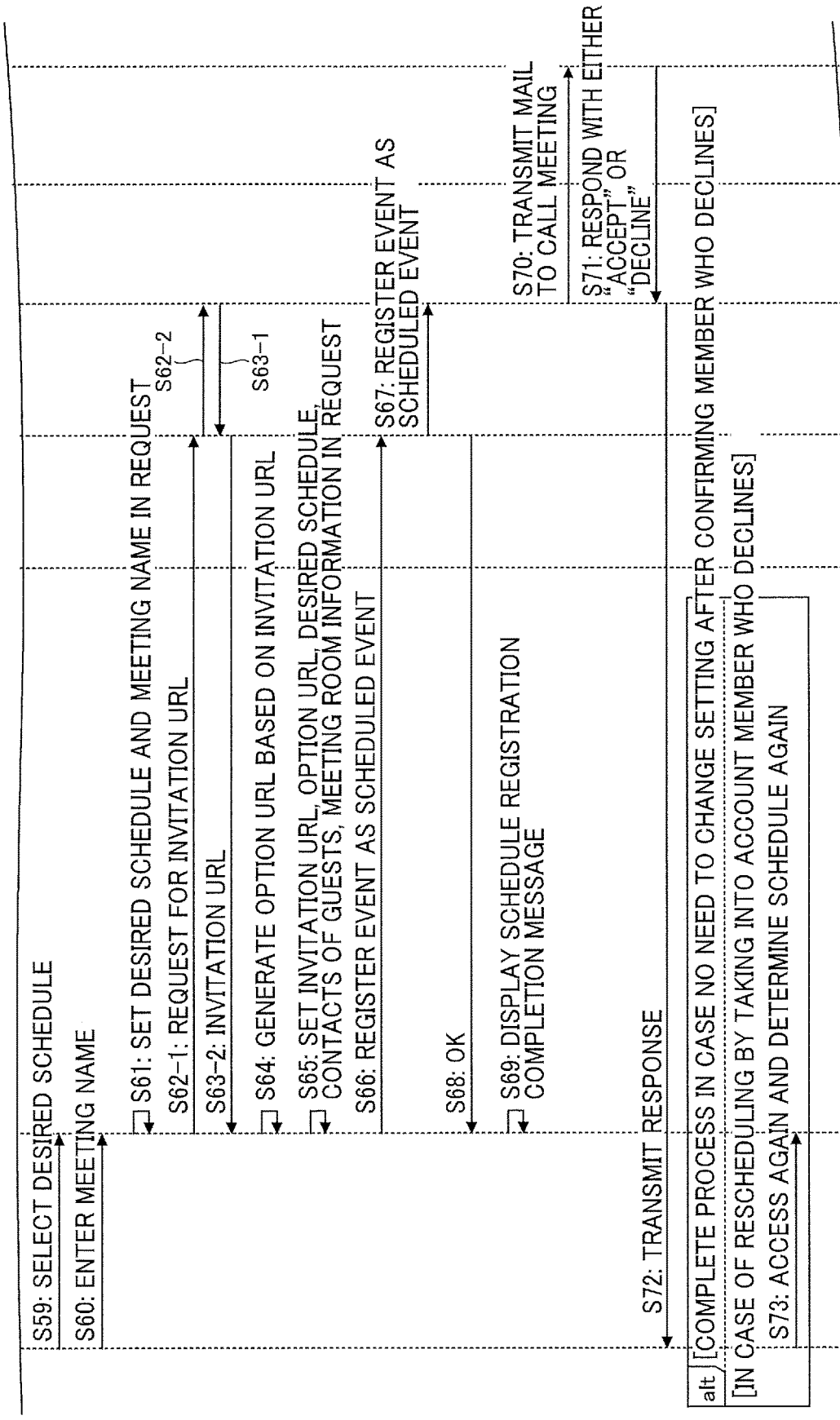
Figure 10G:
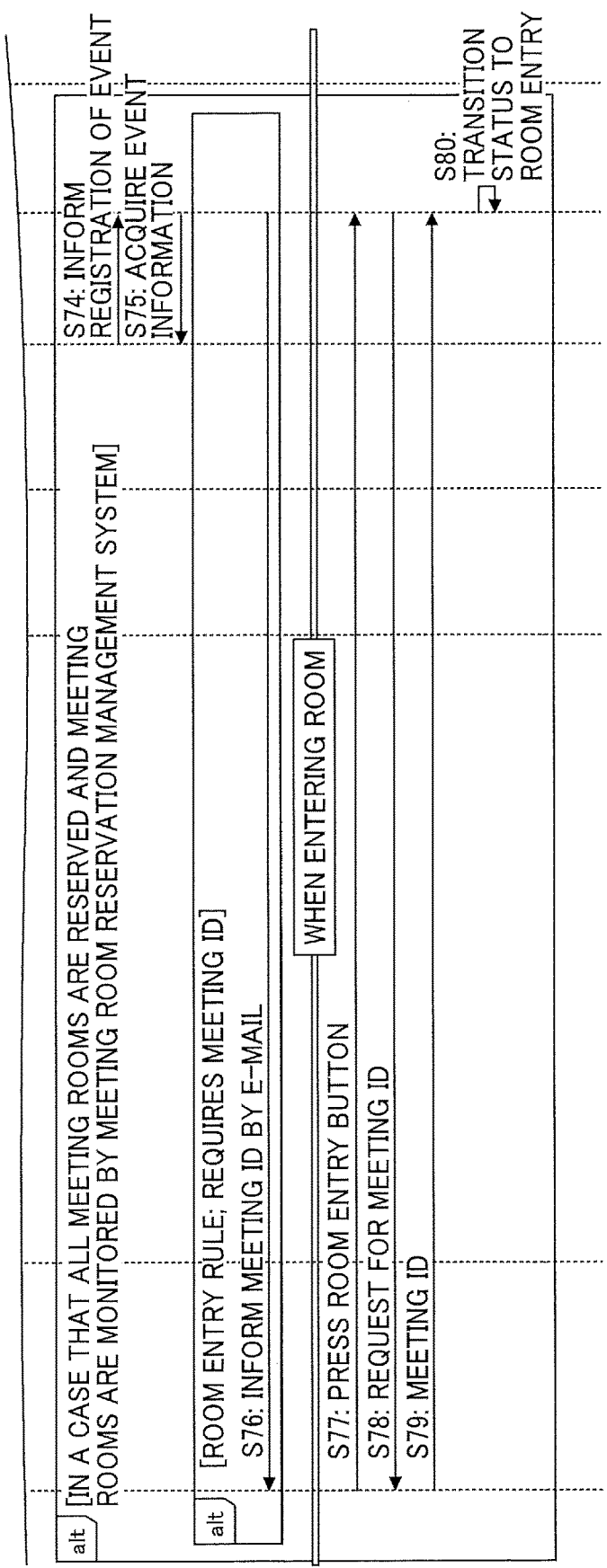
Figure 11B:
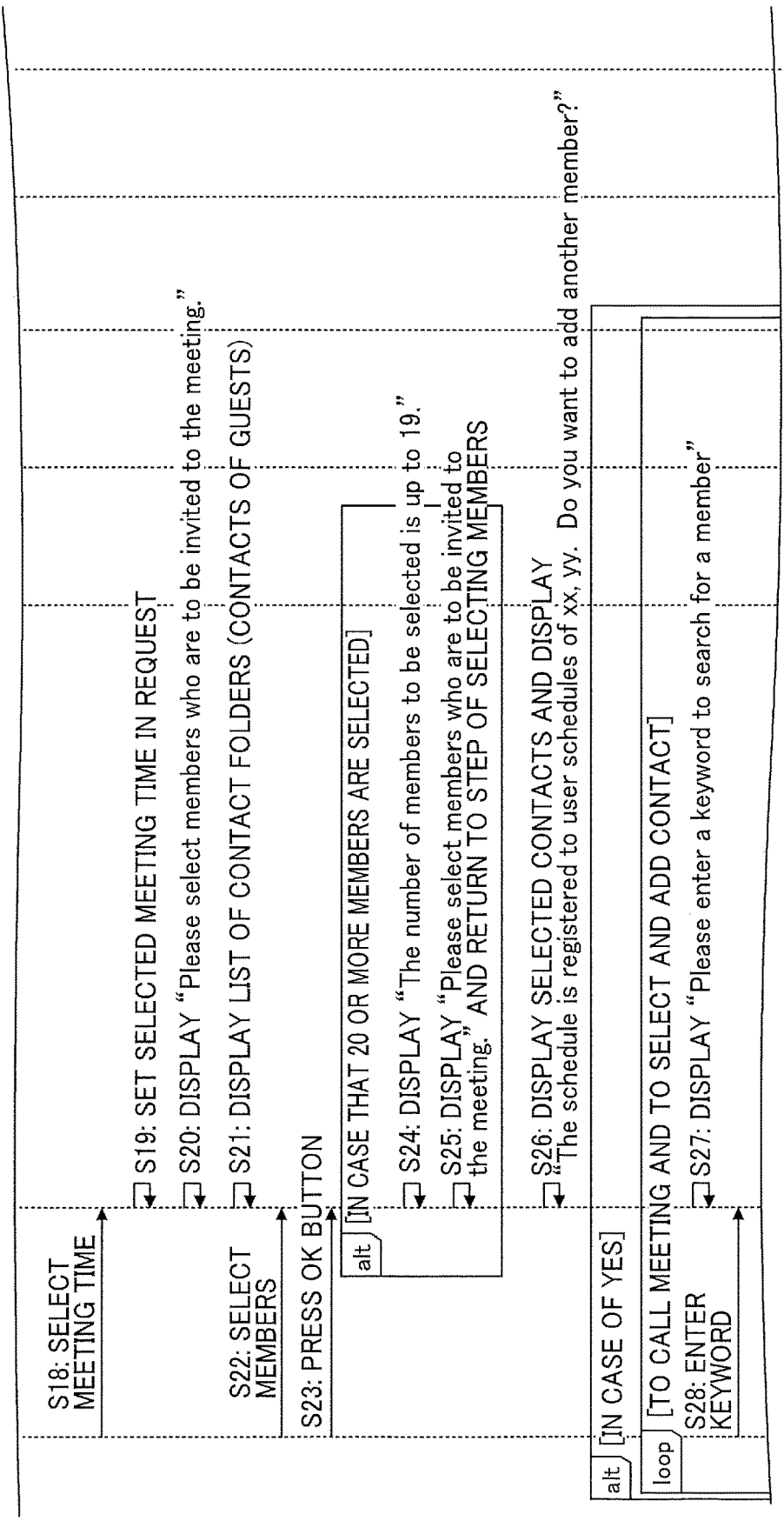
Figure 11C:
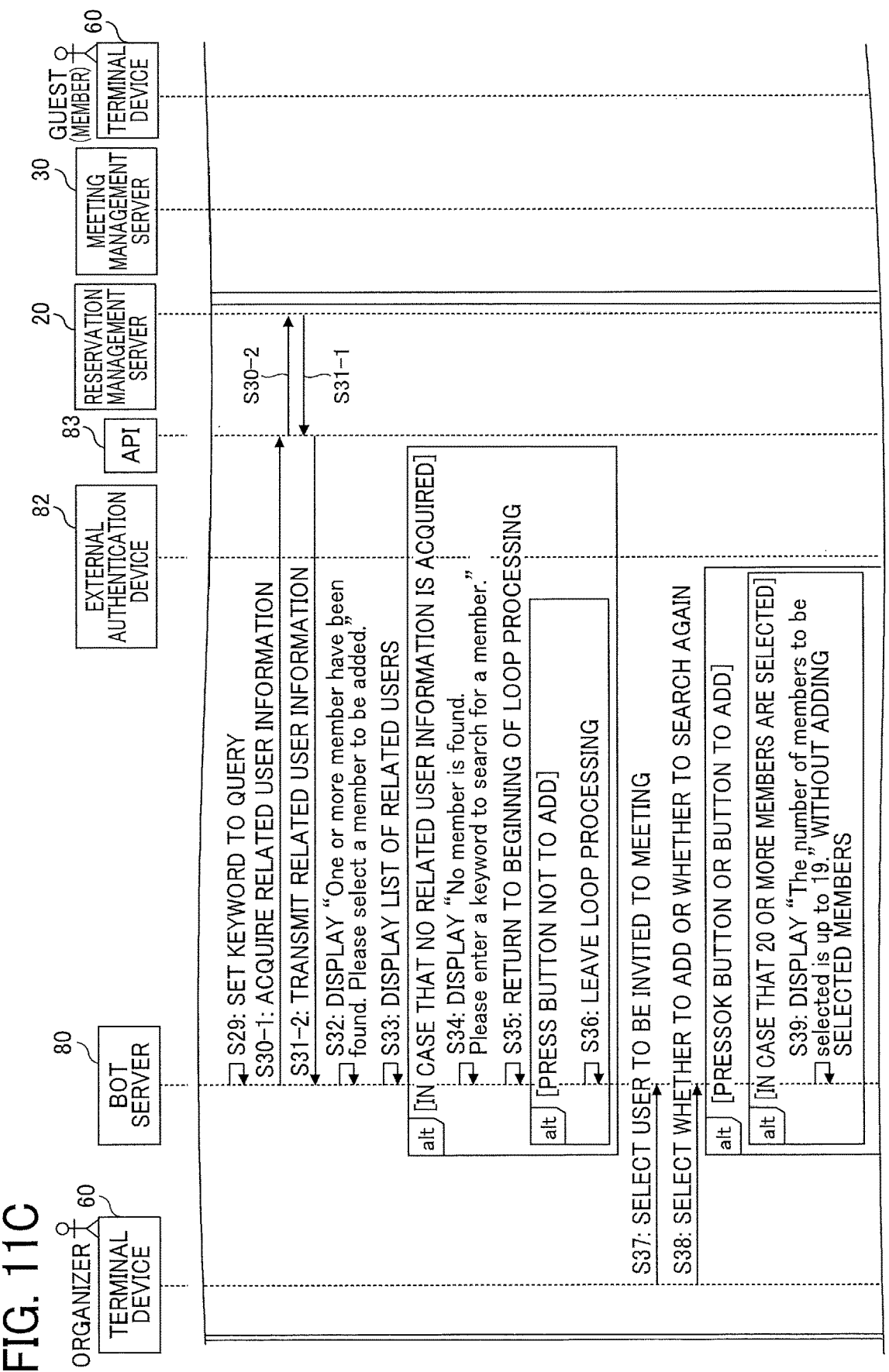
Figure 11D:
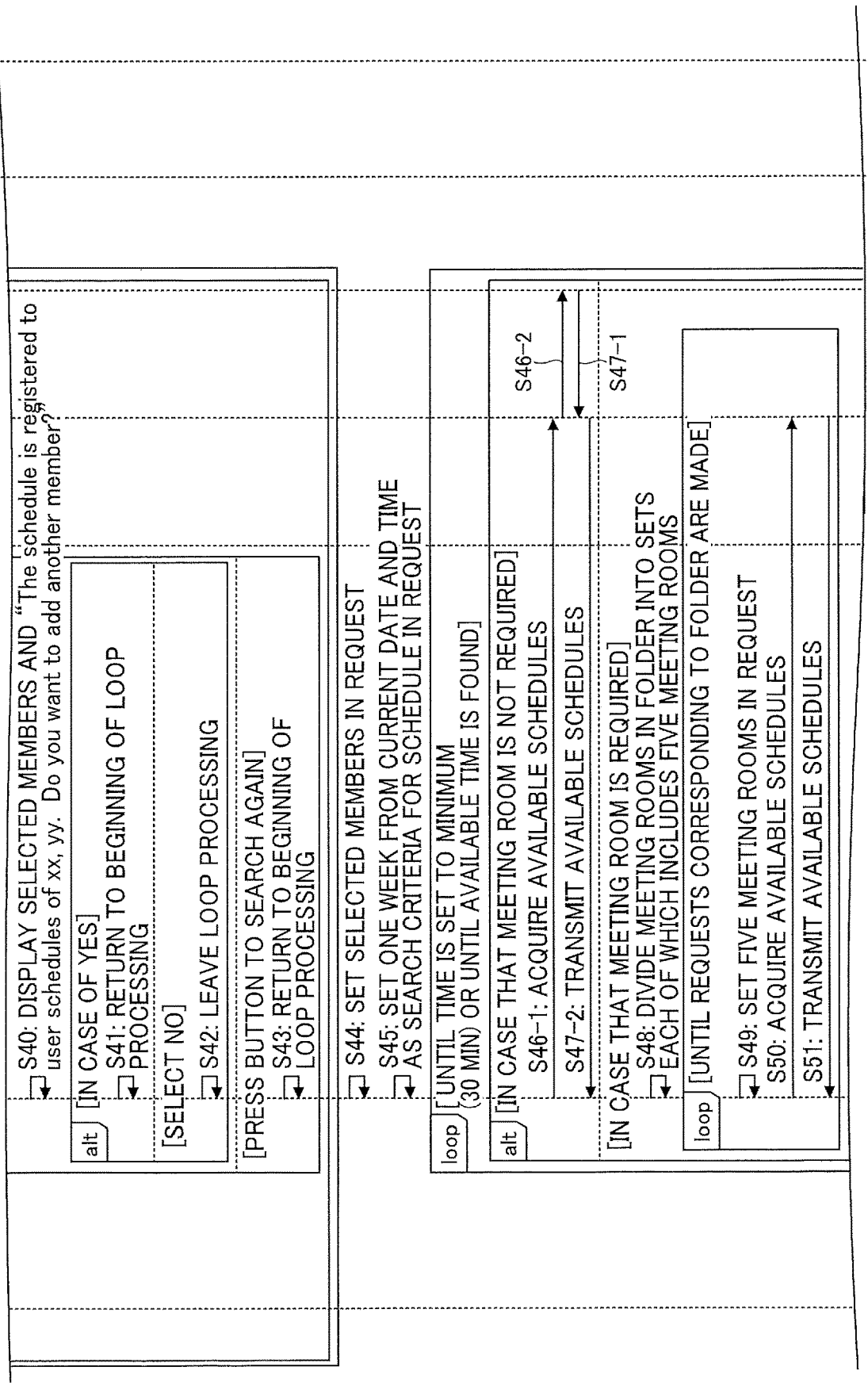
Figure 11E:
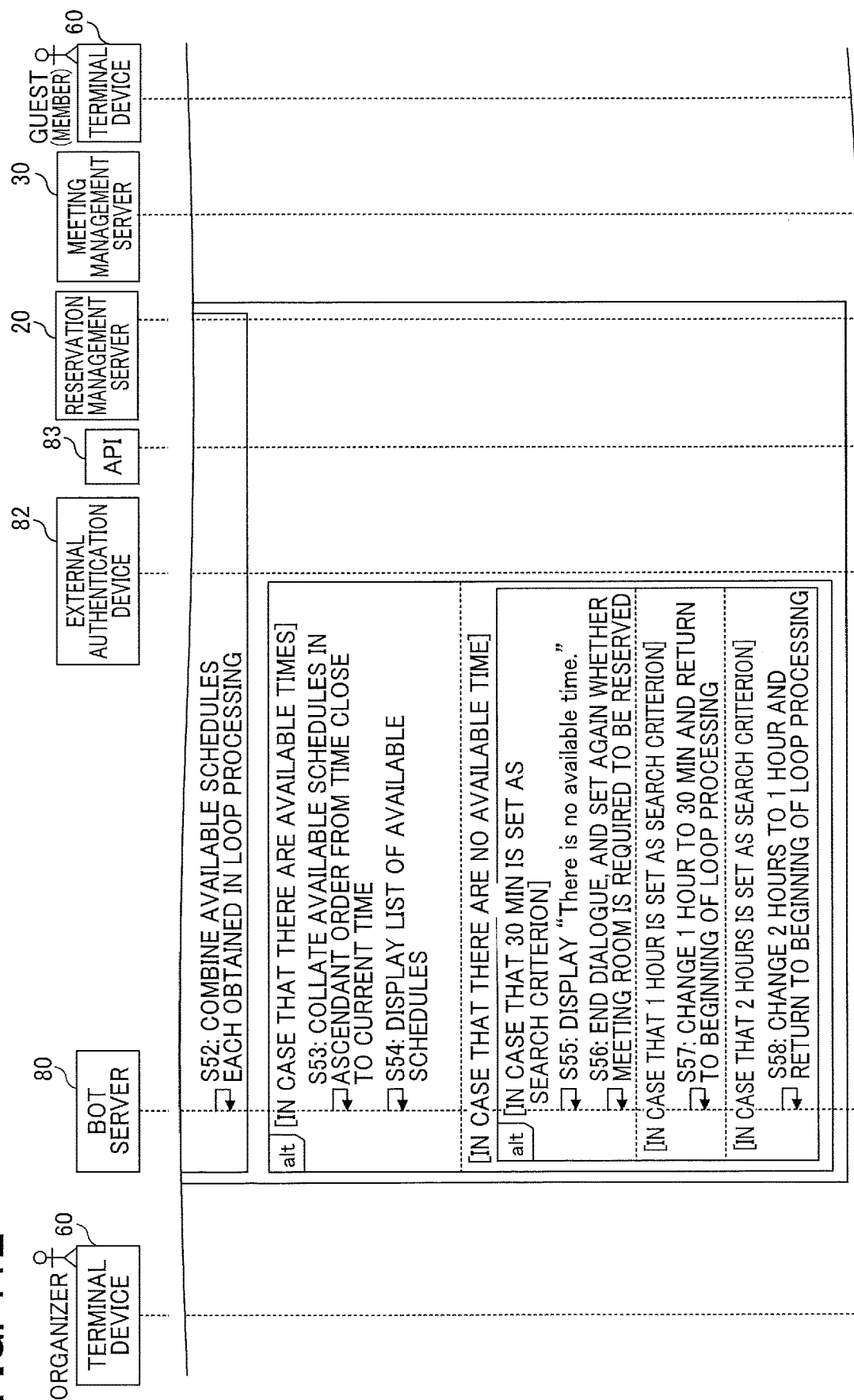
Figure 11F:
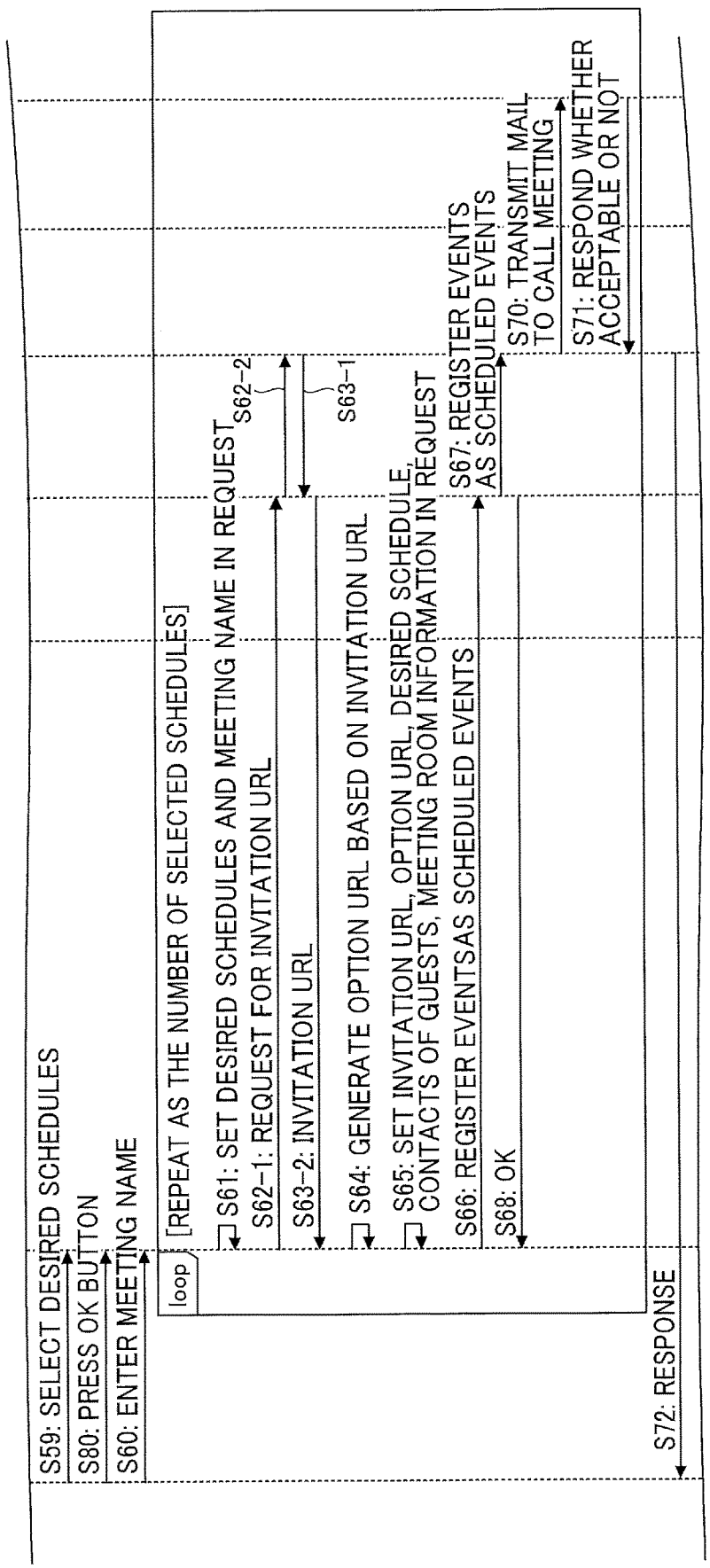
Figure 11G:
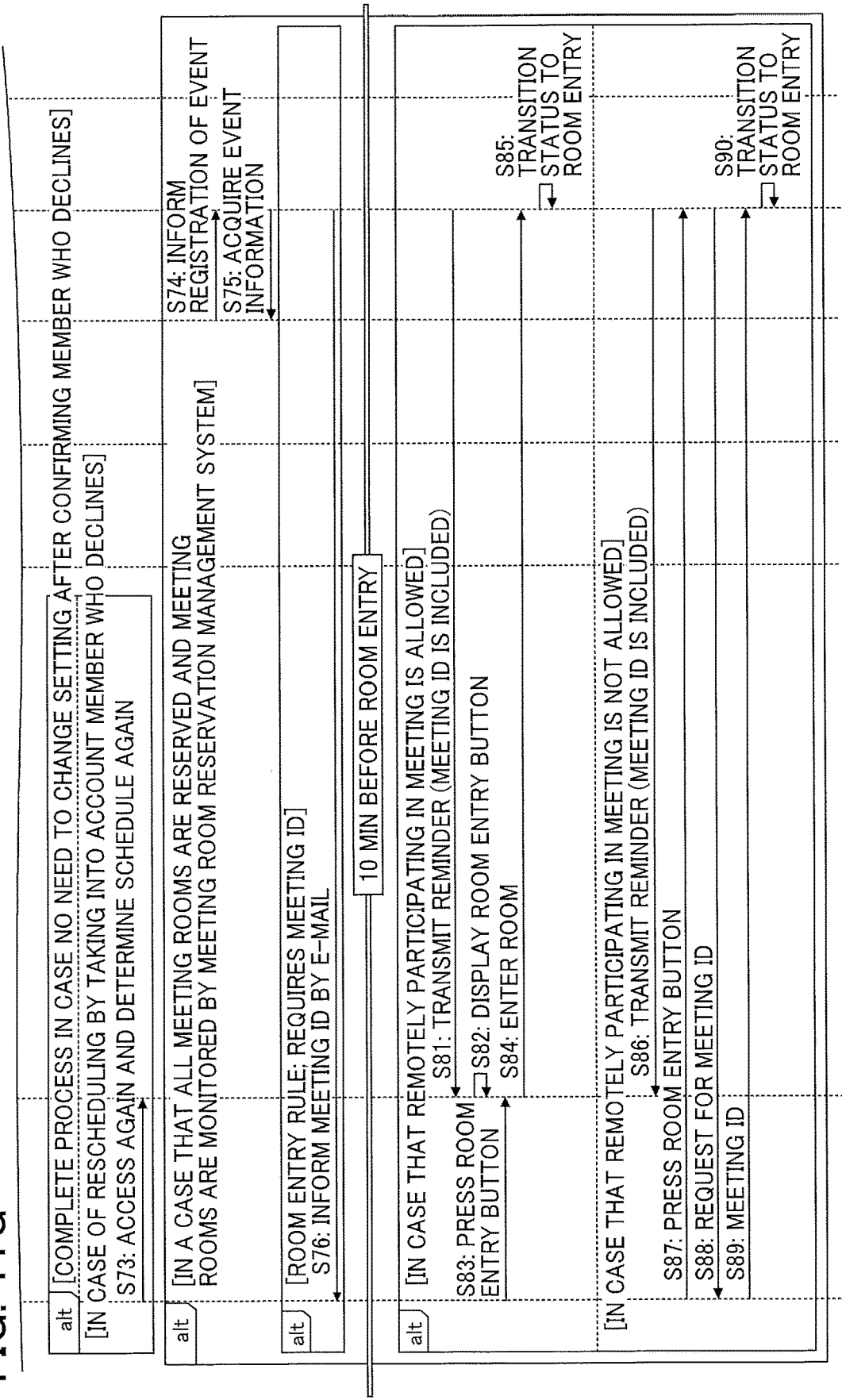

Process for Starting Using Meeting Room according to Comparative Embodiment:

A description is given below of a process for adjusting a schedule and for starting using a meeting room according to a comparative embodiment with reference to FIG. 10, which includes 10A to FIG. 10G. FIG. 10, which includes FIG. 10A to FIG. 10G, is a sequence diagram illustrating an example of a method of registering an event as a scheduled event (fixed schedule) and starting using a meeting room by using a chatbot according to one or more embodiments of the present disclosure. In the following description, examples of screens illustrated FIG. 12 to FIG. 20 are referred to as appropriate. In FIG. 10, which includes 10A to FIG. 10G, a user who arrange a meeting to be scheduled is referred to as an organizer, and a user who is invited to the meeting is referred to as a member or an invited member. Each of the organizer and the invited members operates the corresponding terminal device 60. In addition, an API 83 illustrated in each of FIG. 10A to FIG. 10G is an API for the bot server 80 to communicate with the reservation management server 20, and the bot server 80 communicates with the reservation management server 20 via the API 83. As such an API 83, for example, Microsoft Exchange Server (registered trademark) is known.

S1: The organizer selects a chatbot that is registered in the chat application 60a. The operation reception unit 72 of the chat application 60a receives the selection. The chat application 60a displays the chatbot of a workspace to which the organizer belongs. This allows the organizer to select the chatbot for the scheduling (reservation) system (see FIG. 12).

S2: When the organizer is not authenticated with respect to the bot server 80, an authentication unit of the bot server 80 causes the chat application 60a to display a login button (see FIG. 13). That is, the authentication unit 13 of the bot server 80 transmits information or a signal for displaying the login button to the chat application 60a, and the display unit 63 of the chat application 60a displays the login button. In the following, for the sake of simplicity, this is described as "the bot server 80 causes the terminal device to display the login button".

S3: In response to a user operation of pressing the login button performed by the organizer, the operation reception unit 72 receives the user operation of pressing the login button. The communication unit 11 of the bot server 80 receives the user operation of pressing the login button.

S4: Since the authentication unit 13 redirects the terminal device 60 to the external authentication device 82, the display unit 63 of the terminal device 60 displays an authentication screen prepared by the external authentication device 82. Such an authentication method is called an open authorization (OAUTH) authentication. However, the authentication unit 13 may directly authenticate the user.

S5: The organizer inputs the authentication information of the external authentication device into the terminal device 60. The organizer inputs, for example, a password and a user ID. The operation reception unit 72 of the terminal device 60 receives the authentication information, and the communication unit 11 transmits the authentication information to the external authentication device 82. After being input once, the authentication information is not required to be input again. This is because the terminal device 60 is dedicated to the user and a token is stored in the storage unit 79 when the authentication is successful.

S6: The external authentication device 82 receives the authentication information and determines whether the authentication is successful or not. In the description of the present comparative embodiment, it is assumed that the authentication is successful. The external authentication device 82 transmits the token to the terminal device 60. The token is associated with the logged-in user, indicating who logged in and operations that are performable by the user. The token may also be referred to as an authentication ticket.

S7: When the authentication is successful, the reservation reception unit 15 of the bot server 80 causes the chat application 60*a* to display a selection button to select one from reserve a meeting room and not reserve a meeting room (see a chat page (a) in FIG. 17).

S8: The organizer inputs to the chat application 60*a* whether the meeting requires to use a meeting room or not. The operation reception unit 72 receives a user operation for the selection (input). The selection is transmitted to the bot server 80.

S9, S10: When the organizer selects to reserve a meeting room, the cooperation unit 14 of the bot server 80 specifies the token and transmits a request for a meeting room folder and a contact folder to the reservation management server 20 via the API 83. The meeting room folder is defined as a folder in which a list of meeting rooms is stored, and information on the list of meeting rooms is the same as one registered by the organizer in the reservation management server 20. In a company with many meeting rooms, an organizer may register some desired meeting rooms for use in advance, and this allows the organizer to easily select a meeting room. The contact folder is defined as a folder in which contacts (contacts of invited members who are to participate in a meeting) are registered for each department or for each development group with which the organizer often makes contact.

S11, S12: The communication unit 21 of the reservation management server 20 transmits the meeting room folder specified by the token to the bot server 80. The communication unit 21 further transmit the contact folder specified by the token to the bot server 80.

S13: The reservation reception unit 15 of the bot server 80 cause the chat application 60*a* to display a message, such as for example, "Please select a meeting room folder you want to use."

S14: Further, the reservation reception unit 15 of the bot server 80 causes the chat application 60*a* to display a list of meeting room folders.

S15: The organizer selects one of the meeting room folders to use. The operation reception unit 72 receives the selections. The selected meeting room folder is transmitted to the bot server 80.

S16: The reservation reception unit 15 of the bot server 80 sets the selected meeting room folder in a request. The request is a search request transmitted to the reservation management server 20 and is a request to search for one or more available schedules.

S17: Then, the reservation reception unit 15 of the bot server 80 causes the chat application 60*a* to display a meeting time. The meeting time is a period of time that the schedule occupies, or the meeting takes, such as thirty minutes, one hour, or two hours. Any period of time may be input.

S18: The organizer selects a meeting time (a period of time). The operation reception unit 72 receives the selections. The selected meeting time is transmitted to the bot server 80.

S19: The reservation reception unit 15 of the bot server 80 sets the selected meeting time in the request.

S20: Next, the reservation reception unit 15 of the bot server 80 causes the chat application 60*a* to display a message, such as for example, "Please select members who are to be invited to the meeting."

S21: Further, the reservation reception unit 15 of the bot server 80 causes the chat application 60*a* to display one or more contact folders.

S22: The organizer opens the one or more contact folders and selects users to be invited to the meeting. The operation reception unit 72 receives the selections.

S23: The organizer presses an OK button when the selection is completed. The operation reception unit 72 receives pressing of the button. The selected invited members are transmitted to the bot server 80. The identification information of the organizer may also be transmitted to the bot server 80. This is because the bot server 80 determines the one or more available schedules by taking into account the user schedule of the organizer.

S24: When twenty or more members are selected, the reservation reception unit 15 displays "The number of members to be selected is up to 19." The number of members, twenty, is an example, and such a limitation may not be necessary.

S25: In a case that twenty or more members are selected, the reservation reception unit 15 of the bot server 80 causes the chat application 60*a* to display a message, such as for example, "Please select members who are to be invited to the meeting." That is, the process returns to step S20.

S26: When 19 or less invited members are selected, the reservation reception unit 15 of the bot server 80 causes the chat application 60*a* to display a list of the contacts corresponding to the selected invited members and a message such as, for example, "The schedule is registered to user schedules of XX, YY (names of invited members). Do you want to add other members?". XX and YY are names of invited members.

S27: When the organizer selects to "add" (Yes), the reservation reception unit 15 of the bot server 80 causes the chat application 60*a* to display a message, such as for example, "Please enter a keyword to search for a member." FIG. 13 to FIG. 16 are diagrams illustrating regarding entering, or inputting, the keyword and searching for a member by the keyword, which may be referred to as a search keyword, hereinafter.

S28: The organizer enters, or inputs, a keyword, such as a part of a username. The operation reception unit 72 receives the input. The input keyword is transmitted to the bot server 80.

S29: The reservation reception unit 15 of the bot server 80 sets the keyword to a query. A query is an instruction for performing processing such as extracting or manipulating data from a database.

S30-1, S30-2: The cooperation unit 14 of the bot server 80 specifies the token and transmits a request for information on related users (related user information) to the reservation management server 20 via the API 83. The related user information is a list of users who are related to the organizer and specified by a history of sending and receiving emails of the organizer and an organization chart registered in advance.

S31-1, S31-2: The communication unit 21 of the reservation management server 20 transmits the related user information specified by the token to the bot server 80.

S32: The reservation reception unit 15 of the bot server 80 searches for related user information by the keyword. When a member who is relevant to the search keyword is found, the reservation reception unit 15 of the bot server 80 causes the chat application 60a to display a message, such as for example, "One or more members have been found. Please select a member to be added." The bot server 80 may acquire only the related user information relevant to the search keyword. In this case, the reservation management server performs the search.

S33: The reservation reception unit 15 of the bot server 80 causes the chat application 60a to display a list of related users who are relevant to the search keyword (M6 in FIG. 15).

S34: When no member applicable to the search keyword is found, the reservation reception unit 15 of the bot server 80 causes a chat application 60a to display a message such as, for example, "No member is found. Please enter a keyword to search for a member." (M3, M4 in FIG. 14).

S35: The Process returns to step S27.

S36: When the organizer presses the "Not Add" button, the process proceeds to step S44.

S37: When the list of related users is displayed, the organizer selects a user who is to be invited to the meeting from the related users who are relevant to the search keyword. The operation reception unit 72 receives the selection (M9 in FIG. 15). The selected user is transmitted to the bot server 80.

S38: The organizer further selects whether to add or not or whether to search again or not. The operation reception unit 72 receives the selections. The selection is transmitted to the bot server 80.

S39: When the organizer presses a button to "Add" (Yes button) (M10 in FIG. 16) and 20 or more invited members are selected, the reservation reception unit 15 causes the chat application 60a to display a message of "The number of members to be selected is up to 19" and does not add the selected users as the invited members.

S40: When the selection of the invited members is completed, the reservation reception unit 15 of the bot server 80 causes the chat application 60a to display a list of the selected users (M13 in FIG. 16), and a message, such as for example, "The schedule is registered to user schedules of XX, YY. Do you want to add other members?"

S41: When the organizer selects Add (Yes), the process returns to step S27.

S42: When the organizer selects not to add (No), the process proceeds to step S44.

S43: When the organizer presses a button for searching again, the process returns to step S27.

S44: Since the invited members has been determined, the reservation reception unit of the bot server 80 sets the selected members in a request.

S45: The reservation reception unit 15 of the bot server 80 sets one week from the current date and time as a criterion for searching for a schedule in the request. One week is an example, and the organizer may set an arbitrary period of time.

S46-1 and S46-2: When the meeting room is not required, the cooperation unit 14 of the bot server 80 specifies invited members and acquires the one or more available schedules from the reservation management server 20 via the API 83.

S47-1, S47-2: When there is a plurality of invited members, the reservation management server 20 transmits the one or more available schedules common to the plurality of invited members to the bot server 80. The available schedule is a schedule generated based on the meeting time, among one or more time zones in each user schedule available for each user.

S48: When a meeting room is required, the reservation adjustment unit 16 divides the meeting rooms in the meeting room folder into sets each of which includes five meeting rooms. This is due to restrictions of the reservation management server 20. The meeting rooms in the meeting room folder may not be divided.

S49: The reservation adjustment unit 16 sets five meeting rooms obtained by dividing the meeting rooms in the meeting room folder in a request.

S50: The cooperation unit 14 of the bot server 80 specifies a meeting room and acquires the one or more available schedules common to the meeting room and the plurality of invited members from the reservation management server 20 via the API 83.

S51: The reservation management server 20 returns the one or more available schedules common to the meeting room and the plurality of invited members to the bot server 80 for each meeting room.

S52: When the one or more available schedules common to the meeting room and the plurality of invited members are acquired for each meeting room, which is one of the five meeting rooms divided as a set, the reservation adjustment unit 16 combines the acquired available schedules each of which is corresponding to one of the five meeting rooms. To combine means to combine the pieces information into one file.

S53: When there are one or more common available schedules for the plurality of invited members, or when there are common available schedules for the meeting room and the plurality of invited members, the reservation adjustment unit 16 of the bot server 80 collates the available schedules in an ascendant order from a time close to the current time.

S54: Then, the reservation adjustment unit 16 causes the chat application 60a to display the one or more available schedules common to the plurality of invited members or the one or more available schedules common to the meeting room and the plurality of invited members (M16 in the chat page (a) in FIG. 17).

S55: When there is no common available schedule for the plurality of invited members, or when there is no common available schedule for the meeting room and the plurality of invited members, the reservation adjustment unit 16 of the bot server 80 changes the meeting time.

When the meeting time is set to 30 minutes, the meeting time is not able to be changed to make the meeting time shorter than 30 minutes. Accordingly, the reservation adjustment unit 16 of the bot server 80 causes the chat application 60a to display a message of "There is no available time for the meeting."

S56: The reservation adjustment unit 16 prompt the organizer to set again whether a meeting room is required to be reserved.

S57: When the meeting time is set to one hour, the meeting time is modifiable to 30 minutes. Accordingly, the reservation adjustment unit 16 of the bot server 80 changes the meeting time to 30 minutes from one hour, and the process returns to S46-1 or S48. Thereby, one or more available schedules are to be acquired from the reservation management server 20.

S58: When the meeting time is set to two hours, the meeting time is modifiable to one hour. Accordingly, the reservation adjustment unit 16 of the bot server 80 changes the meeting time to one hour from two hours, and the process returns to S46 or S48. Thereby, one or more available schedules are to be acquired from the reservation management server 20.

S59: When there are the one or more available schedules, the organizer selects a desired one among from the one or more available schedules. The operation reception unit 72 receives the selections. The number of selected desired available schedule is one. The desired available schedule is transmitted to the bot server 80.

S60: The organizer inputs, or enters, a meeting name, or a title. The operation reception unit 72 receives the input. The meeting name (title) is transmitted to the bot server 80.

S61: The reservation adjustment unit 16 of the bot server 80 sets the meeting name and the desired available schedule in a request. The request is a request for registering an event as a scheduled event, or a fixed schedule.

S62-1, S62-2: The cooperation unit 14 of the bot server 80 transmits a request for a URL for inviting to the meeting (invitation URL) to the reservation management server 20 via the API 83. The invitation URL is a URL that connects the terminal devices 60 of organizer and the invited members who participate in the same meeting. Video and audio are to be shared between the terminal devices 60 connected to the invitation URL.

S63-1 and S63-2: The reservation management server 20 transmits the invitation URL to the bot server 80 via the API 83.

S64: The reservation adjustment unit 16 of the bot server 80 generates an option URL from the invitation URL. The option URL is used as a common folder.

S65: The reservation adjustment unit 16 sets the event to be scheduled (invitation URL, option URL, desired available schedule, contact information of invited member) in the request. When a meeting room is to be used, meeting room identification information is also set in the request. The request is a request for registering the event as a scheduled event. Although there is one event that is scheduled in FIG. 10, which includes FIG. 10A to FIG. 10G, more than one events may be scheduled, or registered as scheduled events in FIG. 11 (FIG. 11A to FIG. 11G), which is described later.

S66, S67: The cooperation unit 14 of the bot server 80 requests via the API 83 to the reservation management server 20 to register the event to be scheduled as the scheduled event. The reservation information management unit 22 of the reservation management server 20 registers the reservation of the meeting room in the reservation information DB 291 and registers the scheduled event to each user schedule in the user schedule DB 293. The reservation information registered in the reservation information DB 291 is shared with the meeting management server 30. In the reservation information DB 291, the organizer is a reservation-making user and the invited members are expected participants.

S68: The reservation management server 20 transmits information indicating the reservation is OK (the event is scheduled) to the bot server 80 via the API 83.

S69: The cooperation unit 14 of the bot server 80 receives the information indicating that the reservation is OK, and the reservation reception unit 15 causes the chat application 60*a* to display a reservation completion (schedule completion) message (schedule registration completion message).

S70: Since the event is newly registered as the scheduled event, the mail processing unit 24 of the reservation management server transmits a mail for calling the meeting to the invited members. The sender may be the organizer or the reservation management server 20.

S71: Each invited member replies (responds) to the reservation management server by email whether to participate in the meeting or not (whether to accept the schedule or not, namely each scheduled event is acceptable or not).

S72: The mail processing unit 24 of the reservation management server describes a participation status of each user in an email to be transmitted to the organizer. Alternatively, the mails simply may be relayed to the mail processing unit 24 of the reservation management server to be transmitted to the organizer.

S73: When a member declines to participate in the meeting, the organizer reschedules the meeting again.

S74: When a meeting room is reserved, the communication unit 21 of the reservation management server 20 specifies an account or a domain of each user and transmits to the meeting management server 30 information indicating that the event has been registered.

S75: The reservation information acquisition unit 33 of the meeting management server 30 specifies the account or domain of each user and acquires the reservation information. The reservation information is stored in the meeting management information DB 493.

S76: When a meeting room is reserved, the information notification unit 37 transmits the meeting identification information to the members by email. Including a room entry button in the email is not appropriate. Because email is easy to forward and may cause a situation in which a third party who receives the email use the meeting room.

S77: The invited member who comes to close to the meeting room presses a check-in button displayed on the meeting room terminal 90 (entry button of the meeting room terminal 90). The operation reception unit 69 of the meeting room terminal 90 receives the user operation of pressing.

S78: Further, the display control unit 94 displays an input screen for the meeting identification information.

S78: The invited member inputs the meeting identification information received by email on the input screen. The operation reception unit 69 accepts the input of the meeting identification information.

S80: The server communication unit 91 of the meeting room terminal 90 transmits the meeting room ID stored in the storage unit 99 and the input meeting identification information to the meeting management server 30. In a case that the transmitted meeting room ID and the meeting identification information are registered in the meeting identification information DB 494, the usage management unit 38 of the meeting management server 30 permits the start of use. Accordingly, the check-in of the organizer is completed, and the organizer is permitted to start using the meeting room.

Process for Starting Using Meeting Room:

A description is given below of a process for starting using a meeting room according to the present embodiment with reference to FIG. 11, which includes FIG. 11A to FIG. 11G. FIG. 11, which includes FIG. 11A to FIG. 11G, is an example of a sequence diagram for explaining a method for starting using a meeting room by using a chatbot. In the following description of FIG. 11, which includes FIG. 11A to FIG. 11G, differences from FIG. 10, which includes FIG. 10A to FIG. 10G, are mainly described. The processing of steps S1 to S76 may be substantially the same as those in FIG. 10, which includes FIG. 10A to FIG. 10G.

S81: At a time predetermined before the reservation start time, the information notification unit 37 transmits a notification including the meeting identification information (an example of authentication information), the reservation ID, the meeting room ID, and additional information indicating that the start time is approaching, by specifying identification information of the chatbot for the reservation system, which receives and reminds a reservation, the participants including the organizer and the invited members to the meeting registered in the reservation information. The additional information may indicate displaying a display component for start of use. This notification may be referred to as a reminder. When the accounts in the meeting management server 30 and the chat server 10 are different, the information notification unit 37 refers to the association information DB 491 and converts the accounts of the organizer and the invited members. The entry button may be displayed only to the organizer. The information notification unit 37 may transmit the notification in response to a request from the bot server 80.

S82: The bot server 80 causes the terminal device 60 of each of the organizer and the invited members to display that the start time is approaching as a remark of the chatbot identified by identification information of the chatbot (chatbot identification information). On the terminal device 60, an entry button (an example of display component) is displayed along with the information indicating that the start time is approaching. Even when the information indicating that the start time is approaching is not received from the meeting management server 30, the bot server 80 may compares the start time with the current time, and if a time difference is less than a predetermined time, the bot server 80 may cause the terminal device 60 to display the information indicating that the start time is approaching.

S83: The organizer presses the entry button (see M23 in the chat page (a) in FIG. 18). The operation reception unit 72 of the terminal device 60 accepts the user operation of pressing performed by the organizer. Information on the user operation of pressing of the room entry button (an example of start of use) is transmitted to the bot server 80. The information on the user operation of pressing of the room entry button may be referred to as user operation information.

S84: The usage start request unit 18 of the bot server 80 specifies the meeting identification information and the meeting room ID and transmits a room entry request to the meeting management server 30.

S85: In a case that the transmitted meeting room ID and the meeting identification information are registered in the meeting identification information DB 494, the usage management unit 38 of the meeting management server 30 permits the start of use. Accordingly, the check-in of the organizer is completed. Note that when another meeting immediately before the meeting is still ongoing, the check-in is not permitted. In this case, the check-in is allowed when the previous meeting is checked out.

S86: In a case that the room entry is not permitted via the chatbot, or in a case that a user does not use the room entry button, the information notification unit 37 transmits the notification including the meeting identification information, the reservation ID, the meeting room ID, and the additional information indicating that the start time is approaching, by specifying the identification information of the chatbot and each of the organizer and the invited members.

S87 to S90: The steeps are substantially the same as the steps S77 to S80 in FIG. 10, which includes FIG. 10A to FIG. 10G.

Examples of Screens Displayed by Terminal Device:

A description is given of examples of screens displayed by the terminal device 60 in the sequence diagram of FIG. 11, which includes FIG. 11A to FIG. 11G.

Figure 12:
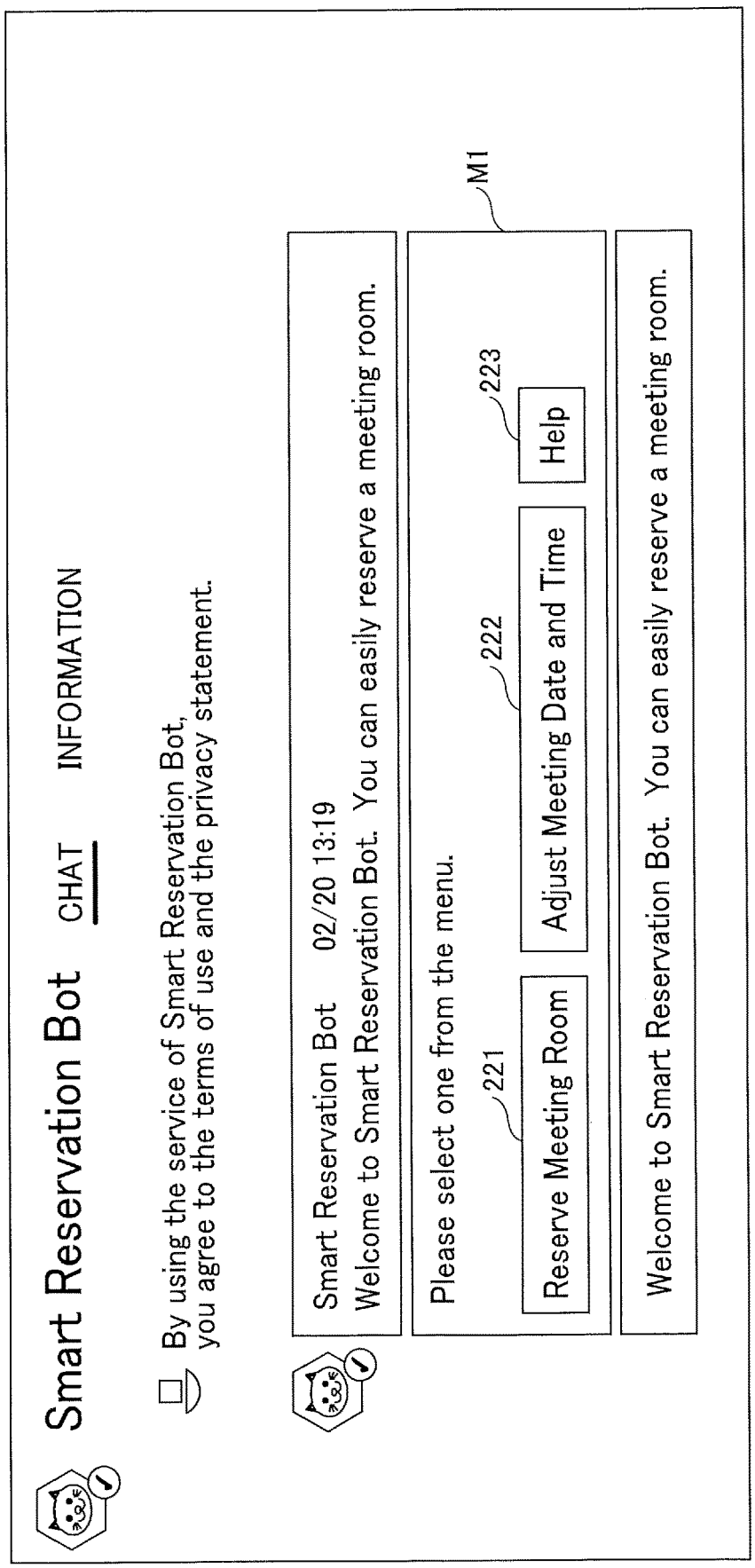
FIG. 12 is a diagram illustrating an example of a chat page displaying a message after an organizer starts a chat application and selects a chatbot for making a reservation for a meeting, according to one or more embodiments of the present disclosure.

FIG. 12 is a diagram illustrating an example of a chat page displaying Message M1 displayed after the organizer starts the chat application 60*a* and selects a chatbot for making a reservation for a meeting (scheduling a meeting). When the chat application 60*a* is started, various bots of other users and companies are displayed in a list. The organizer selects a chatbot for scheduling a meeting, or making a reservation for a meeting, for example. According to the selection, the reservation reception unit 15 of the bot server 80 causes the chat application 60*a* to display Message M1 illustrated in FIG. 12.

Message M1 includes a meeting room reservation button ("Reserve Meeting Room" button) 221, a meeting schedule adjustment button ("Adjust Meeting Date and Time" button) 222, and a "Help" button 223 as a menu. The meeting room reservation button 221 is a button for reserving a meeting room, and the meeting schedule adjustment button 222 is a button for adjusting the user schedules of the invited members for a meeting to be scheduled. In the present embodiment, the meeting schedule adjustment button 222 is pressed.

Figure 13:
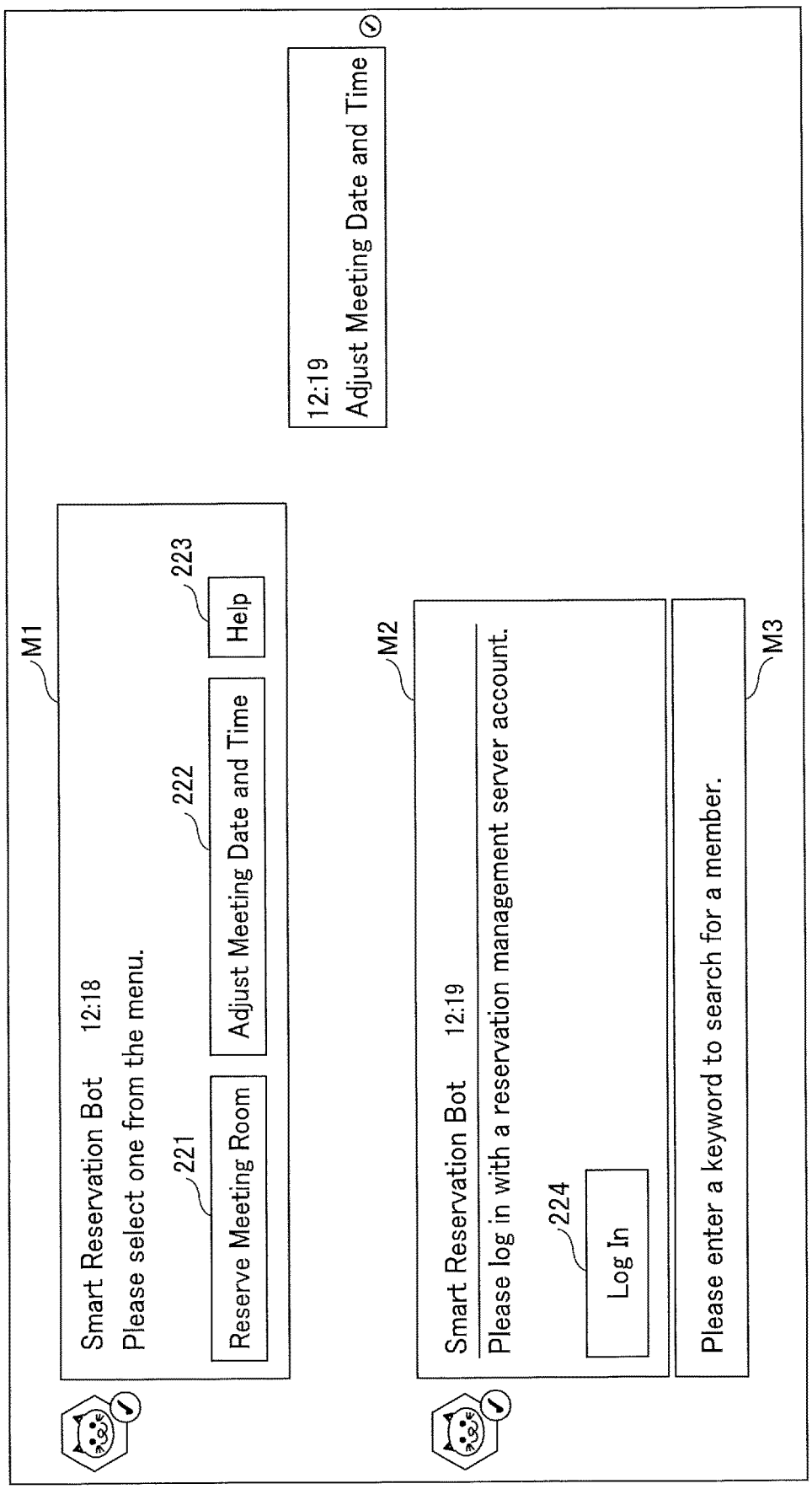
FIG. 13 is a diagram illustrating an example of a chat page displaying another message displayed when a meeting schedule adjustment button is pressed but a log-in has not been performed, according to one or more of the present disclosure.

FIG. 13 is a diagram illustrating an example of a chat page displaying Message M2 displayed when the meeting schedule adjustment button 222 is pressed but a log-in has not been performed. Message M2 is displayed when the user is not logged in to an external authentication device. Message M2 includes a "Log In" button 224. When the "Log In" button 224 is pressed, the terminal device 60 is redirected to the external authentication device.

Figure 14:
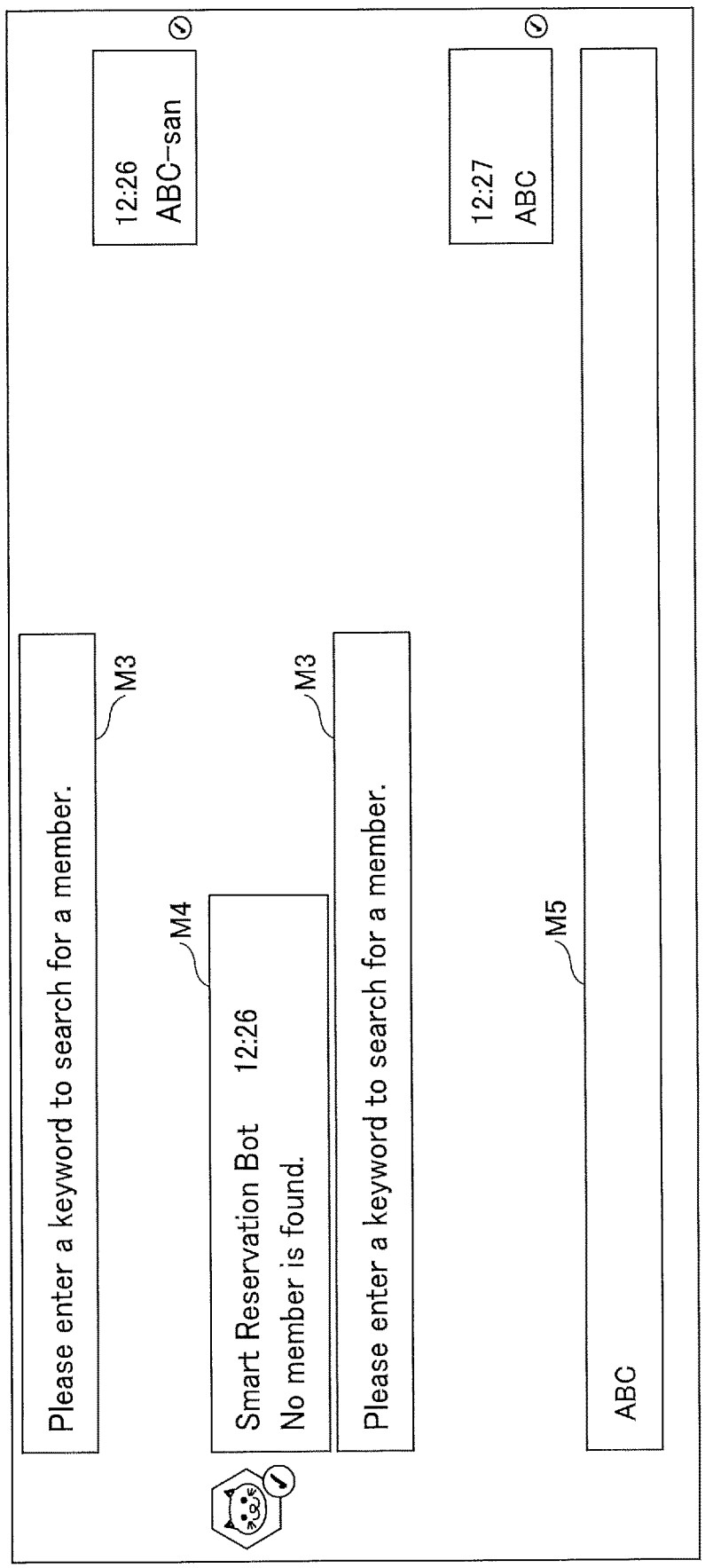
FIG. 14 is a diagram illustrating an example of a chat page displaying messages when a meeting schedule adjustment button is pressed after a log-in is performed, or when the meeting schedule adjustment button is pressed and then a log-in is performed, according to one or more of the present disclosure.

FIG. 14 is a diagram illustrating an example of a chat page displaying messages when the meeting schedule adjustment button 222 is pressed after a log-in is performed, or when the meeting schedule adjustment button 222 is pressed and then a log-in is performed. Message M3 is "Please enter a keyword to search for a member." The member indicates an invited member, and a username or a part of a username is generally used as the keyword. The organizer enters, as the keyword, a name of a desired member who the organizer desires to invite to the meeting. In the present embodiment, for example, the organizer enters "ABC-son" as the keyword, in response to Message M3. In response to the input of the keyword or an operation performed by the organizer to start the search, the search for an invited member who is relevant to the search keyword is performed. When there is no user who is relevant to the keyword, "No Member is found" is displayed as Message M4 to notify the user of the error. In this case, Message M3, "Please enter a keyword to search for a member.", is displayed again.

When there is a user who is relevant to the keyword, the username is displayed as Message M5.

Figure 15:
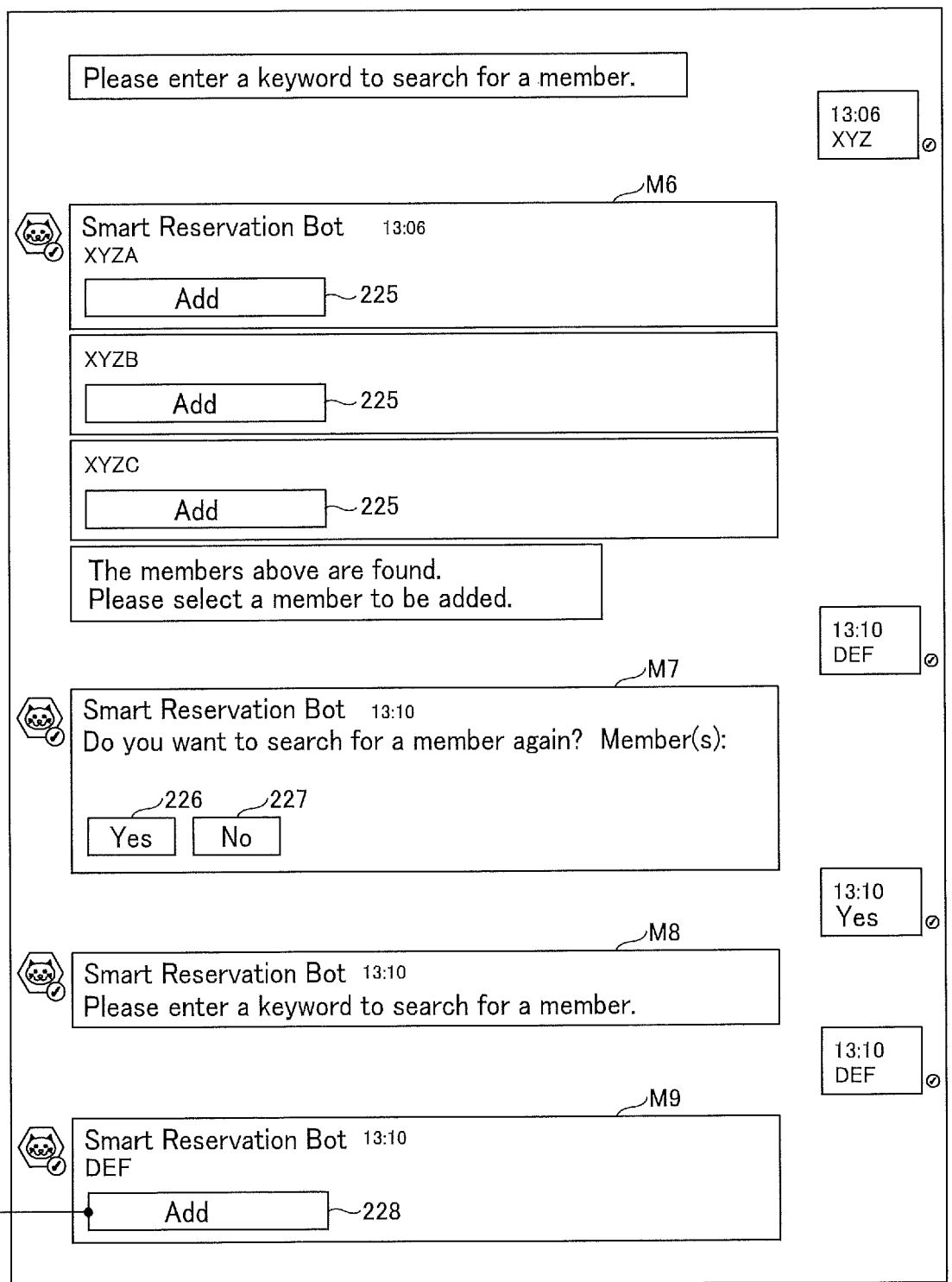
FIG. 15 is a diagram illustrating an example of a chat page displaying messages in adjusting a schedule for a meeting, according to one or more embodiments.

FIG. 15 is a diagram illustrating a chat page displaying Messages M6 to M9 in adjusting the schedule for the meeting. Message M6 indicates a username as a message when the username is relevant to the keyword. In the example of FIG. 15, three usernames are displayed. An "Add" button 225 is displayed under each username. The "Add" button 225 is a button for adding a corresponding user as an invited member. The organizer operates the "Add" button 225 to add the member as desired.

When the organizer inputs another keyword without pressing the "Add" button 225, Message M7, "Do you want to search for a member again?", is displayed. In case that there are members at this time, a list of members is also displayed. Message M7 includes an "Yes" button 226 and a "No" button 227. When the organizer presses the "Yes" 226 button, Message M8, "Please enter a keyword to search for a member." is displayed.

The organizer enters, as the keyword, a name of a desired member who the organizer desires to invite to the meeting. For example, the organizer enters "DEF-san" as the keyword. In response to the input of the keyword or an operation performed by the organizer to start the search, Message M9 that includes one or more invited members that is relevant to the search keyword is displayed. Message M9 includes an "Add" button 228.

Figure 16:
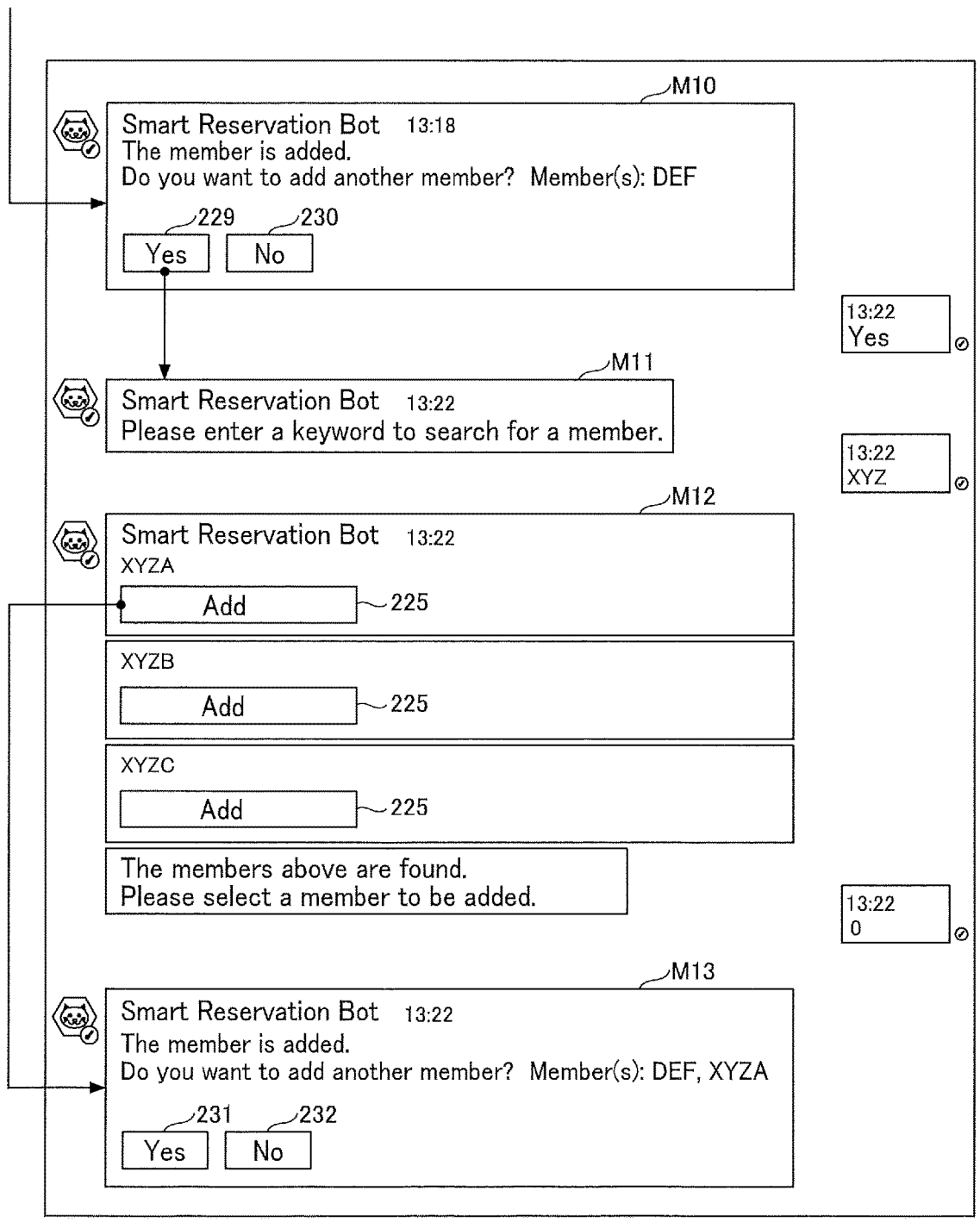
FIG. 16 is a diagram illustrating another example of a chat page displaying messages in adjusting a schedule for a meeting, according to one or more embodiments.

FIG. 16 is a diagram illustrating a chat page displaying Messages M10 to M13 in adjusting the schedule for the meeting. When the "Add" button 228 is pressed, Message M10 is displayed. Message M10 is "The member is added. Do you want to add another member? Member(s): DEF". The "Member(s): DEF" indicates a list of current members Message M10 includes an "Yes" button 229 and a "No" button 230.

When the organizer presses the "Yes" button 229, the search for a member and the addition to the invited members are performable as indicated by Messages M11 to M13. The display processing of Messages M11 to M13 may be substantially the same as that in FIG. 14 and FIG. 15.

FIG. 17 is a diagram illustrating an example of chat pages displaying messages in adjusting the schedule for the meeting. A chat page (a) includes Messages M13 to M16. When a "No" button 232 is pressed in Message M13, Message M14 is displayed. Message M14 is "Do you want to reserve a meeting room?" Message M14 includes an "Yes" button 233 and a "No" button 234.

When the organizer presses the "Yes" button 233, Message M15 is displayed. Message M15 is "Please select a criterion for searching a date and time". Message M15 includes, as the criterion for searching for a date and time, a "30 Minutes from Now" button 235, a "60 Minutes from Now" button 236, a "30 Minutes somewhere Today" button 237, a "60 minutes somewhere Today" button 238, a "Specify a Date" button 239, and a screen slide button 240. The time indicated by each button above is an example corresponding to a meeting time indicated in the sequence diagram illustrated in FIG. 10, which includes FIG. 10A to FIG. 10F.

For example, when the organizer presses the "30 Minutes from Now" button 235, the bot server 80 searches for a meeting room available for 30 minutes from a current time.

When there is an available meeting room, Message M16 is displayed. Message M16 includes an available meeting room and a "Use" button 241, which is for using the available meeting room.

A chat page (b) in FIG. 17 includes Messages M17 and M18. When the screen slide button 240 is pressed, Message M17 is displayed. Message M17 includes a "Set Details" button 242 with a message of "Please select a criterion for searching for a date and time."

When the "Set Details" button 242 is pressed, Message M18 is displayed. Message M18 is "Please input a date of the meeting. Ex) 1202 or 20201202"

Figure 18:
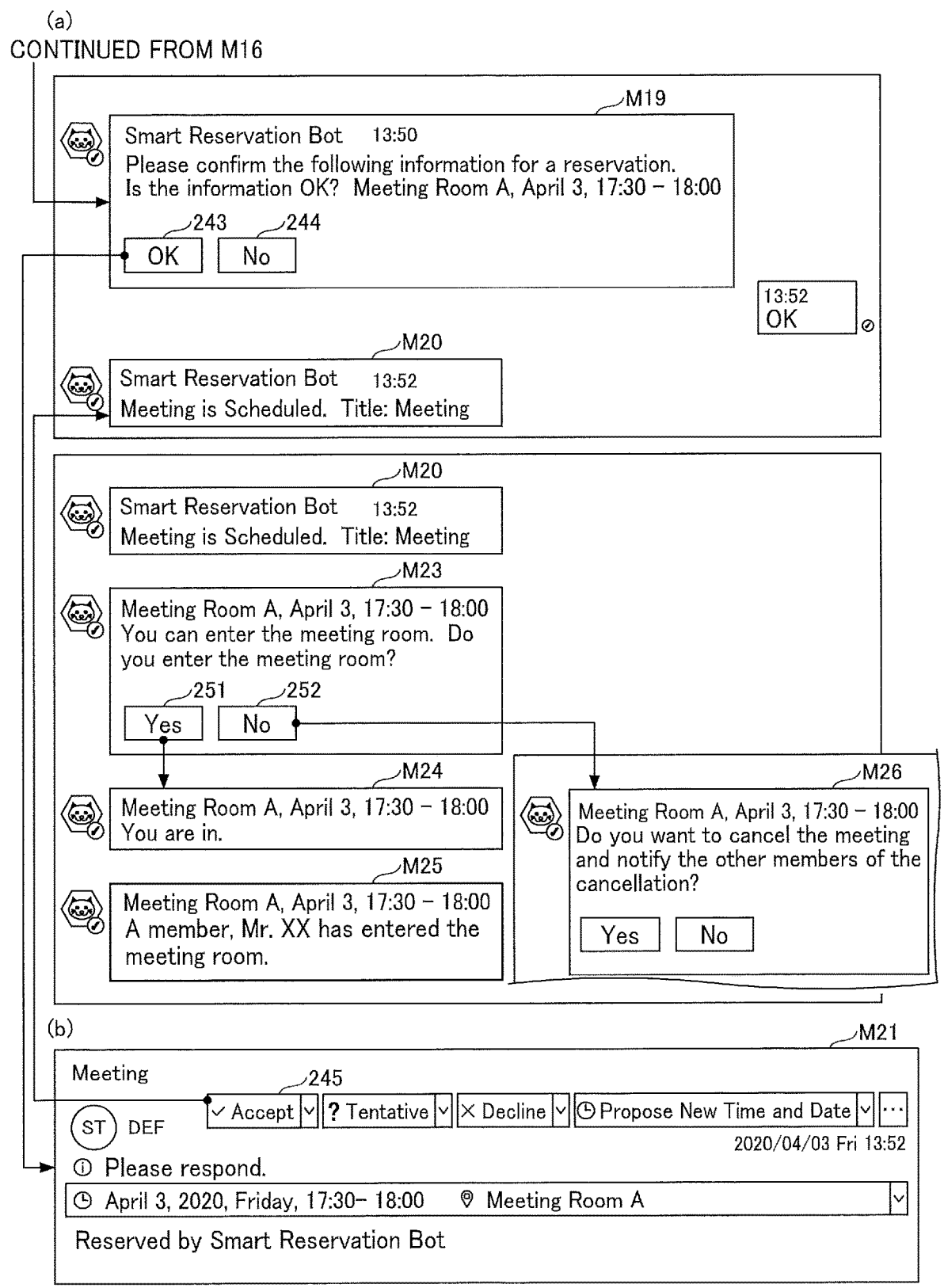
FIG. 18 is a diagram illustrating still another example of a chat page displaying messages in adjusting a schedule for a meeting, according to one or more embodiments.

FIG. 18 is a diagram illustrating chat pages displaying messages in adjusting the schedule for the meeting. A chat page (a) includes Messages M19 and M25. When the organizer presses the "Use" button 241 in Message M16, Message M19 is displayed. Message M19 is "Please confirm the following information for a reservation. Is the information OK? Meeting Room A, April 3, 17:30-18:00".

Message M19 includes an "OK" button 243 and a "No" button 244.

When the organizer presses the "OK" button 243, the members are notified of the reservation as indicated by a chat page (b) illustrated in FIG. 18. The chat page (b) illustrated in FIG. 18 is message M21 displayed by the terminal device 60 used by each invited member. Message M21 displays the details of the reservation. Message M21 includes an "Accept" button 245. When an invited member presses the "Accept" button 245, information indicating that the invited member accepts the schedule is transmitted to the bot server 80.

When receiving the information, the bot server 80 causing the chat application 60a to display Message M20 on the terminal device 60 used by the organizer. Message M20 is "Meeting is Scheduled. Title: Meeting"

Message M23 is displayed before a predetermined time before the meeting reservation time. Message M23 is "You can enter the meeting room. Do you enter the meeting room?" Message M23 includes an "Yes" button 251 and a "No" button 252. The organizer checks in by pressing the "Yes" button 251. An "Yes" button 251 is corresponding to the room entry button.

As illustrated in FIG. 20, which is described later, both an image code and Message M23 may be displayed. When the "No" button 252 is pressed, the usage management unit 38 suspends processing to be performed in response to the pressing of the "No" button 252 until a time set to automatically cancel the reservation. This is because entering the meeting is prioritized. Alternatively, when the "No" button 252 is pressed, the terminal device 60 may display a message asking the organizer whether to cancel the meeting or not. In the case of cancellation, the schedule in the reservation management server 20 is deleted, and the other members are notified of the cancellation.

When the organizer presses the "Yes" button 251, Message M24 "You are in" is displayed. Furthermore, when one of the invited members presses the "Yes" button 251, Message M25 "Mr. XX has entered the meeting room" is displayed. When the organizer presses the "No" button 252, Message M26, "Do you want to cancel the meeting and notify the other members of the cancellation?" is displayed. The message above is a message to be displayed when another member enters the meeting room before when the processing after receiving the pressing of "No" button 252 is held. In this case, the "Yes" button and "No" button in the message M23 is turned to be invalid. In a case that the processing to be performed in response to the pressing the "No" button 252 is suspended, the usage management unit 38 cancel the operation of pressing the "No" button 252.

Figure 19:
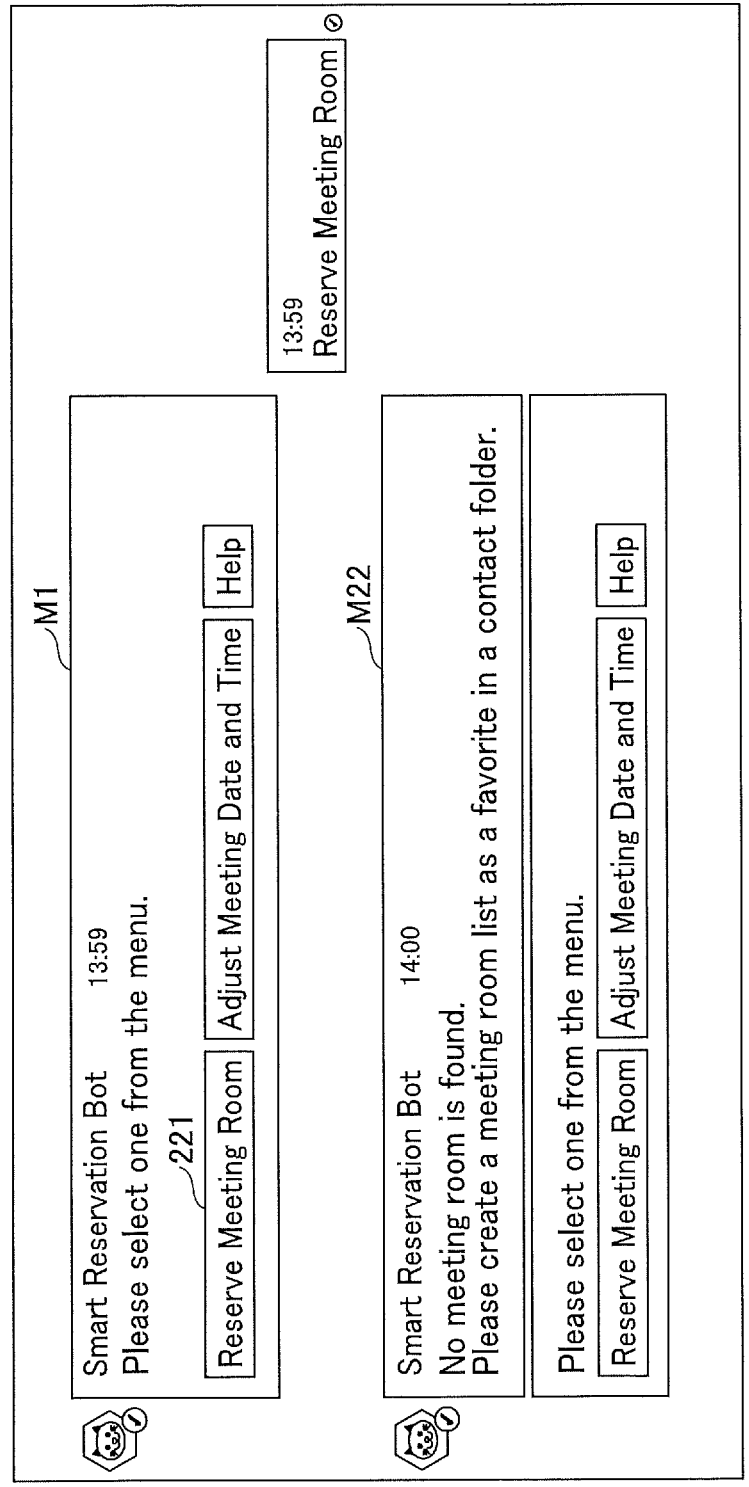
FIG. 19 is a diagram illustrating still another example of a chat page displaying messages in adjusting a schedule for a meeting, according to one or more embodiments.

FIG. 19 is a diagram illustrating a chat page including Message M22 that is displayed when the meeting room reservation button 221 in the message M1 is pressed. In the example of the present embodiment, the message M22 is displayed because a meeting room folder has not been created. Message M22 is, "No meeting room is found. Please create a meeting room list as a favorite in a contact folder in the reservation management server." Message M22 includes the meeting room reservation button 221, the meeting schedule adjustment button 222, and the "Help" button 223 as a menu.

FIG. 20 is a diagram illustrating chat pages including an image code 250 for a check-in. The image code 250 is transmitted a predetermined time before the meeting reservation time. The meeting identification information is encoded in the image code 250. The image code 250 is displayed instead of Message M23 in the chat page (a) in FIG. 18. The organizer checks in by having the meeting room terminal 90 read the image code 250. The image code 250 illustrated in FIG. 20 may be displayed together with Message M23.

Displaying Room Entry Button at Time Desired by User:

As described above, in FIG. 11, which includes FIG. 11A to FIG. 11G, the room entry button is automatically displayed the predetermined time before the reservation start time. Alternatively, the room entry button may be displayed on the terminal device 60 any time that is desired by the organizer.

Figure 21:
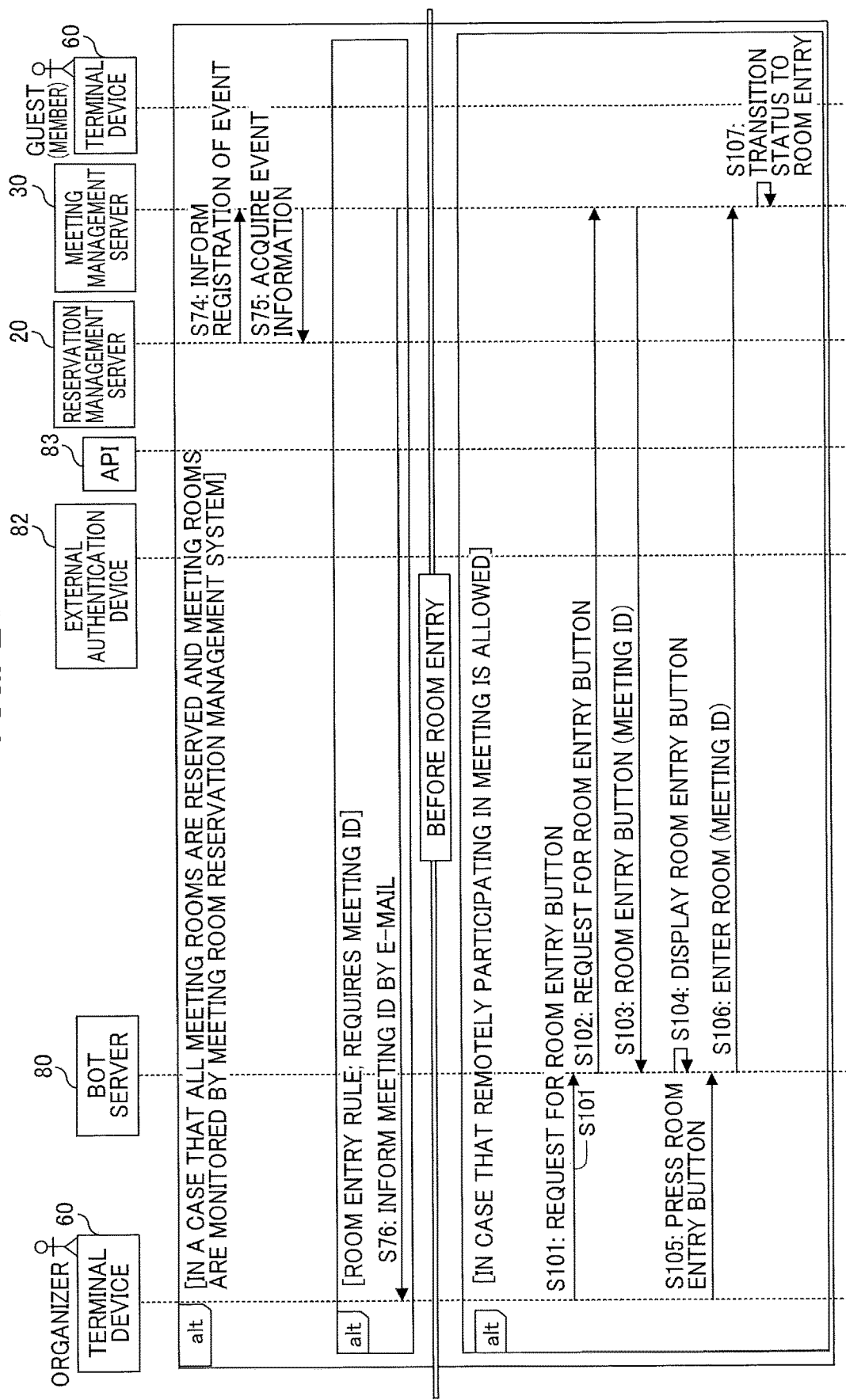
FIG. 21 is a sequence diagram illustrating an example of a method for starting using a meeting room by using a chatbot according to one or more embodiments of the present disclosure.

FIG. 21 is a sequence diagram illustrating an example of a process for starting using a meeting room by using a chatbot according to another embodiment. In the following description of FIG. 21, differences from FIG. 10, which includes FIG. 10A to FIG. 10G, are mainly described. The substantially same processing of steps S1 to S76 in FIG. 10, which includes FIG. 10A to FIG. 10G, applies the present embodiment, and the description thereof is omitted.

S101: The organizer operates performs the terminal device 60 to display the room entry button. Various method may apply the operation. For example, performs a user operation with respect to a menu displayed in response to holding down Message 20 displayed in S68. The operation reception unit 72 of the terminal device 60 receives the user operation. A display request for the room entry button is transmitted to the bot server 80.

S102: The communication unit 11 of the bot server 80 specifies the token and the reservation ID and transmits the meeting management server 30 a request for the room entry button.

S103: The information notification unit 37 of the meeting management server 30 determines whether the user specified by the token (user ID) is the reservation-making user associated with the reservation information specified by the reservation ID. When a determination indicates that the user specified by the token is the reservation-making user, information on the entry button is transmitted to the bot server 80. The chatbot identification information is for the reservation system, and the destination is specified by a token. This determination may be made by the bot server 80.

As described above, the room entry button is displayed when the reserved event is registered by the organizer, resulting in improving security. The invited members may be allowed to display a usage start button.

S104 to S107: The steeps are substantially the same as the steps S82 to S85 in FIG. 11, which includes FIG. 11A to FIG. 11G. However, when a status of the reservation information registered by the organizer is not waiting for check-in, entering the meeting room is not permitted even if the meeting identification information is successfully authenticated.

In a conventional technique, a user is required to input information for authentication before starting using a resource. The information for authentication is distributed to users according to a resource reservation before a reservation start time, which also indicates a time to start using a reserved resource. The information for authentication is information indicating that a user has authority to use the resource. However, when starting to use the resource, the user is required to search for the information for authentication from, for example, emails to enter the information.

In view of the above issue, an object of one or more of the present disclosure is to provide a resource reservation system that does not require an input of authentication information in order to start using a resource.

As described above, the resource reservation system according to the one or more embodiments described above, transmits the meeting identification information to the organizer and the invited members and allows the organizer and the invited members to check in to the meeting room when one of the organizer and the invited members presses the room entry button. That is, the organizer or an invited member is not required to enter information for authentication. In addition, the organizer may display the button for entering a meeting room (room entry button) at any time.

Variation:

The above-described embodiment is illustrative and does not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present invention. Any one of the above-described operations may be performed in various other ways, for example, in an order different from the one described above.

For example, in the present embodiment, the meeting room terminal 90 mainly displays text data as a message, but the terminal device 60 may display an icon, a photo, an avatar, a video image, or the like with or without a message.

There may be a plurality of meeting management servers 30, or the functions of the meeting management server 30 may be distributed to a plurality of servers. The reservation management server 20 and the meeting management server 30 may be implemented by a single entity.

The apparatuses or devices described in each embodiment are merely one example of plural computing environments that implement one or more embodiments disclosed herein. In some embodiments, the meeting management server 30 includes multiple computing devices, such as a server cluster. The multiple computing devices communicates with one another through any type of communication link including a network, shared memory, etc., and perform the processes described in this disclosure.

The resource reservation system (scheduling system) 100 of the present embodiments may also be referred to as a "web service". The web service refers to various services provided by the internet-related technologies. Examples of the web service include various rental services including a meeting room rental service. A system that uses the service is called a usage system.

In addition, the functional configuration of the resource reservation system 100 are divided into the functional blocks as illustrated in FIG. 6 and FIG. 7, for example, based on main functions thereof, in order to facilitate understanding the processes performed by resource reservation system (scheduling system) 100. No limitation is intended by how the processes are divided or by the names of the processes. The resource reservation system (scheduling system) 100 may also be divided into the larger number of units according to the processing contents. In addition, a single processing unit can be further divided into a plurality of processing units.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A resource reservation system, comprising:
   a first information processing device connected to communicate with a first terminal device of a first user and a second terminal device of a second user, the second user being different from the first user;

an authentication device connected to communicate with the first information processing device, the first terminal device, and the second terminal device, the authentication device being configured to
- automatically generate a token for each of the first terminal device of the first user and the second terminal device of the second user, the tokens respectively being associated with an identifier of the first user and an identifier of the second user; and
- transmit the tokens to the first information processing device; and a second information processing device connected to communicate with the first information processing device and configured to
- transmit, to the first information processing device, information on a resource that is reserved for use, and
- automatically generate a display component, by embedding the information on the resource in the display component, upon a request for generating the display component from the first terminal device; and the first information processing device being configured to
transmit, only to the first terminal device, information on the display component in response to identifying the first user by the token and receiving the information on the resource from the second information processing device, the information on the display component enabling the first terminal device to display the display component, the display component being for receiving a user operation, and transmit, to the second information processing device, a resource usage start request in response to receiving user operation information from the first terminal device, the resource usage start request being a request for permission to start using the resource, the user operation information indicating that the user operation of selecting starting using the resource is performed with respect to the display component displayed on the first terminal device, the second information processing device being configured to accept using of the resource for both of the first user and the second user, upon the display component on the first terminal device being pressed by the first user.

2. The resource reservation system of claim 1,
wherein the second information processing device transmits, to the first information processing device, authentication information as the information on the resource, the authentication information being to be used for authentication for start of use of the resource, and
wherein the first information processing device
transmits, to the first terminal device, the information on the display component and the authentication information, and
transmits, to the second information processing device, the resource usage start request by specifying the authentication information, in response to receiving the user operation information and the authentication information from the first terminal device, and
wherein the second information processing device accepts the resource usage start request.

3. The resource reservation system of claim 2,
wherein the first terminal device
displays the display component in response to receiving the information on the display component from the first information processing device,
receives the user operation, and
transmits the user operation information.

4. The resource reservation system of claim 3, further comprising
an information processing terminal configured to
capture an image code in which the authentication information is encoded,
retrieve, from the captured image code, the authentication information by decoding, and
transmits the authentication information, which is retrieved, to the second information processing device,
wherein the second information processing device transmits the image code to the first information processing device, and the first information processing device transmits the image code received from the second information processing device to the first terminal device, a predetermined before a reservation start time, and
wherein the second information processing device accepts the resource usage start request that is associated with the authentication information.

5. The resource reservation system of claim 4,
wherein the first terminal device displays the image code.

6. The resource reservation system of claim 4,
wherein the first terminal device displays the display component and the image code.

7. The resource reservation system of claim 1,
wherein the first information processing device further
transmits, to a different information processing device, a request for making a reservation for the resource and information on the first user and the second user, in response to receiving a reservation request associated with the resource from the first terminal device, and
transmit, to the second information processing device, a request for user identification information corresponding to each of the first user and the second user specified by the tokens, in response to receiving a request for the information on the display component with the user identification information, which is specified, from the first terminal device,
wherein the second information processing device further acquires, from the different information processing device, reservation information associated with the resource and information on the first user and the second user,
wherein the first information processing device transmits, to the first terminal device, the information on the display component, in response to receiving the information on the resource from the second information processing device.

8. The resource reservation system of claim 1,
wherein, in a case that the second information processing device receives a different user operation performed by the first user with respect to the display component, processing to be performed in response to the different user operation performed with the terminal device is suspended until a time at which a reservation for the resource is automatically cancelled, the different user operation being selecting not starting using the resource.

9. A method for starting using a resource, comprising:
receiving, from an information processing device, information on a resource that is reserved for use;

automatically generating a token for each of the first terminal device of the first user and the second terminal device of the second user, the tokens respectively being associated with an identifier of the first user and an identifier of the second user, the first user being different from the second user;

transmitting the tokens to the information processing device;

automatically generating a display component, by embedding the information on the resource in the display component, upon a request for generating the display component from the first terminal device;

transmitting, only to a first terminal device, information on a display component in response to identifying the first user by the token and receiving the information on the resource received from the information processing device;

transmitting, to the information processing device, a resource usage start request received from the terminal device, the resource usage start request being made in response to a user operation performed with respect to the display component and being a request for permission to start using the resource; and receiving, from the information processing device, information indicating acceptance of the using of the resource for both of the first user and the second user upon the display component on the first terminal device being pressed by the first user.

10. A non-transitory recording medium storing a plurality of instructions which, when executed by one or more processors, causes the processors to perform a method, comprising:

receiving information on a resource that is reserved for use;

automatically generating a token for each of the first terminal device of the first user and the second terminal device of the second user, the tokens respectively being associated with an identifier of the first user and an identifier of the second user, the first user being different from the second user;

automatically generating a display component, by embedding the information on the resource in the display component, upon a request for generating the display component from the first terminal device;

displaying, only on a display of a terminal device of the first user, the display component, in response to identifying the first user by the token and receiving information on the display component from a first information processing device, the display component being for receiving a user operation of selecting starting using a resource, the information on the display component enabling the display to display the display component;

receiving the user operation performed with respect to the display component;

transmitting, to the first information processing device, user operation information indicating that the user operation of selecting starting using the resource is performed with respect to the display component displayed on the display; and receiving information indicating acceptance of the using of the resource for both of the first user and the second user, upon the display component on the first terminal device being pressed by the first user.

* * * * *